(12) United States Patent
Yanai

(10) Patent No.: US 10,381,913 B2
(45) Date of Patent: Aug. 13, 2019

(54) POWER SUPPLY CONTROL DEVICE AND CONTROL CHARACTERISTIC CORRECTION DATA GENERATION METHOD FOR POWER SUPPLY CONTROL DEVICE

(71) Applicant: Mitsubishi Electric Corporation, Tokyo (JP)

(72) Inventor: Takayuki Yanai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 15/785,828

(22) Filed: Oct. 17, 2017

(65) Prior Publication Data

US 2018/0123441 A1 May 3, 2018

(30) Foreign Application Priority Data

Oct. 27, 2016 (JP) .................. 2016-210244

(51) Int. Cl.
| | | |
|---|---|---|
| H02M 1/08 | (2006.01) | |
| G05B 15/02 | (2006.01) | |
| H02M 3/158 | (2006.01) | |
| F16H 61/00 | (2006.01) | |
| F16H 61/02 | (2006.01) | |
| H02M 1/00 | (2006.01) | |
| H02M 1/32 | (2007.01) | |

(52) U.S. Cl.
CPC .......... *H02M 1/08* (2013.01); *F16H 61/0006* (2013.01); *G05B 15/02* (2013.01); *H02M 3/158* (2013.01); *F16H 61/0251* (2013.01); *F16H 2061/005* (2013.01); *F16H 2061/0255* (2013.01); *H02M 2001/0006* (2013.01); *H02M 2001/0009* (2013.01); *H02M 2001/327* (2013.01)

(58) Field of Classification Search
CPC ........... H02M 1/08; H02M 2001/0006; H02M 2001/0009; H02M 2001/327; H02M 3/158; F16H 61/0006; F16H 61/61; F16H 61/0251; F16H 2061/005; F16H 2061/0255; G05B 15/02
See application file for complete search history.

(56) References Cited

FOREIGN PATENT DOCUMENTS

| | | |
|---|---|---|
| JP | 2006-269540 A | 5/2006 |
| JP | 2011-109750 A | 6/2011 |
| JP | 2011-239550 A | 11/2011 |

*Primary Examiner* — Robert L Deberadinis
(74) *Attorney, Agent, or Firm* — Sighrue Mion, PLLC; Richard C. Turner

(57) ABSTRACT

Correction coefficients corresponding to parameters by which characteristic variation is caused are stored in a data memory of a second integrated circuit element in which driving open/close elements respectively connected in series to a plurality of inductive loads are integrated, and a first integrated circuit element that cooperates with the second integrated circuit element suppresses a current control error accompanying individual variation among circuit components and environmental temperature variation by reading present values of the parameters and combining the present values with the correction coefficients. The correction coefficients are calculated by an adjustment tool in a state where the second integrated circuit element is provided singly, and therefore correction data can be generated in relation to a plurality of temperature environments easily.

10 Claims, 16 Drawing Sheets

POWER SUPPLY CONTROL DEVICE AND CONTROL CHARACTERISTIC CORRECTION DATA GENERATION METHOD FOR POWER SUPPLY CONTROL DEVICE

BACKGROUND OF THE INVENTION

1. Field of the Invention

This invention relates to improvements in a power supply control device that supplies individually variable load currents to a plurality of inductive loads, and in a correction data generation method applied to the power supply control device to correct variation in a control characteristic caused by temperature variation and individual variation among circuit components.

2. Description of the Related Art

In an automatic transmission for an automobile include, for example, three to six proportional solenoid valves are used to select a plurality of gear positions, and it is necessary to subject proportional solenoid coils (linear solenoids) of one or more thereof to simultaneous energization control using various target currents, and to implement high-precision current control adapted to the target currents on power supply open/close elements connected in series to the respective proportional solenoid coils by controlling respective energization duties thereof.

As background art relating to this type of power supply control device, in a case where a power supply voltage $Vb$ of an in-vehicle battery varies from DC 7 V to DC 14 V, for example, the target current varies between 10% and 100%, and a load resistance at an environmental temperature of −30° C. to 125° C. varies between 100% and 135%, when the energization duty at a power supply voltage of DC 7 V, a load resistance of 135%, and a target current of 100% is set at 100%, an energization duty of $100 \times (7/14) \times (10/100) \times (100/135) = 3.7\%$ is obtained at a power supply voltage of DC 14 V, a load resistance of 100%, and a target current of 10%. Moreover, when a target current control precision is set at ±1.5%, other allowable control errors are insignificant.

In actuality, however, individual variation among current detection resistors is ±0.1% at a normal temperature even when expensive, high-precision resistors are used, and therefore an error of ±0.3% occurs at conceivable high and low temperatures.

Furthermore, when a current detection resistor is connected to a position upstream of an inductive load and an end-to-end voltage thereof is differentially amplified, a variation error occurs in an amplification factor due to individual variation and temperature variation among voltage dividing resistors provided on positive and negative input circuits of an amplifier.

Moreover, when a control voltage $Vcc$ stabilized by a constant voltage power supply is used as a reference voltage $Vref$ for an applied AD converter, and the reference voltage $Vref$ varies, a digital conversion value varies in inverse proportion thereto.

When an inexpensive constant voltage power supply is used, an error in an output voltage thereof cannot be detected, and in order to detect the error, an expensive, high-precision reference voltage is required.

Hence, to implement high-precision current control inexpensively, individual variation among current detection resistors, a variation characteristic of the amplification factor of a differential amplification circuit that accompanies variation in the power supply voltage, and variation in the AD conversion value relative to variation in the control voltage $Vcc$ must be corrected in accordance with a large number of temperature environments.

Note that when the current detection resistor is provided on a downstream side of the inductive load, an advantage is obtained in that a differential amplifier is not required and therefore the variation error in the power supply voltage $Vb$ does not have to be corrected. However, a disadvantage of this is that two wires, namely an upstream wire and a downstream wire, are required for a single inductive load, whereas when the current detection resistor is provided on the upstream side of the inductive load, the downstream wire is connected to a vehicle body and can therefore be omitted.

As shown in FIGS. 1 and 2 of Japanese Patent Application Publication No. 2011-109750 (Abstract, FIGS. 1 and 2), for example, a "current control device for an electric load" disclosed therein is provided with a temperature sensor 171 that detects a housing interior temperature in order to correct individual variation among circuit components and characteristic variation corresponding to an environmental temperature in relation to a monitoring voltage $Ef$ detected by a current detection resistor 126 and a differential amplification circuit unit 150, and a correction operation is implemented by a current control device 100A in a least one of a high temperature environment and a low temperature environment.

Hence, a correction constant is calculated by a microprocessor provided in the current control device 100A, and therefore an adjustment tool for calculating the correction constant externally is not required.

Note that in Japanese Patent Application Publication No. 2011-109750, FIG. 1 shows an analog control system in which negative feedback control is implemented by hardware, and FIG. 11 shows a digital control system in which the negative feedback control is implemented by the microprocessor.

Further, in paragraph [0041], an offset error component and an error component that is proportionate to a power supply voltage generated by a differential amplifier 151 are analyzed using specific formulae.

Furthermore, in relation to this invention, Japanese Patent Application Publication No. 2011-239550 (Abstract, FIGS. 1 and 2) discloses an "electronic control device", and FIGS. 1 and 2 thereof illustrate an electronic control device 100A configured such that a microprocessor 110A cooperates with an integrated circuit element in which a plurality of open/close elements 140n are integrated as an intelligent power module IPM 190A. Here, ON-OFF control is implemented on the plurality of open/close elements 140n using pulse width modulation signals PWMn transmitted respectively thereto as parallel signals, and end-to-end voltages of respective current detection resistors 141n of the open/close elements 140n are transmitted to the microprocessor 110A as serial signals via a multichannel AD converter 116b and a serial-to-parallel converter 114b.

Note that in Japanese Patent Application Publication No. 2011-239550, digital conversion values are read accurately by adjusting timing errors between the serial signals and the parallel signals using a read timing control circuit 170n.

Also in relation to this invention, Japanese Patent Application Publication No. 2006-269540 (Abstract, FIGS. 1 and 2) discloses a "solenoid drive circuit", and FIGS. 1 and 2 thereof illustrate a technique for reducing power loss in a driving open/close element due to a drive current and power loss in a commutation circuit element due to a commutation current by employing a driving open/close element (TR11) and a commutation circuit element (TR12) that are both constituted by N-channel type field effect transistors as multichannel integrated circuit elements for driving a plurality of linear solenoids. In so doing, an amount of generated heat can be reduced such that the multiple channels can be integrated more closely, and as a result, a size reduction can be achieved.

Note that as a control method for ensuring that a power supply short-circuit abnormality does not occur when the driving open/close element and the commutation circuit element are closed simultaneously, in addition to a drive method employing time difference closing, as disclosed in Japanese Patent Application Publication No. 2006-269540, an interlocking method, in which opening of the elements is confirmed using a combination of an N-channel type field effect transistor and a P-channel type field effect transistor, is also well known (see Japanese Patent Application Publication No. 2015-065786 (Abstract, FIGS. 1 and 2), for example).

SUMMARY OF THE INVENTION

However, the prior art has the following problems.

(1) Description of Problems in the Prior Art

In the "current control device for an electric load" according to Japanese Patent Application Publication No. 2011-109750, a correction operation can be implemented by the current control device 100A alone, but a control load of a microprocessor 111A that implements the correction operation is large, and the temperature sensor 171 must also be corrected.

Moreover, it is difficult to detect respective temperatures of a constant voltage power supply unit and a plurality of current detection resistors representatively using the single temperature sensor 171.

More specifically, to implement correction operations in different temperature environments, the entire current control device 100A, which has a large thermal capacity, must be heated or cooled, leading to a reduction in efficiency. Furthermore, when the current control device 100A is mass-produced, realistically, correction can be implemented only in a normal temperature environment, and therefore the correction operation must be performed in a temperature environment that diverges greatly from an actual usage temperature environment.

Note that correction may be implemented in the actual usage temperature environment using a plurality of sample products, and an average characteristic thereof may be used. In this case, however, individual variation among temperature coefficients of the individual circuit components is entirely dependent on the average characteristic, and therefore correction cannot be implemented accurately.

The "electronic control device" according to Japanese Patent Application Publication No. 2011-239550 discloses a concept of integrating the plurality of open/close elements 140n and implementing drive control thereon using pulse width modulation signals PWMn, and a concept of detecting drive currents, converting the detected drive currents into serial signals, and transmitting the serial signals to a microprocessor. However, the "electronic control device" does not include a commutation circuit element, and the current detection resistor 141n is constituted by a mirror circuit supplied with a current that is proportionate to a drain current of the open/close element 140n, which is constituted by a field effect transistor. Therefore, the current detection precision is poor, and a commutation current does not flow when the inductive load is driven ON and OFF. As a result, an averaged load current cannot be detected.

Further, an inbuilt temperature sensor 154a is used with the aim of preventing the open/close elements 140n from overheating, and cannot be used as environment data for correcting the control characteristic.

The "solenoid drive circuit" according to Japanese Patent Application Publication No. 2006-269540 introduces a concept of constructing a small integrated circuit element by integrating a plurality of driving open/close elements and a commutation circuit element, and the resulting integrated circuit element IC includes a switching control circuit C1, the driving open/close element TR11 and commutation circuit element TR12, and a differential amplifier 1 that amplifies an end-to-end voltage of a current detection resistor R1. However, the current detection resistor R1 is disposed on the exterior of the integrated circuit element IC, and the integrated circuit element IC does not include a temperature sensor.

When the integrated circuit element IC is used alone, therefore, individual variation among the current detection resistors R1 and the temperature characteristic cannot be corrected.

(2) Description of the Object of this Invention

A first object of this invention is to provide a small, inexpensive power supply control device which can control a load current with a high degree of precision even when individual variation occurs among inexpensive circuit components applied thereto and variation occurs in an environmental temperature or a power supply voltage, and with which a control load on a microprocessor provided in the power supply control device can be lightened during a correction operation and an actual working operation such that the correction operation can be performed efficiently.

A second object of this invention is to provide a control characteristic correction data generation method for a power supply control device, which employs a simple adjustment tool capable of implementing correction processing in response to variation under a large number of environmental conditions, or more specifically an adjustment tool with which characteristics of actual components relative to a plurality of environmental temperatures can be measured easily without the need to attach and detach the adjustment tool to a high-precision temperature gauge used for correction.

A power supply control device according to this invention receives power from a DC power supply and supplies a plurality of inductive loads with individually variable load currents Ifi (i=1, 2, ..., m; likewise hereafter), wherein the power supply control device is configured such that a first integrated circuit element having a microprocessor that cooperates with a program memory as a main body and a second integrated circuit element including a plurality of driving open/close elements that are connected to each other in series via a pair of serial-to-parallel converters in order to supply power to the plurality of inductive loads are housed in an identical housing, and heat generated by the plurality of driving open/close elements is transferred to the housing and thereby dissipated, and in accordance with target currents Iti determined by target current setting means in order to obtain the load currents Ifi, the first integrated circuit element either generates open/close command signals DRVi, which are pulse width modulation signals for applying energization duties γi, βi directly to the plurality of driving open/close elements, or causes the second integrated circuit element to generate the open/close command signals DRVi having the energization duties γi by generating drive command signals CNTi, which are first stage pulse width modulation signals having command duties αi that correspond to ratios Iti/Imax of the respective target currents Iti to a maximum target current Imax.

The second integrated circuit element includes: a constant voltage power supply that generates a stabilized control voltage Vcc by stepping down a power supply voltage Vb of the DC power supply, and supplies the control voltage Vcc to the first integrated circuit element; current detection resistors respectively connected in series to the inductive loads; a plurality of current detection circuits for generating current detection voltages Vfi that are respectively proportionate to the load currents Ifi by amplifying respective end-to-end voltages of the current detection resistors; a plurality of drive gate circuits that drive the plurality of driving open/close elements respectively ON and OFF in accordance with the pulse width modulation signals so as to variably control the energization duties γi, which are ratios of respective closed periods of the plurality of driving open/close elements to an ON-OFF period; a plurality of temperature sensors including one or a plurality of resistor temperature detection elements for detecting present temperatures of the plurality of current detection resistors either individually or representatively, and a power supply temperature detection element for detecting a present temperature of the constant voltage power supply; and a non-volatile data memory.

Control characteristic correction data for calculating present resistances Rti of converted equivalent resistances that are obtained by dividing respective values of the current detection voltages Vfi, which vary in response to variation in environmental conditions specified by correction parameters and individual variation among circuit components including the current detection resistors and the current detection circuits, by the load currents Ifi are stored in the data memory, and these correction data are transmitted in series to a buffer memory provided in the first integrated circuit element at the start of an operation, the microprocessor includes present resistance calculating means that obtains present values of the correction parameters, which include detected temperatures obtained by the plurality of temperature sensors or a power supply detection voltage Vba that is proportionate to the detected temperatures and the power supply voltage Vb, during the operation either by receiving a plurality of analog signal voltages serving as the correction parameters via a multiplexer and then digitally converting the analog signal voltages using a master side AD converter, or by using uplink monitoring data received via the pair of serial-to-parallel converters after the analog signal voltages are digitally converted on a transmission side by a slave side AD converter, and corrects ON-OFF duties of the pulse width modulation signals by combining the present values with the correction data, and the correction data, which are calculated by an adjustment tool, are stored in the data memory via a slave station side serial-to-parallel converter, among the pair of serial-to-parallel converters.

In a control characteristic correction data generation method for a power supply control device according to this invention, the power supply control device is constituted by a second integrated circuit element that cooperates with a first integrated circuit element, the second integrated circuit element includes driving open/close elements for supplying a plurality of inductive loads with individually variable load currents Ifi (i=1, 2, . . . , m; likewise hereafter), drive gate circuits for open/close controlling the respective driving open/close elements, and current detection resistors for detecting the load currents Ifi, and first to fourth correction coefficients Ki1 to Ki4 indicated in formula (1b) or first to fifth correction coefficients Ki1 to Ki5 indicated in formula (3b) are calculated in order to calculate present resistances Rti=Vfi/Ifi that vary in response to individual variation among applied circuit components and variation in an environmental temperature or a power supply voltage as equivalent resistances obtained by dividing respective current detection voltages Vfi, which are obtained by amplifying end-to-end voltages of the respective current detection resistors, by the load currents Ifi, $$Ki1 \times Ti + Ki2 \times T0 + Ki3 \times Vba + Ki4 = Vfi/Ifi \quad (1b)$$

$$Ki1 \times Ti0 + Ki2 \times T0 + Ki3 \times Vba + Ki4 + Ki5 \times Ifi^2 = Vfi/Ifi \quad (3b)$$

the power supply control device including an adjustment board on which the single second integrated circuit element is mounted detachably, and an adjustment tool connected to the second integrated circuit element via the adjustment board.

A DC power supply is connected to the adjustment board via a voltage regulator in order to supply power to the second integrated circuit element, the second integrated circuit element supplies the load current Ifi to a series circuit formed by an ammeter Ai1 and a standard sample load, and a dummy load resistor is connected to an output circuit of a constant voltage power supply provided in the second integrated circuit element, the adjustment tool includes a calculation control unit, a setting display unit, a select/write command issuing unit, a master station side serial-to-parallel converter connected in series to a slave station side serial-to-parallel converter provided in the second integrated circuit element, an energization command issuing unit for generating a pulse width modulation signal in the form of an open/close command signal DRVi or a drive command signal CNTi in the second integrated circuit element, a first AD converter and a second AD converter into which present values of correction parameters generated by the second integrated circuit element are input, and an environment adjustment unit, and the first AD converter operates using a control voltage Vcc generated by the second integrated circuit element as an AD reference voltage Vref so as to digitally convert analog signal voltages Vfi, V3, Vai serving as the present values of the correction parameters, transmitted by the second integrated circuit element and input the results into the calculation control unit.

When a measurement value of the ammeter Ai1 or the current detection voltage Vfi is generated as an analog signal voltage and the current detection voltage Vfi is used in the second integrated circuit element during negative feedback control, the second AD converter operates using a stabilized voltage generated by a high-precision constant voltage power supply as an AD reference voltage Vrf so as to digitally convert the measured value of the load current Ifi or the current detection voltage Vfi and input the result into the calculation control unit, the AD reference voltage Vrf applied to the second AD converter is more precise than the AD reference voltage Vref applied to the first AD converter, and in a case where the measurement value of the ammeter Ai1 or the current detection voltage Vfi is generated as a digital signal voltage, a digital measurement value thereof is input as is into the calculation control unit, thereby eliminating the need for the second AD converter, and the environment adjustment unit is operated from the calculation control unit via the setting display unit, and includes a first step for generating a command to modify a resistance value of the dummy load resistor, a command to modify an output voltage output to the voltage regulator, and a command to modify an environmental temperature of the constant voltage power supply provided in the second integrated circuit element and an environmental temperature of the current detection resistor.

The calculation control unit includes a second step for reading a temperature detection voltage Ti generated by a resistor temperature detection element or a temperature detection voltage Ti0 generated by a representative temperature detection element, a temperature detection voltage T0 generated by a power supply temperature detection element, a power supply detection voltage Vba, a value of the current detection voltage Vfi, and a value of the load current Ifi measured by the ammeter Ai1 from formula (1b) or formula (3b) as the present values of the correction parameters, creating four, five, or more simultaneous equations having the first to fourth correction coefficients Ki1 to Ki4 or the first to fifth correction coefficients Ki1 to Ki5 as unknowns for each current detection resistor, and calculating the first to fourth correction coefficients Ki1 to Ki4 or the first to fifth correction coefficients Ki1 to Ki5 using a method of least squares, and the select/write command issuing unit includes a third step for transmitting address information specifying individual types of the correction parameters transmitted from the second integrated circuit element, and transferring the first to fourth correction coefficients Ki1 to Ki4 or the first to fifth correction coefficients Ki1 to Ki5 calculated by the calculation control unit to the second integrated circuit element as correction coefficients for the respective current detection resistors, whereupon the correction coefficients are written to a data memory provided in the second integrated circuit element.

In the power supply control device according to this invention, as described above, control characteristic correction data having a plurality of temperature information or power supply voltage information as parameters are stored in advance in the second integrated circuit element, in which the plurality of driving open/close elements respectively connected in series to the plurality of inductive loads are integrated, and the first integrated circuit element having the microprocessor as a main body generates load driving command signals in which current control errors caused by individual variation among circuit components and environmental temperature variation have been suppressed by reading and storing the correction data at the start of an operation, and reading present values of the parameters and combining the present values with the correction data during the operation.

Hence, the microprocessor provided in the power supply control device does not need to calculate the correction data, and therefore a control load thereof can be lightened. Moreover, the correction data are calculated by the adjustment tool in a condition where the second integrated circuit element is provided singly, and therefore correction data corresponding to a large number of temperature environments can be obtained quickly without being affected by the thermal capacitance of the housing. As a result, an adjustment operation can be improved in efficiency.

Further, the correction parameters relating to the correction calculation vary gently, and therefore the microprocessor that controls the load currents while making use of the correction data does not need to execute high-speed control. Hence, the plurality of analog signals serving as the correction parameters are either digitally converted on the microprocessor side after being transmitted selectively using a multiplexer or transmitted in series after being digitally converted on the transmission side, while pulse width modulation signals are used as the command signals for open/close controlling the driving open/close elements. Therefore, the number of connection terminals of the first and second integrated circuit elements can be reduced, and as a result, the load currents can be controlled with a high degree of precision using a small, inexpensive power supply control device.

In the control characteristic correction data generation method for a power supply control device according to this invention, as described above, the second integrated circuit element that generates the correction data is provided singly, and in this condition, a plurality of correction coefficients are set as unknowns, present values of predetermined correction parameters are collected on the basis of a large number of environment conditions applied by an adjustment tool, a plurality of simultaneous equations having the present values as known values are generated, and correction coefficients are calculated using the method of least squares. The temperatures of the current detection resistors or the temperature of the constant voltage power supply, which serve as a part of the environment conditions, are measured by temperature sensors provided respectively therein, and present values of the environmental temperatures are collected on the basis of temperature detection voltages of the temperature sensors.

Hence, the set environmental temperatures do not have to be measured accurately using a temperature gauge, and therefore operations to attach and detach a sensor head to and from a measurement subject are not required. As a result, the correction data can be generated efficiently.

Note that when resistance value-to-temperature data are given in relation to the current detection resistors, the temperatures of the current detection resistors must be learned accurately in order to learn the resistance values thereof, and for this purpose, temperature detection voltage-to-temperature data must be obtained from the temperature sensors. Here, however, the actual temperatures of the current detection resistors may be disregarded, and the correction coefficients are generated and reused on the basis of a temperature detection voltage characteristic corresponding to an actual product. Therefore, even when a temperature detection error occurs in an inbuilt temperature sensor, correction coefficients including the error can be obtained, and the present resistance can be calculated accurately by applying the obtained correction coefficients.

DESCRIPTION OF THE PREFERRED EMBODIMENTS

Detailed Description of First Embodiment (1) Detailed Description of the Configuration Configurations shown in FIG. 1, which is an overall circuit block diagram of a power supply control device according to a first embodiment of this invention, and FIG. 2, which is a detailed circuit block diagram relating to a power supply circuit portion of the power supply control device shown in FIG. 1, will be described in detail below.

Figure 1:
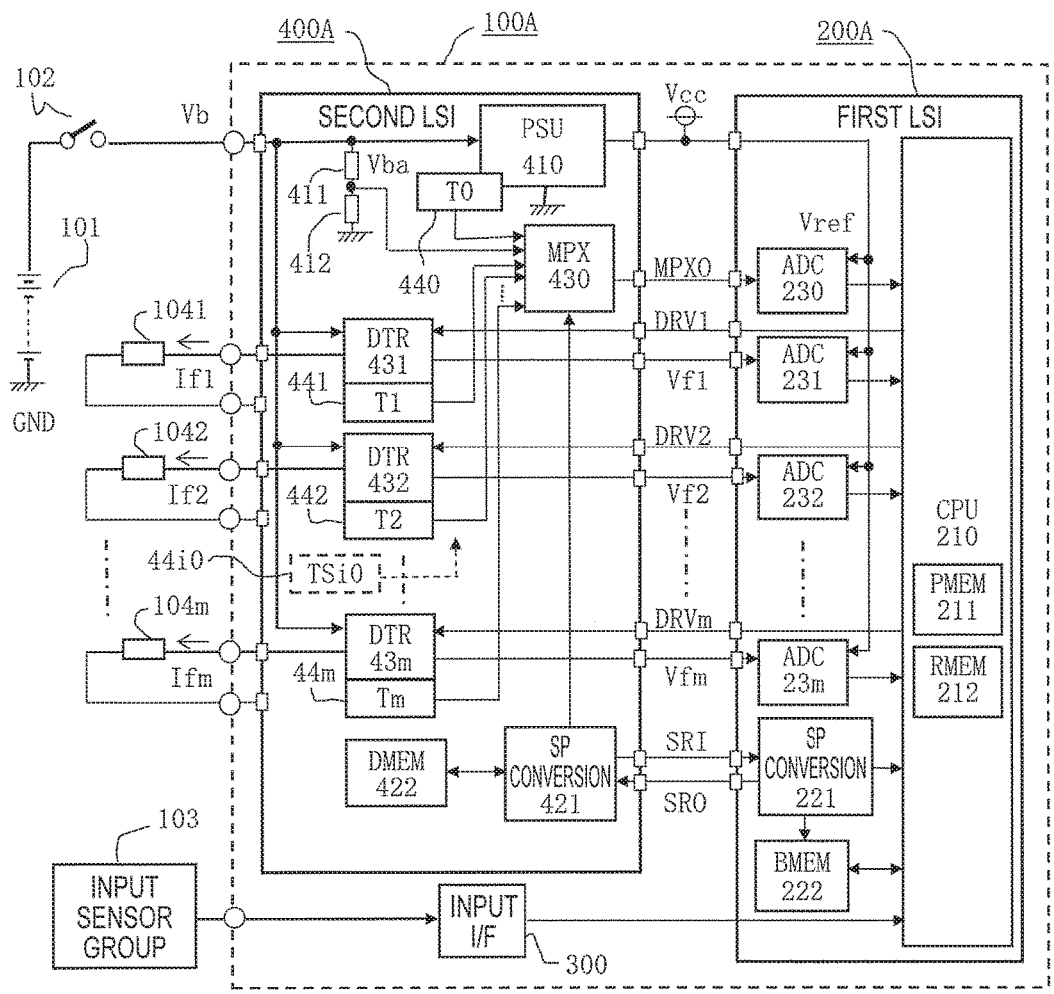
FIG. 1 is an overall circuit block diagram of a power supply control device according to a first embodiment of this invention.

First, in FIG. 1, a power supply control device 100A supplies a variable load current Ifi to each of a plurality of inductive loads 104i (i=1, 2, . . . m; likewise hereafter) that are formed from linear solenoids provided in a plurality of hydraulic solenoid valves used in an automobile transmission, for example, to select gear positions. The power supply control device 100A is configured such that a power supply voltage Vb is applied thereto from a DC power supply 101 serving as an in-vehicle battery via an output contact 102 of a power relay that is biased when a power switch, not shown in the drawings, is closed.

The power supply control device 100A is constituted by a first integrated circuit element 200A that has a microprocessor 210 as a main body, and a second integrated circuit element 400A that has drive circuit portions 43i for supplying power to the respective inductive loads 104i as a main body and includes a constant voltage power supply 410. A control voltage Vcc, which is a stabilized voltage of DC 5 V, for example, is applied to the microprocessor 210 via the constant voltage power supply 410.

The first integrated circuit element 200A and the second integrated circuit element 400A are connected in series by a pair of serial-to-parallel converters constituted by a master station serial-to-parallel converter 221 and a slave station serial-to-parallel converter 441, the first integrated circuit element 200A serving as a master side and the second integrated circuit element 400A serving as a slave side, such that data are exchanged between a master side volatile buffer memory 222 and a slave side non-volatile data memory 422. Further, the first integrated circuit element 200A includes a non-volatile program memory 211 that cooperates with the microprocessor 210, and a RAM memory 212 used for calculation processing.

Note that an input interface circuit 300 connects analog or ON-OFF operation input signals obtained from an input sensor group 103 including, for example, a gear shift sensor that responds to a selection position of a gear shift lever, an engine rotation sensor, a vehicle speed sensor, an accelerator position sensor that detects a depression amount of an accelerator pedal, and so on to an input port of the microprocessor 210.

The microprocessor 210 determines a gear position in accordance with the selection position of the gear shift lever, the depression amount of the accelerator pedal, and the vehicle speed, sets target currents Iti, to be described below using FIG. 2, in relation to a part of the plurality of inductive loads 104i in accordance with the determined gear position, and generates open/close command signals DRVi constituted by pulse width modulation signals for the drive circuit portions 43i.

Current detection voltages Vfi generated by the drive circuit portions 43i are input into the first integrated circuit element 200A, whereupon these analog signal voltages are digitally converted by AD converters 23i and input into the microprocessor 210. Further, a selected analog signal MPX0 selected by a multiplexer 430, to be described below, is digitally converted by a master side AD converter 230 and input into the microprocessor 210.

Note that the control voltage Vcc generated by the constant voltage power supply 410 is used as an AD reference voltage Vref of the respective AD converters 230, 23i, and a digital conversion value of an input signal voltage input into the AD converter is in inverse proportion to the value of the AD reference voltage Vref. Hence, when the input signal voltage is equal to the AD reference voltage Vref, a predetermined maximum digital value determined by the resolution of the AD converter is obtained.

A power supply temperature detection element 440 is provided in the constant voltage power supply 410 of the second integrated circuit element 400A, and a temperature detection voltage T0 thereof is input into the multiplexer 430. Further, the power supply voltage Vb is divided by voltage dividing resistors 411, 412 and connected to another input terminal of the multiplexer 430 as a power supply detection voltage Vba.

Each drive circuit portion 43$i$ of the second integrated circuit element 400A generates a current detection voltage Vfi by amplifying an end-to-end voltage of a current detection resistor 50$i$, to be described below using FIG. 2. Further, a resistor temperature detection element 44$i$ is provided in the drive circuit portion 43$i$ to detect a temperature in the vicinity of each current detection resistor 50$i$, and temperature detection voltages Ti of the resistor temperature detection elements 44$i$ are respectively connected to different input terminals of the multiplexer 430.

Note that either the resistor temperature detection element 44$i$ is disposed for each current detection resistor 50$i$, or a first resistor temperature detection element 441 is provided in an intermediate position between a first current detection resistor 501 and a second current detection resistor 502 so as to represent both thereof, a third resistor temperature detection element 443 is provided in an intermediate position between a third current detection resistor 503 and a fourth current detection resistor 504 so as to represent both thereof, and a fifth resistor temperature detection element 445 is provided in an intermediate position between a fifth current detection resistor 505 and a sixth current detection resistor 506 so as to represent both thereof. Alternatively, when the current detection resistors 50$i$ are disposed in a dense arrangement, the respective current detection resistors 50$i$ may be represented by a single representative temperature detection element 44$i$0.

The multiplexer 430 selects a single analog input signal in accordance with downlink control data SRO obtained by the microprocessor 210 from the slave station serial-to-parallel converter 421, and transmits the selected analog input signal to the first integrated circuit element 200A as the selected analog signal MPX0.

Note that a slave side multichannel AD converter (see FIG. 11) may be provided instead of the multiplexer 430, and a digital conversion value thereof may be transmitted to the microprocessor 210 via the serial-to-parallel converters 421, 221. In both cases, it is possible to realize means for transmitting temperature detection voltages T0, Ti, Ti0 and the power supply detection voltage Vba as uplink monitoring data SRI to the master side using a small number of wires.

The uplink monitoring data SRI are used by the microprocessor 210 to control the load currents Ifi with a high degree of precision, and importantly, high-speed responsiveness is not required with respect to negative feedback control.

Note that all or a part of first to fifth correction coefficients Ki1 to Ki5 calculated by an adjustment tool 900A (see FIG. 5), to be described below, are written in advance to the non-volatile data memory 422. In addition, an electric load group including, for example, a hydraulic pump, a forward/reverse selection hydraulic solenoid valve, and so on is connected to an output port of the microprocessor 210 via an output interface circuit, not shown in the drawings.

Next, configurations shown in FIG. 2, which is a block diagram illustrating control implemented by the microprocessor 210 on the load current Ifi and a detailed circuit block diagram illustrating the drive circuit portion 43$i$ and the constant voltage power supply 410 of the second integrated circuit element 400A, will be described in detail.

Figure 2:
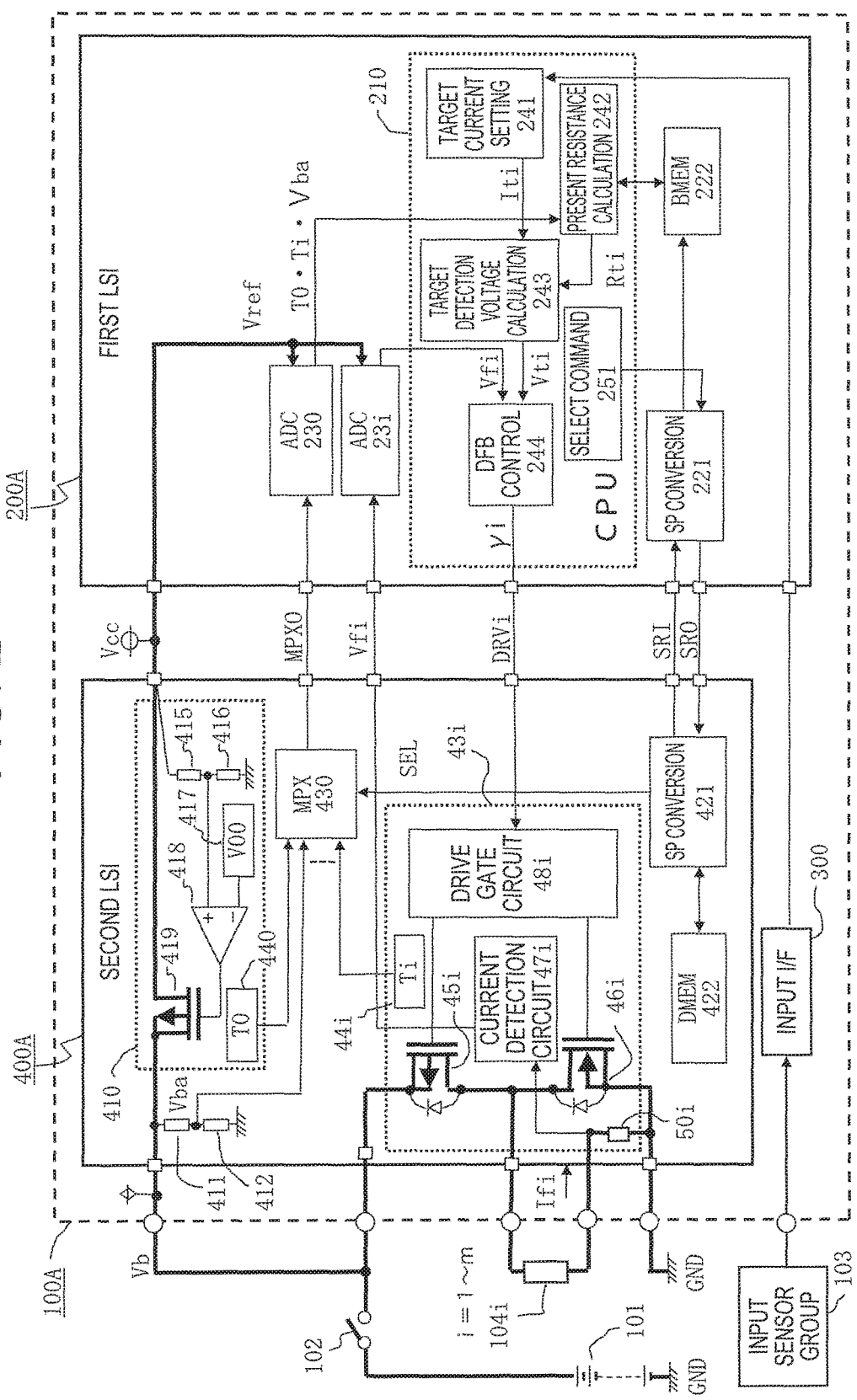
FIG. 2 is a detailed circuit block diagram relating to a power supply circuit portion of the power supply control device shown in FIG. 1.

In FIG. 2, the constant voltage power supply 410 generates the control voltage Vcc, which is a stabilized voltage of DC 5 V, for example, that is stepped down from the power supply voltage Vb, by controlling a conduction condition of a serial open/close element 419. Further, a comparison circuit 418 compares a divided voltage obtained by dividing the control voltage Vcc using voltage dividing resistors 415, 416 with a reference voltage V00 generated from a power supply reference voltage 417, and implements negative feedback control such that when the control voltage Vcc exceeds DC 5 V, the serial open/close element 419 opens.

The drive circuit portion 43$i$ includes a driving open/close element 45$i$ connected in series to the inductive load 104$i$, and a commutation circuit element 46$i$ connected in parallel to a series circuit formed by the inductive load 104$i$ and the current detection resistor 50$i$. A duty factor γi=ON time/ON-OFF period of the driving open/close element 45$i$ is controlled via a drive gate circuit 48$i$ that operates in response to an open/close command signal DRVi generated by the first integrated circuit element 200A, and when the driving open/close element 45$i$ is open, the commutation circuit element 46$i$ closes, whereby the load current Ifi is commuted.

The current detection resistor 50$i$ is connected to a position downstream (shown) or upstream (not shown) of the inductive load 104$i$, and is configured to generate the current detection voltage Vfi when an end-to-end voltage thereof is amplified by a current detection circuit 47$i$.

Note that P-channel and N-channel field effect transistors connected to each other in series are used as the commutation circuit element 46$i$ and the driving open/close element 45$i$, and when the driving open/close element 45$i$ is connected to a position upstream of the inductive load 104$i$, as shown in FIG. 2, a cathode terminal of an internal parasitic diode thereof is connected to an anode terminal of an internal parasitic diode of the commutation circuit element 46$i$, which is connected to a position upstream of the inductive load 104$i$.

In a case where the driving open/close element 45$i$ is an N-channel field effect transistor connected to a position downstream of the inductive load 104$i$ and the commutation circuit element 46$i$ is a P-channel field effect transistor connected to a position upstream of the inductive load 104$i$, however, an anode terminal of the internal parasitic diode of the driving open/close element 45$i$ is connected to a cathode terminal of the internal parasitic diode of the commutation circuit element 46$i$ connected to a position upstream of the inductive load 104$i$. In both cases, the drive gate circuit 48$i$ stops driving the commutation circuit element 46$i$ before driving the driving open/close element 45$i$ to close, and drives the commutation circuit element 46$i$ to close after stopping driving the driving open/close element 45$i$ to close. Thus, the commutation circuit element 46$i$ is driven in an identical conduction direction to the conduction direction of the internal parasitic diode thereof.

In the first integrated circuit element 200A, the program memory 211 that cooperates with the microprocessor 210 includes a control program that serves as target current setting means 241, present resistance calculating means 242, target detection voltage calculating means 243, negative feedback control means 244, and selection command issuing means 251.

In a case where the inductive load 104$i$ is a linear solenoid provided for a proportional solenoid valve used during oil pressure control, the target current setting means 241 determines a target current Iti by referring to oil pressure-to-current characteristic data in which a required oil pressure is associated with a corresponding excitation current to be applied to the linear solenoid.

The present resistance calculating means 242 calculates a present resistance Rti by reading correction coefficients Ki1 to Ki4 or correction coefficients Ki1 to Ki5, to be described below, which are stored in advance in the data memory 422 of the second integrated circuit element 400A, and then synthesizing the temperature detection voltages T0, Ti (or Ti0) and the power supply detection voltage Vba, transmitted from the multiplexer 430.

The target detection voltage calculating means 243 calculates a target detection voltage Vti=Rti×Iti by multiplying the present resistance Rti calculated by the present resistance calculating means 242 by the target current Iti set by the target current setting means 241.

The negative feedback control means 244 digitally compares a digital value obtained by digitally converting the value of the current detection voltage Vfi generated by the current detection circuit 47$i$ using the AD converter 23$i$ with the target detection voltage Vti, and generates the open/close command signal DRVi having the energization duty γi so that the digital value and the target detection voltage Vti match.

The selection command issuing means 251 acts on the multiplexer 430 of the second integrated circuit element 400A via the pair of serial-to-parallel converters 221, 421 to specify the temperature detection voltages T0, Ti (or Ti0) and the power supply detection voltage Vba in succession, whereupon the selected analog signal MPX0 serving as the output signal of the multiplexer 430 is input into the microprocessor 210 via the master side AD converter 230.

Note that the selection command is not dependent on the pair of serial-to-parallel converters 221, 421, and the selection control may be implemented via a 4-bit dedicated digital signal circuit, for example.

(2) Detailed Description of Actions and Operations

Actions and operations of the power supply control device according to the first embodiment, configured as shown in FIGS. 1 and 2, will now be described in detail on the basis of characteristic diagrams shown in FIGS. 3A to 3D and a flowchart shown in FIG. 4.

First, in FIGS. 1 and 2, when a power switch, not shown in the drawings, is closed, the output contact 102 of the power relay is closed, whereby the power supply voltage Vb is applied to the power supply control device 100A.

As a result, the constant voltage power supply 410 generates the control voltage Vcc, which is a stabilized voltage of DC 5 V, for example, whereupon the microprocessor 210 forming the first integrated circuit element 200A starts to implement a control operation.

The microprocessor 210 generates a load driving command signal to be transmitted to the electric load group, not shown in the drawings, connected to the output interface circuit, not shown in the drawings, in accordance with the operating condition of the input sensor group 103, which is input through the input interface circuit 300, and the content of the control program stored in the non-volatile program memory 211, and implements ON-OFF control on the plurality of inductive loads 104$i$, which serve as specific electric loads of the electric load group, via the driving open/close elements 45$i$ in order to control energization currents thereof.

Next, sites that cause control errors during the current control will be extracted from FIGS. 1 and 2 and described using characteristic diagrams thereof shown in FIGS. 3A to 3D.

Figure 3A:
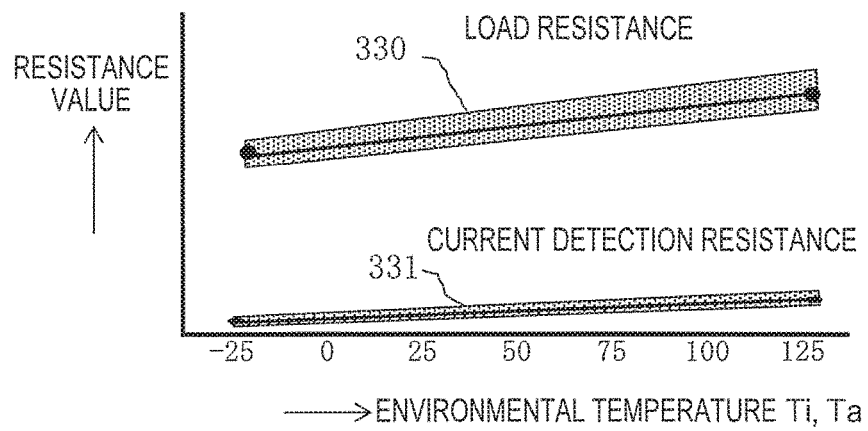
FIG. 3A is a characteristic diagram showing an environmental temperature relative to a current detection resistance and a load resistance in the power supply control device shown in FIG. 1.

In FIG. 3A, a reference numeral 330 indicates a characteristic of an environmental temperature Ta relative to a resistance value of the inductive load 104$i$, which is illustrated in the form a strip that includes individual variation among the plurality of inductive loads 104$i$.

Further, a reference numeral 331 indicates a characteristic of an environmental temperature (an environmental temperature measured by the resistor temperature detection element 44$i$) relative to a resistance value of the current detection resistor 50$i$, which is illustrated in the form a strip that includes individual variation among the plurality of current detection resistors 50$i$.

Note that medium-precision resistors in which individual variation in the resistance value in a normal temperature environment is limited to or below a predetermined value are applied as the current detection resistors 50$i$, but the precision thereof with respect to variation in the temperature characteristic is low, and when resistors exhibiting a high degree of precision with regard to both the resistance value and the temperature characteristic are used, the cost of the resistors increases dramatically.

Figure 3B:
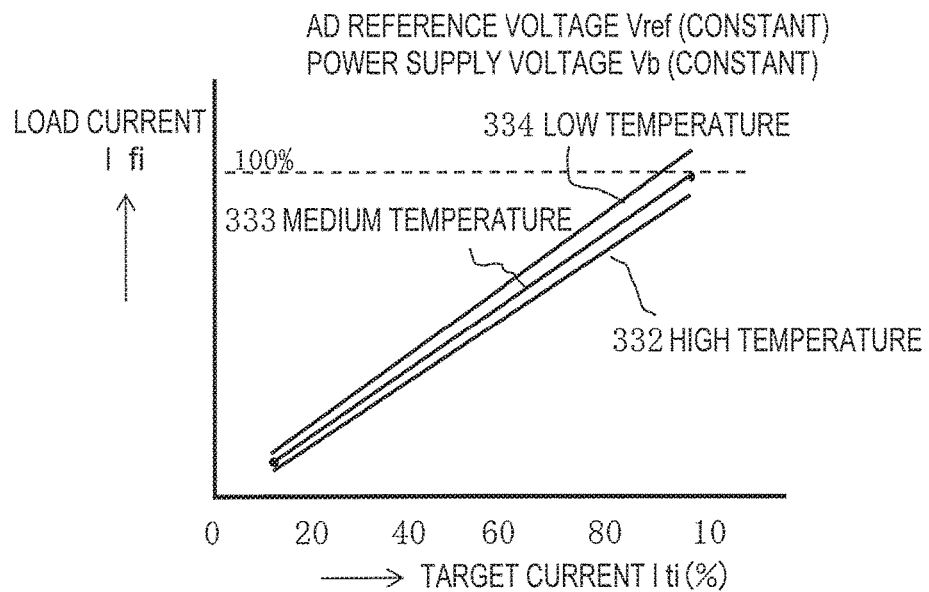
FIG. 3B is a characteristic diagram showing a target current relative to a load current when error correction is not implemented in the power supply control device shown in FIG. 1.

In FIG. 3B, reference numerals 332, 333, and 334 indicate characteristics of the load current Ifi relative to the target current Iti when variation in the resistance values of the current detection resistors 50$i$ is assumed to be the only cause of an error during the current control and the error is not corrected. In a high-temperature environment, the load current Ifi is smaller than the target current Iti, and in a low temperature environment, the load current Ifi is larger than the target current Iti.

Figure 3C:
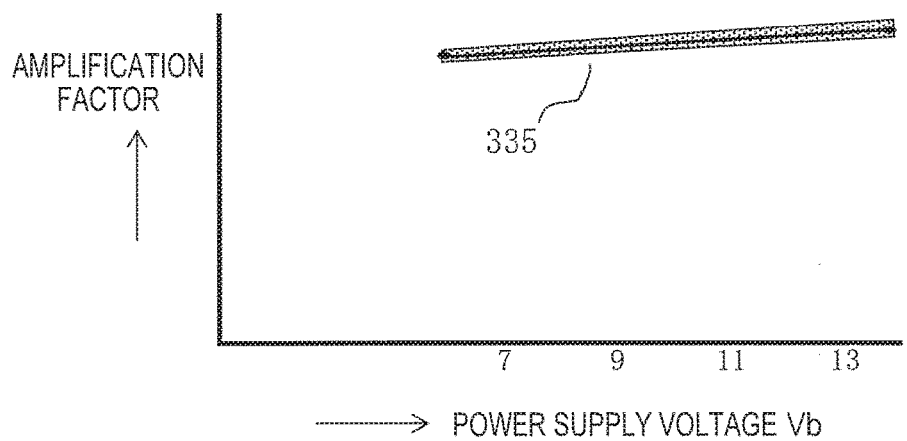
FIG. 3C is a characteristic diagram showing a power supply voltage relative to an amplification factor in a current detection circuit of the power supply control device shown in FIG. 1.

In FIG. 3C, a reference numeral 335 denotes a variation characteristic of the power supply voltage relative to the current amplification factor in a case where the current detection resistor 50$i$ is connected to a position upstream of the inductive load 104$i$ and the current detection circuit 47$i$ is constituted by a differential amplifier, the characteristic being illustrated in the form a strip that includes individual variation among the plurality of current detection circuits 47$i$.

In this case, a proportional error component and an offset error are included, the proportional error component being based on variation in a division ratio of voltage dividing circuits connected to positive and negative input terminals of the differential amplifier, and the offset error being based on a bias correction voltage for ensuring that an output voltage of the differential amplifier does not become negative.

Figure 3D:
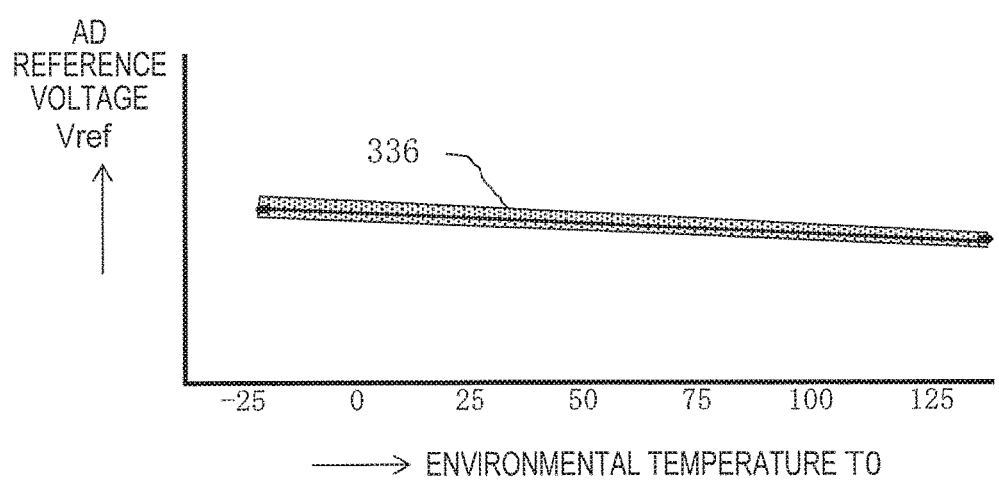
FIG. 3D is a characteristic diagram showing the environmental temperature relative to a reference voltage in the power supply control device shown in FIG. 1.

In FIG. 3D, a reference numeral 336 indicates a characteristic of an environmental temperature (an environmental temperature measured by the power supply temperature detection element 440) of the constant voltage power supply 410 relative to the AD reference voltage Vref, i.e. the control voltage Vcc generated by the constant voltage power supply 410, which is illustrated in the form a strip that includes individual variation among a plurality of constant voltage power supplies 410.

Note that the current detection voltage Vfi is obtained by amplifying the end-to-end voltage of the current detection resistor 50$i$ using an amplifier provided on the current detection circuit 47$i$, and the control voltage Vcc generated by the constant voltage power supply 410 is used in the master side AD converter 230, 23$i$ as the AD reference voltage Vref such that when the analog input signal voltage matches the AD reference voltage Vref, a full scale digital output determined by the resolution of the AD converters is generated.

Hence, when the AD reference voltage Vref varies, the digital conversion value of the analog signal voltage varies in inverse proportion thereto.

A plurality of coefficients constituted by all or a part of first to fourth correction coefficients Ki1 to Ki4 indicated in formula (1a) are stored in the data memory 422 of the second integrated circuit element 400A as control characteristic correction data in order to calculate the present resistance Rti of a converted equivalent resistance that is obtained by dividing the digital conversion value of the current detection voltage Vfi by the load current Ifi.

$$Rti = (ki1 \times Ti + ki2 \times T0 + ki3 \times Vba + ki4) \times G0 \times R0 = \qquad (1a)$$

$$Ki1 \times Ti + Ki2 \times T0 + Ki3 \times Vba + Ki4$$

In formula (1a), R0 denotes a design reference resistance of the current detection resistor 50$i$ at a reference environmental temperature, G0 denotes a designed reference value of the amplification factor of the current detection circuit 47$i$, a constant ki1 is a correction coefficient for correcting the temperature detection voltage Ti generated by the resistor temperature detection element 44$i$, a constant ki2 is a correction coefficient for correcting the temperature detection voltage T0 generated by the power supply temperature detection element 440, a constant ki3 is a correction coefficient for correcting a common voltage error generated by the current detection circuit 47$i$ when the current detection resistor 50$i$ is connected to a position upstream of the inductive load 104$i$, and a constant ki4 denotes another offset error component.

The present resistance Rti indicated in formula (1a) is converted into an amplified value by the current detection circuit 47$i$, and in the first embodiment, the digital conversion value of the current detection voltage Vfi is obtained by multiplying the present resistance Rti by the load current Ifi.

The present resistance calculating means 242 then calculates, by estimation, the present resistance Rti from formula (1a) by reading all or a part of a present value of the temperature detection voltage Ti generated by the resistor temperature detection element 44$i$, a present value of the temperature detection voltage T0 generated by the power supply temperature detection element 440, and a present value of the power supply detection voltage Vba, and applying all or a part of the first to fourth correction coefficients Ki1 to Ki4 thereto.

Note that a method of calculating the first to fifth correction coefficients Ki1 to Ki5 stored in the data memory 422 will be described below using FIGS. 5 and 6, but in a case where the plurality of current detection resistors 50$i$ are disposed in a dense arrangement such that the resistor temperature detection elements 44$i$ are constituted by the single representative temperature detection element 44$i$0 that generates the temperature detection voltage Ti0 representing the present temperatures of all of the current detection resistors 50$i$, the temperature detection voltage Ti applied to the respective current detection resistors 50$i$ in formula (1 a) is calculated using formula (2), to which a constant ki5 set in consideration of heat generation caused by the load current Ifi is applied.

$$Ti = Ti0 + ki5 \times Ifi^2 \qquad (2)$$

Accordingly, the present resistance Rti is calculated using formula (3a), which is obtained by inserting formula (2) into formula (1a).

$$Rti = [ki1 \times (Ti0 + ki5 \times Ifi^2) + ki2 \times T0 + ki3 \times Vba + ki4] \times G0 \times \qquad (3a)$$

$$R0 = Ki1 \times Ti0 + Ki2 \times T0 + Ki3 \times Vba + Ki4 + Ki5 \times Ifi^2$$

where Ki5=ki1×ki5×G0×R0

The present resistance calculating means 242 then calculates, by estimation, the present resistance Rti from formula (4a) by reading all or a part of the present value of the temperature detection voltage Ti0 generated by the representative temperature detection element 44$i$0, the present value of the temperature detection voltage T0 generated by the power supply temperature detection element 440, and the present value of the power supply detection voltage Vba, and applying all or a part of the first to fifth correction coefficients Ki1 to Ki5 thereto. In formula (4a), instead of the load current Ifi used in formula (3a), the target current Iti approximating the load current Ifi is applied.

$$Rti = Ki1 \times Ti0 + Ki2 \times T0 + Ki3 \times Vba + Ki4 + Ki5 \times Ifi^2 \qquad (4a)$$

Next, FIG. 4, which is a flowchart illustrating operations of the first integrated circuit element 200A and the second integrated circuit element 400A, will be described.

Figure 4:
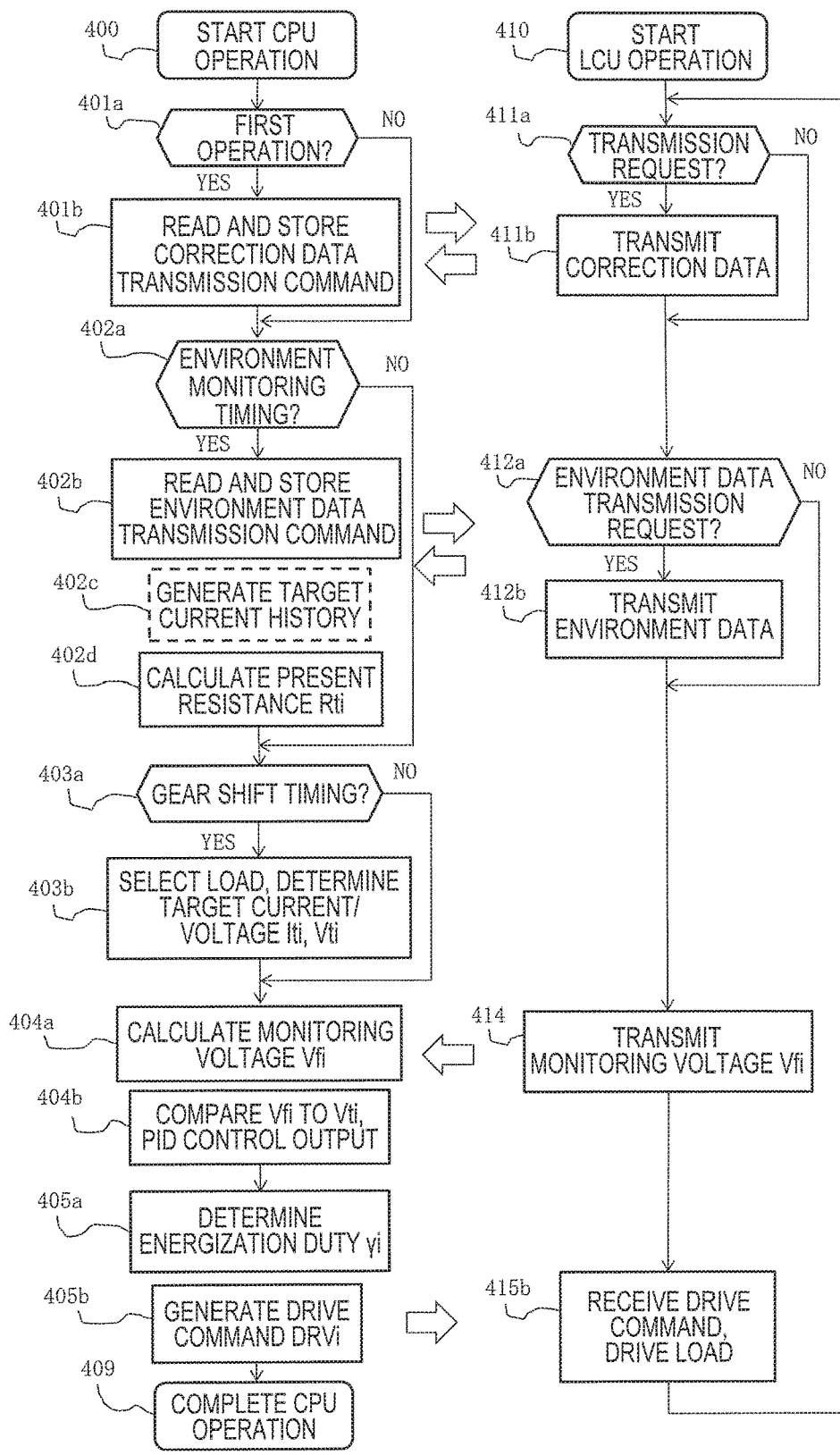
FIG. 4 is a flowchart illustrating operations of a first integrated circuit element and a second integrated circuit element of the power supply control device shown in FIG. 1.

In FIG. 4, step 400 is a step for activating the microprocessor 210, and step 410 is a step for starting operations on an equivalent flowchart illustrating control operations executed by the second integrated circuit element 400A, which is constituted by a logic circuit.

Step 401$a$ following step 400 is a determination step for determining whether or not this is the first operation following activation of the microprocessor 210. When this is the first operation, the determination is affirmative, and the routine advances to step 401$b$. When this is not the first operation, the determination is negative, and the routine advances to step 402$a$.

In step 401$b$, a command to transmit the correction data stored in the data memory 422 is issued to the second integrated circuit element 400A, and the obtained correction data are read to and stored in the buffer memory 222, whereupon the routine advances to step 402$a$.

Step 411$a$ following step 410 is a determination step for determining whether or not a transmission request has been issued by the microprocessor 210. When a transmission request has been issued, the determination is affirmative, and the routine advances to step 411$b$. When a transmission request has not been issued, the determination is negative, and the routine advances to step 412$a$.

In step 411$b$, the correction data stored in the data memory 422 are transmitted, whereupon the routine advances to step 412$a$.

Step 402$a$ is a determination step for determining whether or not a timing for reading environment data transmitted from the multiplexer 430 has arrived. An affirmative determination is obtained at period intervals of 100 msec, for example, in which case the routine advances to step 402$b$. When the reading timing has not arrived, a negative determination is obtained, and the routine advances to step 403$a$.

In step 402$b$, a command is issued to the second integrated circuit element 400A to transmit environment data such as the temperature detection voltages T0, Ti (or Ti0) and the power supply detection voltage Vba in succession, whereupon the routine advances to step 402$c$.

In step 402$c$, history information relating to the target current Iti is generated by successively storing values of the target currents Iti generated in step 403$b$, to be described below, in a shift register constituted by the RAM memory 212, whereupon the routine advances to step 402$d$. When step 402$c$ is applied to a case in which the representative temperature detection element 44i0 is used instead of the individual resistor temperature detection elements 44i, the history information relating to the target current Iti is a square value of the target current Iti over a most recent time period, corresponding to an average thermal time constant of the current detection resistors 50i.

In step 412a, an affirmative determination is obtained upon reception of the environment data transmission command issued in step 402b, whereupon the routine advances to step 412b. When a transmission command has not been issued, a negative determination is obtained, whereupon the routine advances to step 414.

In step 412b, the environment data are transmitted, whereupon the routine advances to step 414. In step 414, the current detection voltage Vfi is transmitted, whereupon the routine advances to step 415b.

In step 402d, the present resistance Rti is calculated from either formula (1a) or formula (4a), whereupon the routine advances to step 403a.

Note that in formula (1a), the first to fourth correction coefficients Ki1 to Ki4 serve as the correction data read from the data memory 422, while the temperature detection voltages T0, Ti and the power supply detection voltage Vba serve as the environment data read and stored in step 402b.

Further, in formula (4a), the first to fifth correction coefficients Kit to Ki5 serve as the correction data read from the data memory 422, the temperature detection voltages T0, Ti and the power supply detection voltage Vba serve as the environment data read and stored in step 402b, and the mean square value of the history information generated in step 402c is used as the target current Iti.

Step 403a is a determination step for determining whether or not a timing for switching the power supply to the plurality of inductive loads 104i has arrived. When the switching timing has arrived, the determination is affirmative, and the routine advances to step 403b. When the switching timing has not arrived, the determination is negative, and the routine advances to step 404a.

In step 403b, the target current Iti of the inductive load 104i selected for power supply is determined, and the target detection voltage Vti is generated by multiplying the target current Iti by the present resistance Rti calculated in step 402d. The routine then advances to step 404a.

In step 404a, the current detection voltage Vfi transmitted in step 414 is read and stored, whereupon the routine advances to step 404b.

In step 404b, the current detection voltage Vfi read in step 404a is compared with the target detection voltage Vti set in step 403b, and a PID control output is generated in relation to a deviation therebetween. The routine then advances to step 405a.

In step 405a, the energization duty γ1 to be applied to the driving open/close element 45i is determined in accordance with the PID control output generated in step 404b. Next, in step 405b, when a period of the pulse width modulation signal is set as T, the drive command signal DRVi is generated such that a closed period Ton thereof=γ1×T, whereupon the routine advances to step 409, in which the operation is completed.

In step 409, another control program is executed, whereupon the routine returns to step 400, i.e. the start of the operation. Thereafter, the same control program is executed repeatedly.

Note that the second integrated circuit element 400A is configured to drive the driving open/close element 45i and the commutation circuit element 46i ON and OFF via the drive gate circuit 48i in step 415b, and then return to step 411a. Moreover, normally, the second integrated circuit element 400A executes step 414 and step 415b repeatedly.

Further, with respect to the plurality of inductive loads 104i (i=1, 2, ..., m), i (=1 to m) iterative operations are implemented in steps 402a to 402d, i (=1 to m) iterative operations are implemented in step 403b, and i (=1 to m) iterative operations are implemented in steps 404a to 405b.

(3) Detailed Description of Correction Data Generation Method

The power feeding control device according to the first embodiment, configured as shown in FIGS. 1 and 2, will be described in detail below using FIG. 5, which is a view showing an overall configuration of the adjustment tool used to generate the correction data, and FIG. 6, which is a flowchart illustrating an operation of the adjustment tool.

Figure 5:
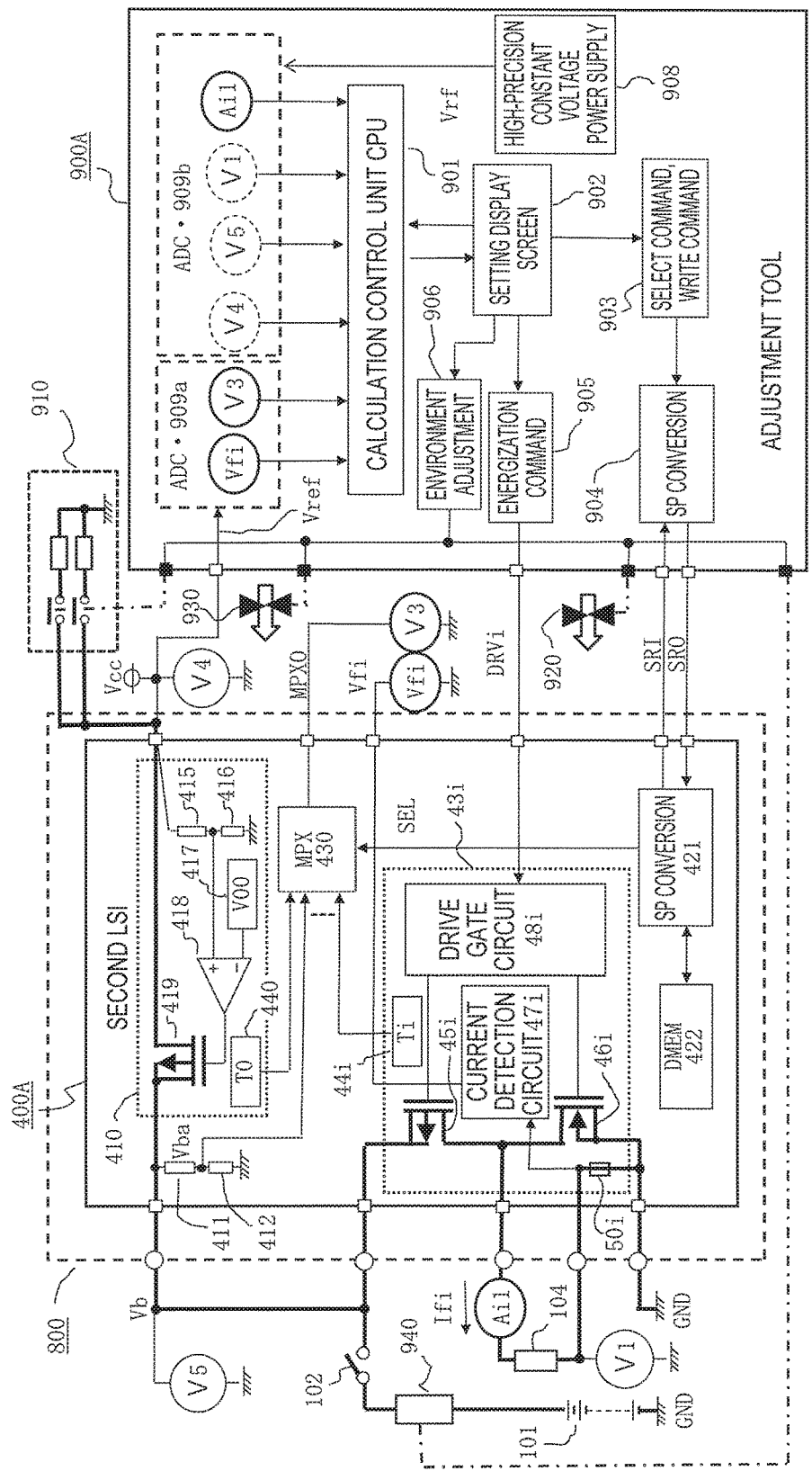
FIG. 5 is a view showing an overall configuration of an adjustment tool applied to the power supply control device shown in FIG. 1.

In FIG. 5, the single second integrated circuit element 400A is mounted detachably on an adjustment board 800 via a socket, not shown in the drawing.

A DC power supply 101 is connected to the adjustment board 800 via a voltage regulator 940 in order to supply power to the second integrated circuit element 400A, and the second integrated circuit element supplies the load current Ifi to a series circuit formed from an ammeter Ai1 and a standard sample load 104. Further, a dummy load resistor 910 is connected to an output circuit of the constant voltage power supply 410 provided in the second integrated circuit element.

The adjustment tool 900A, which is constituted by a programmable controller, for example, includes a calculation control unit 901, a setting display unit 902, a select/write command issuing unit 903, a master station side serial-to-parallel converter 904 connected in series to the slave station side serial-to-parallel converter 421 provided in the second integrated circuit element 400A, an energization command issuing unit 905 for generating the pulse width modulation signal in the form of the open/close command signal DRVi in the drive gate circuit 48i, a first AD converter 909a and a second AD converter 909b into which present values of correction parameters generated by the second integrated circuit element 400A are input, and an environment adjustment unit 906.

The first AD converter 909a operates using the control voltage Vcc generated by the second integrated circuit element 400A as the AD reference voltage Vref so as to digitally convert analog signal voltages Vfi, V3 obtained when the second integrated circuit element transmits the present values of the correction parameters as analog signals and input the results into the calculation control unit 901.

Note that the analog signal voltage Vfi corresponds to the current detection voltage Vfi, while the analog signal voltage V3 is a signal voltage relating to the environment data output by the multiplexer 430, including the temperature detection voltages T0, Ti (or Ti0) or the power supply detection voltage Vba.

The second AD converter 909b is applied in a case where the ammeter Ai1 is configured to generate an analog signal voltage, and operates using a stabilized voltage generated by a high-precision constant voltage power supply 908 as an AD reference voltage Vrf so as to digitally convert the measured value of the load current Ifi and input the result into the calculation control unit 901.

The AD reference voltage Vrf applied to the second AD converter 909b is more precise than the AD reference voltage Vref applied to the first AD converter 909a, and in a case where the ammeter Ai1 generates a measured value in the form of a digital signal voltage, a digital measurement value thereof is input as is into the calculation control unit 901, thereby eliminating the need for the second AD converter 909b.

The environment adjustment unit 906 is operated from the calculation control unit 901 via the setting display unit 902 to generate a command to modify the resistance value of the dummy load resistor 910, a command to modify an output voltage output to the voltage regulator 940, and a command to modify the environmental temperature of the constant voltage power supply 410 provided in the second integrated circuit element 400A and the environmental temperature of the current detection resistor 50i.

The calculation control unit 901 reads the temperature detection voltage Ti generated by the resistor temperature detection element 44i or the temperature detection voltage Ti0 generated by the representative temperature detection element 44i0, the temperature detection voltage T0 generated by the power supply temperature detection element 440, the power supply detection voltage Vba, the value of the current detection voltage Vfi, and the value of the load current Ifi measured by the ammeter Ai1 from formula (1b) or formula (3b), to be described below, as present values of the correction parameters, creates four, five, or more simultaneous equations having the first to fourth correction coefficients Ki1 to Ki4 or the first to fifth correction coefficients Ki1 to Ki5 as unknowns for each current detection resistor 50i, and calculates the first to fourth correction coefficients Ki1 to Ki4 or the first to fifth correction coefficients Ki1 to Ki5 using the method of least squares.

Note that in the first embodiment, the digital conversion value of the current detection voltage Vfi includes an AD conversion error (in other words, a variation error in the AD reference voltage Vref) generated by the first AD converter 909a, and therefore the present resistance Rti, which is obtained by dividing the current detection voltage Vfi by the load current Ifi that is measured with a high degree of precision, is based on a digital value.

The select/write command issuing unit 903 transmits address information specifying the individual types of the correction parameters transmitted from the second integrated circuit element 400A via the pair of serial-to-parallel converters 904, 421, and transfers the first to fourth correction coefficients Ki1 to Ki4 or the first to fifth correction coefficients Ki1 to Ki5 calculated by the calculation control unit 901 to the second integrated circuit element 400A as correction coefficients for the respective current detection resistors 50i, whereupon the correction coefficients are stored in the data memory 422.

Note that the environmental temperatures of the plurality of current detection resistors 50i are adjusted by having the energization command issuing unit 905 generate the pulse width modulation signals DRVi to be applied to the plurality of driving open/close elements 45i all at once, setting the energization duties thereof as large or small or as large, medium, or small, increasing or reducing the load current Ifi of the standard sample load 104, and then ejecting cold air or warm air onto the plurality of current detection resistors 50i all at once via a first airflow adjustment solenoid valve 920 and an ejection nozzle in order to adjust the temperatures thereof rapidly in a plurality of stages, namely high and low or high, medium, and low.

Further, the environmental temperature of the constant voltage power supply 410 is adjusted by modifying a resistance value of the dummy load resistor 910 so as to increase or reduce an output current applied to the constant voltage power supply, and then ejecting cold air or warm air onto the constant voltage power supply via a second airflow adjustment solenoid valve 930 and an ejection nozzle in order to adjust the temperature thereof rapidly in a plurality of stages, namely high and low or high, medium, and low.

Values set in advance by experiment are applied in accordance with target temperatures as respective magnitudes of the load currents Ifi or the output current applied to the plurality of current detection resistors 50i or the constant voltage power supply 410, and an appropriate flow rate for the airflow generated by the first airflow adjustment solenoid valve 920 or the second airflow adjustment solenoid valve 930.

A first voltmeter V1 for measuring the end-to-end voltage of at least one of the plurality of current detection resistors 50i, a fifth voltmeter V5 for measuring the power supply voltage Vb of the constant voltage power supply 410, and a fourth voltmeter V4 for measuring the value of the control voltage Vcc that is constituted by a stabilized output voltage are connected to the adjustment board 800, and either analog signal voltages thereof are input into the calculation control unit 901 of the adjustment tool 900A via the second AD converter 909b, or digital measurement values thereof are input into the calculation control unit 901.

The adjustment tool 900A is configured to be capable of calculating a resistance value R1 relating to one of the current detection resistors 50i by dividing the measurement value obtained by the first voltmeter V1 by the current measured by the load current meter Ai1, calculating the present resistance Rti by dividing the current detection voltage Vfi by the current measured by the load current meter Ai1, comparing the resistance value R1 with the present resistance Rti, and generating monitoring data relating to variation in the resistance value R1 and variation in the present resistance Rti.

The adjustment tool 900A is also configured to be capable of comparing the measurement value obtained by the fifth voltmeter V5, the value of the environment monitoring voltage V3 applied to the power supply detection voltage Vba, which is a divided voltage obtained by dividing the power supply voltage Vb, and the measurement value obtained by the fourth voltmeter V4, and generating monitoring data relating to the presence of an abnormality in the constant voltage power supply 410, the presence of an abnormality in the power supply detection voltage Vba, and variation in the measurement values.

As a result, variation among a plurality of products can be monitored, and lot management can be performed in accordance with the presence or absence of defective products.

Figure 6:
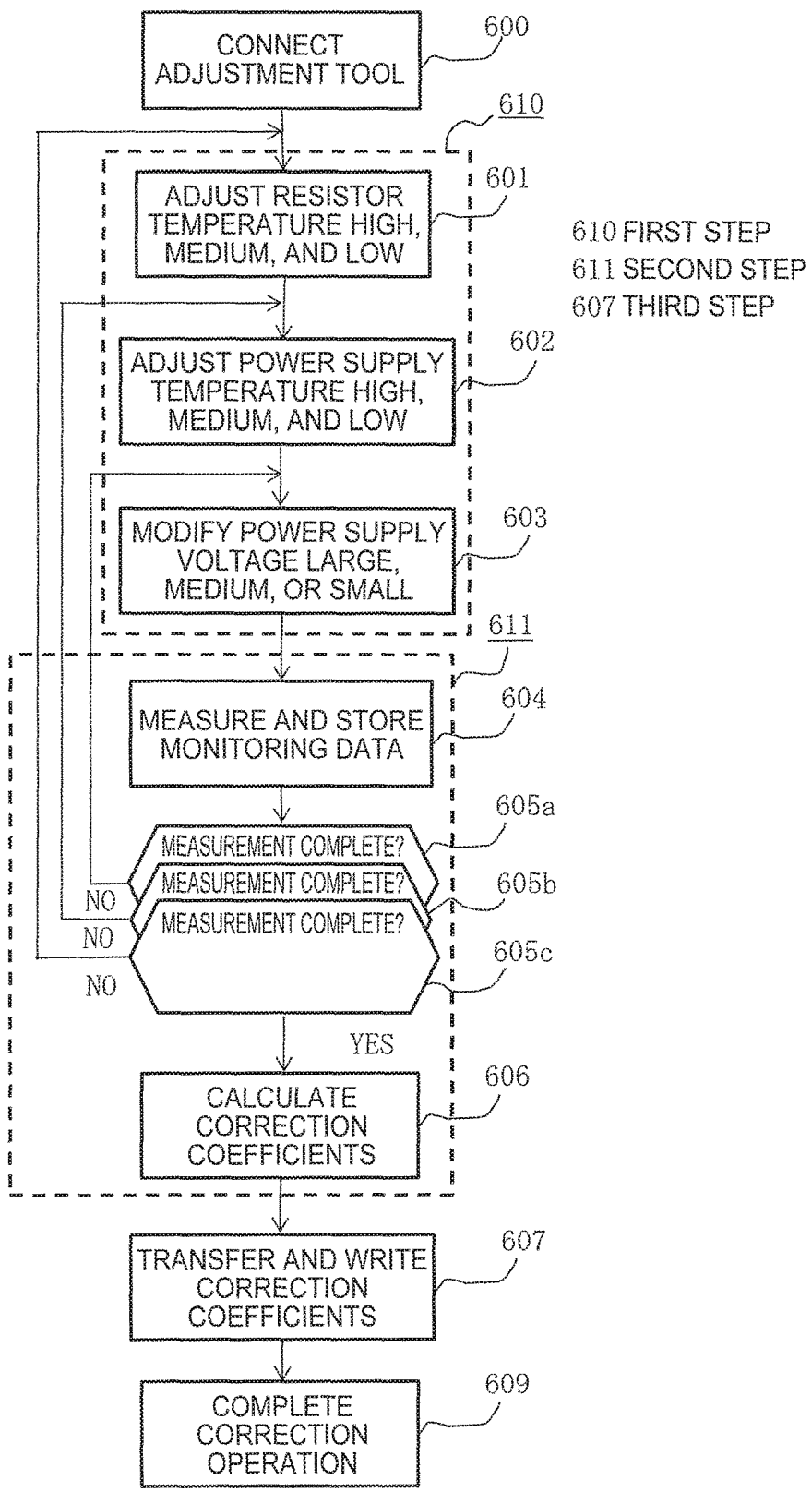
FIG. 6 is a flowchart illustrating an operation of the adjustment tool shown in FIG. 5.

In FIG. 6, step 600 is a step for mounting the unadjusted second integrated circuit element 400A on the adjustment board 800, connecting the second integrated circuit element 400A to the adjustment tool 900A, and switching the power supply ON.

Next, in step 601, first, the open/close command signal DRVi is generated for all of the standard sample loads 104 at once such that the standard sample loads 104 are energized all at once by a comparatively small current at a level of 20% of a rated current, for example.

The flow rate of the cold air generated by the first airflow adjustment solenoid valve 920 is then set so that the environmental temperature of the current detection resistor 50i corresponds to a normal residential environment serving as a low temperature environment.

As a result, the temperature detection voltage Ti, Ti0 generated by the resistor temperature detection element 44i or the representative temperature detection element 44i0 is generated as a low-temperature level detection voltage.

Next, in step 602, first, without connecting the dummy load resistor 910, the flow rate of the cold air generated by the second airflow adjustment solenoid valve 930 is set so that the environmental temperature of the constant voltage power supply 410 corresponds to the normal residential environment serving as the low temperature environment.

As a result, the temperature detection voltage T0 generated by the power supply temperature detection element 440 is generated as a low-temperature level detection voltage.

Next, in step 603, the voltage regulator 940 adjusts the power supply voltage Vb to a minimum voltage of DC 7 V, for example. Next, in step 604, the values of the temperature detection voltages Ti, T0 (or Ti0), the power supply detection voltage Vba, the load current Ifi, and the current detection voltage Vfi are measured in relation to each current detection resistor 50i and stored as a first monitoring data set.

Next, in step 605a, when measurement is incomplete, a negative determination is obtained, and the routine returns to step 603. In step 603, the power supply voltage Vb is adjusted, and in step 604, a second monitoring data set obtained when the power supply voltage Vb is at an intermediate voltage of DC 10 V, for example, is stored.

Similarly, when step 604 is next executed, a third monitoring data set obtained when the power supply voltage Vb is at a maximum voltage of DC 14 V, for example, is stored, and when step 605a is executed for a third time, an affirmative determination, indicating that measurement is complete, is obtained. The routine then advances to step 605b.

When a negative determination, indicating that measurement is incomplete, is obtained in determination step 605b, the routine returns to step 602, and when step 602 is executed for a second time, a part of the dummy load resistors 910 are connected and the flow rate of the cold air generated by the second airflow adjustment solenoid valve 930 is set such that the environmental temperature of the constant voltage power supply 410 corresponds to a medium temperature environment of approximately 75° C., for example.

As a result, the temperature detection voltage T0 generated by the power supply temperature detection element 440 is generated as a medium-temperature level detection voltage.

Thereafter, the first to third monitoring data sets are stored again while repeating step 603, step 604, and step 605b, whereupon the routine returns to step 602 again. When step 602 is executed for the third time, all of the dummy load resistors 910 are connected, and the flow rate of the cold air generated by the second airflow adjustment solenoid valve 930 is set such that the environmental temperature of the constant voltage power supply 410 corresponds to a high temperature environment of approximately 125° C., for example.

As a result, the temperature detection voltage T0 generated by the power supply temperature detection element 440 is generated as a high-temperature level detection voltage.

Similarly thereafter, when step 601 is executed for a second time, the open/close command signal DRVi is generated for all of the standard sample loads 104 at once such that the standard sample loads 104 are energized all at once by an intermediate current at a level of 50% of the rated current, for example.

The flow rate of the cold air generated by the first airflow adjustment solenoid valve 920 is then set so that the environmental temperature of the current detection resistor 50i reaches the intermediate temperature of approximately 75° C.

As a result, the temperature detection voltage Ti, Ti0 generated by the resistor temperature detection element 44i or the representative temperature detection element 44i0 is generated as an intermediate-temperature level detection voltage.

Further, when step 601 is executed for a third time, the open/close command signal DRVi is generated for all of the standard sample loads 104 at once such that the standard sample loads 104 are energized all at once by a large current at a level of 80% of the rated current, for example.

The flow rate of the cold air generated by the first airflow adjustment solenoid valve 920 is then set so that the environmental temperature of the current detection resistor 50i reaches the high temperature of approximately 125° C.

As a result, the temperature detection voltage Ti, Ti0 generated by the resistor temperature detection element 44i or the representative temperature detection element 44i0 is generated as a high-temperature level detection voltage.

As a result of the repeated setting described above, 3×3×3=27 simultaneous equations are generated in relation to a single current detection resistor 50i, but by omitting a part of the monitoring data sets, the number of simultaneous equations can be limited to approximately ten, and as long as the number of simultaneous equations equals or exceeds the number of correction coefficients Ki1 to Ki5 serving as unknowns, a solution can be obtained.

When all of the measurements have been completed such that an affirmative determination is obtained in step 605c, the routine advances to step 606, where the first to fourth correction coefficients Ki1 to Ki4 or the first to fifth correction coefficients Ki1 to Ki5 are calculated from the plurality of simultaneous equations in formula (1b) or formula (3b) using the method of least squares.

$$Ki1 \times Ti + Ki2 \times T0 + Ki3 \times Vba + Ki4 = Vfi/Ifi \qquad (1b)$$

$$Ki1 \times Ti0 + Ki2 \times T0 + Ki3 \times Vba + Ki4 + Ki5 \times Ifi^2 = Vfi/Ifi \qquad (3b)$$

Note that in formula (1b) or formula (3b), the temperature detection voltages T0, Ti, Ti0, the power supply detection voltage Vba, the current detection voltage Vfi, and the load current Ifi are specific known values included in the measured monitoring data sets, while the correction coefficients Ki1 to Ki5 are unknown values to be calculated.

Next, in step 607, the first to fourth correction coefficients Ki1 to Ki4 or the first to fifth correction coefficients Ki1 to Ki5 calculated in step 606 are transferred and written to the data memory of the second integrated circuit element 400A. Next, in step 609, the operation to generate and write correction data for a single adjustment subject integrated circuit element is completed.

Note that a step block 610 constituted by step 601, step 602, and step 603 serves as a first step of a correction data generation method, which is executed by the environment adjustment unit 906 shown in FIG. 5, a step block 611 constituted by steps 604 to 606 serves as a second step of the correction data generation method, which is executed by the calculation control unit 901 shown in FIG. 5, and step 607 serves as a third step of the correction data generation method, which is executed by the select/write command issuing unit 903 shown in FIG. 5.

(4) Main Points and Features of the First Embodiment

As is evident from the above description, the power supply control device 100A according to the first embodiment of this invention receives power from the DC power supply 101 and supplies the plurality of inductive loads 104i (i=1, 2, . . . , m) with the individually variable load currents Ifi, wherein the power supply control device is configured such that the first integrated circuit element 200A having the microprocessor 210 that cooperates with the program memory 211 as a main body and the second integrated circuit element 400A including the plurality of driving open/close elements 45i that are connected to each other in series via the pair of serial-to-parallel converters 221, 421 in order to supply power to the plurality of inductive loads 104i are housed in an identical housing, and heat generated by the plurality of driving open/close elements 45i is transferred to the housing and thereby dissipated, the first integrated circuit element 200A generates the open/close command signals DRVi in the form of pulse width modulation signals for applying the energization duties γi directly to the plurality of driving open/close elements 45i in accordance with the target currents Iti determined by the target current setting means 241 in order to obtain the load currents Ifi, and the second integrated circuit element 400A includes:

the constant voltage power supply 410 that generates the stabilized control voltage Vcc by stepping down the power supply voltage Vb of the DC power supply 101, and supplies the control voltage Vcc to the first integrated circuit element 200A;

the current detection resistors 50i respectively connected in series to the inductive loads 104i;

the plurality of current detection circuits 47i that generates the current detection voltages Vfi that are respectively proportionate to the load currents Ifi by amplifying the respective end-to-end voltages of the current detection resistors;

the plurality of drive gate circuits 48i that drive the plurality of driving open/close elements 45i respectively ON and OFF in accordance with the pulse width modulation signals so as to variably control the energization duties γi, which are ratios of the respective closed periods of the plurality of driving open/close elements 45i to the ON-OFF period;

the plurality of temperature sensors including the one or more resistor temperature detection elements 44i0, 44i for detecting the present temperatures of the plurality of current detection resistors 50i either individually or representatively and the power supply temperature detection element 440 for detecting the present temperature of the constant voltage power supply 410; and the non-volatile data memory 422.

The control characteristic correction data for calculating the present resistances Rti of the converted equivalent resistances that are obtained by dividing the respective values of the current detection voltages Vfi, which vary in response to variation in the environmental conditions specified by the correction parameters and individual variation among circuit components including the current detection resistors 50i and the current detection circuits 47i, by the load currents Ifi are stored in the data memory 422, and these correction data are transmitted in series to the buffer memory 222 provided in the first integrated circuit element 200A at the start of an operation, the microprocessor 210 includes the present resistance calculating means 242 that obtains the present values of the correction parameters, which include the detected temperatures obtained by the plurality of temperature sensors or the power supply detection voltage Vba that is proportionate to the detected temperatures and the power supply voltage Vb, during the operation by receiving the plurality of analog signal voltages serving as the correction parameters via the multiplexer 430 and then digitally converting the analog signal voltages using the master side AD converter 230, and corrects the ON-OFF duties of the pulse width modulation signals by combining the present values with the correction data, and the correction data calculated by the adjustment tool 900A are stored in the data memory 422 via the slave station side serial-to-parallel converter 421 of the pair of serial-to-parallel converters.

Note that the uplink monitoring data may be transmitted to the microprocessor 210 via the slave side AD converter 450 and the pair of serial-to-parallel converters 421, 221, as in the third embodiment, instead of the multiplexer 430. In both cases, the plurality of uplink monitoring data to be transmitted can be either selected using downlink data transmitted from the master station serial-to-parallel converter 221 to the slave station serial-to-parallel converter 421, or specified using a 4-bit digital signal line, for example, connected between the first integrated circuit element and the second integrated circuit element.

The current detection voltage Vfi is obtained by amplifying the end-to-end voltage of the current detection resistor 50i using an amplifier provided in the current detection circuit 47i, and the control voltage Vcc generated by the constant voltage power supply 410 is used by the master side AD converter 230 as the AD reference voltage Vref, whereby, when the analog input signal voltage matches the AD reference voltage Vref, a full scale digital output determined by the resolution of the AD converter is generated, the plurality of coefficients constituted by all or a part of the first to fourth correction coefficients Ki1 to Ki4 illustrated below in formula (1a), which is a relational expression expressing a relationship between the present resistance Rti and the design reference resistance R0 of the current detection resistor 50i in a reference environment, are stored in the data memory 422 as the control characteristic correction data $$Rti = (ki1 \times Ti + ki2 \times T0 + ki3 \times Vba + ki4) \times G0 \times R0 = \\ Ki1 \times Ti + Ki2 \times T0 + Ki3 \times Vba + Ki4 \quad (1a)$$

where, in formula (1 a), G0 denotes the design reference value of the amplification factor of the current detection circuit 47i, the constant ki1 is a correction coefficient for correcting the temperature detection voltage Ti generated by the resistor temperature detection element 44i, the constant ki2 is a correction coefficient for correcting the temperature detection voltage T0 generated by the power supply temperature detection element 440, the constant ki3 is a correction coefficient for correcting the common voltage error generated by the current detection circuit 47i when the current detection resistor 50i is connected to a position upstream of the inductive load 104i, and the constant ki4 denotes another offset error component, the present resistance Rti indicated in formula (1a) is converted into the value obtained following amplification by the current detection circuit 47i, and the current detection voltage Vfi is obtained by multiplying the present resistance Rti by the load current Ifi, and the microprocessor 210 includes the present resistance calculating means 242, which calculates, by estimation, the present resistance Rti from formula (1 a) by reading all or a part of the present value of the temperature detection voltage Ti generated by the resistor temperature detection element 44i, the present value of the temperature detection voltage T0 generated by the power supply temperature detection element 440, and the present value of the power supply detection voltage Vba, and applying all or a part of the first to fourth correction coefficients Ki1 to Ki4 thereto.

With respect to claim 2 of this invention, as described above, the estimated present resistance Rti of the current detection resistor is calculated so that the current detection voltage Vfi generated by the current detection circuit takes a value obtained by multiplying the estimated present resistance Rti by the load current Ifi.

Hence, the present resistance Rti is used to correct a plurality of variation errors representatively as a whole, the plurality of variation errors including individual variation in the resistance value and temperature characteristic of the current detection resistor, individual variation in the detection voltage of the temperature sensor, a voltage amplification error in the current detection circuit, and an AD conversion error caused by a temperature variation error in the control voltage Vcc used as the reference voltage Vref of the AD converter, and as a result, current control can be implemented inexpensively and with a high degree of precision without relying on high-precision circuit components.

This applies likewise to the second embodiment and the third embodiment, although in the third embodiment, the slave side AD converter 450 is used instead of the master side AD converter 230.

In a case where the plurality of current detection resistors 50$i$ are disposed in a dense arrangement and the resistor temperature detection elements 44$i$ are constituted by the single representative temperature detection element 44$i$0 that generates the temperature detection voltage Ti0 representing the present temperatures of all of the current detection resistors 50$i$, the temperature detection voltage Ti applied to each current detection resistor 50$i$ in formula (1a) is calculated using formula (2), to which the constant ki5 set in consideration of heat generation caused by the load current Ifi is applied, $$Ti = Ti0 + ki5 \times Ifi^2 \quad (2)$$

the present resistance Rti is calculated from formula (3a), which is obtained by inserting formula (2) into formula (1a), $$Rti = [ki1 \times (Ti0 + ki5 \times Ifi^2) + ki2 \times T0 + ki3 \times Vba + ki4] \times G0 \times \quad (3a)$$
$$R0 = Ki1 \times Ti0 + Ki2 \times T0 + Ki3 \times Vba + Ki4 + Ki5 \times Ifi^2$$

where Ki5 = ki1×ki5×G0×R0, and the present resistance calculating means 242 calculates, by estimation, the present resistance Rti from formula (4a) by reading all or a part of the present value of the temperature detection voltage Ti0 generated by the representative temperature detection element 44$i$0, the present value of the temperature detection voltage T0 generated by the power supply temperature detection element 440, and the present value of the power supply detection voltage Vba, and applying all or a part of the first to fifth correction coefficients Ki1 to Ki5 thereto, $$Rti = Ki1 \times Ti0 + Ki2 \times T0 + Ki3 \times Vba + Ki4 + Ki5 \times Ifi^2 \quad (4a)$$

the target current Iti approximating the load current Ifi of formula (3a) being applied to formula (4a) in place of the load current Ifi.

With respect to claim 3 of this invention, as described above, when the plurality of current detection resistors are disposed in close proximity such that the individual temperatures thereof cannot be detected easily, a representative temperature is detected using the representative temperature detection element, the individual temperatures are calculated by adding a fifth correction coefficient for applying an added temperature that is proportionate to a square value of the individual load currents, and the present resistance calculating means calculates the present resistances Rti using the target currents Iti instead of the load currents Ifi.

Hence, even when the temperatures of the current detection resistors cannot be detected individually, the respective present resistances of the plurality of current detection resistors can be calculated accurately by referring to the representative temperature detection voltage generated by the representative temperature detection element, and target current values corresponding to the individual load currents.

Note that when the adjustment tool calculates the first to fifth correction coefficients, the fifth correction coefficient can be calculated by referring to the actually measured load current Ifi, and therefore the microprocessor does not have to calculate the load current during an operation for calculating the present resistance using this correction coefficient. As a result, the microprocessor can calculate the present resistance easily using the target current set thereby.

This applies likewise to the second embodiment and the third embodiment.

The present resistance calculating means 242 further includes the shift register storing time series data relating to the target current Iti, and the moving average value of the square current value over the most recent predetermined time period corresponding to the thermal time constant of the current detection resistor 50$i$ when installed in the housing of an actual machine is applied as the target current Iti applied in formula (4a).

With respect to claim 4 of this invention, as described above, past target currents Iti obtained over a predetermined time period corresponding to the thermal time constant of the current detection resistor are applied as the target current value used to calculate the present resistance of the current detection resistor.

When calculating the fifth correction coefficient Ki5, therefore, the present resistance can be calculated in consideration of a response delay in a current-to-resistance value characteristic of the current detection resistor by measuring the current detection resistor after applying the constant load current Ifi for a predetermined time period.

This applies likewise to the second embodiment and the third embodiment.

The value of the current detection voltage Vfi is input into the microprocessor 210 provided in the first integrated circuit element 200A individually via the AD converter 23$i$, the microprocessor 210 includes the negative feedback control means 244 that compares the corrected target detection voltage Vti, which is obtained by multiplying the target current Iti by the estimated present resistance Rti, with the digital value of the current detection voltage Vfi, and generates the open/close command signal DRVi having the energization duty γi of the driving open/close element 45$i$ so that the comparison inputs match each other, and the second integrated circuit element 400A drives the driving open/close element 45$i$ ON and OFF via the drive gate circuit 48$i$ that operates in response to the open/close command signal DRVi.

With respect to claim 5 of this invention, as described above, the microprocessor is configured to compare the corrected target detection voltage Vti, which is obtained by multiplying the target current Iti by the estimated present resistance Rti, with the digital value of the current detection voltage Vfi serving as a negative feedback control signal, generate the open/close command signal for the driving open/close element such that the compared values match each other, and calculate the present resistance Rti on the basis of the control characteristic correction data stored in the data memory and the present environment information obtained during the operation. Hence, as long as the corrected target detection voltage Vti matches the current detection voltage Vfi, the target current Iti matches the load current Ifi, and therefore a large number of variation errors can be corrected easily by integrating the variation errors into the present resistance Rti. Moreover, negative feedback control is implemented by the microprocessor, thereby lightening a hardware load of the second integrated circuit element and enabling reductions in the size and cost thereof.

The second integrated circuit element 400A further includes the commutation circuit elements 46$i$ that are respectively connected in parallel to the series circuits formed by the plurality of inductive loads 104$i$ and the current detection resistors 50$i$ connected in series to the plurality of inductive loads 104$i$ in positions upstream or downstream thereof, the commutation circuit element 46$i$ and the driving open/close element 45$i$ are P-channel or N-channel field effect transistors connected to each other in series, when the driving open/close element 45$i$ is connected to a position upstream of the inductive load 104$i$, the cathode terminal of the internal parasitic diode thereof is connected to the anode terminal of the internal parasitic diode of the commutation circuit element 46$i$, which is connected to a downstream position, when the driving open/close element 45$i$ is connected to a position downstream of the inductive load 104$i$, the anode terminal of the internal parasitic diode thereof is connected to the cathode terminal of the internal parasitic diode of the commutation circuit element 46$i$, which is connected to an upstream position, and the drive gate circuit 48$i$ stops driving the commutation circuit element 46$i$ before driving the driving open/close element 45$i$ to close and drives the commutation circuit element 46$i$ to close after stopping driving the driving open/close element 45$i$ to close such that the commutation circuit element 46$i$ is driven in an identical conduction direction to the conduction direction of the internal parasitic diode thereof.

With respect to claim 8 of this invention, as described above, the commutation circuit element is connected in parallel to the series circuit formed by the inductive load and the current detection resistor, and energization of the driving open/close element and the commutation circuit element is controlled by the drive gate circuit such that the driving open/close element and the commutation circuit element are not closed simultaneously.

Hence, a low-loss commutation circuit in which a commutation current flows to the internal parasitic diode of the commutation circuit element immediately after the driving open/close element is opened and the internal parasitic diode short-circuits when the commutation circuit element is driven to close can be constructed, and since the drive current and the commutation current flow to the current detection resistor, a smoothed current detection voltage can be obtained.

This applies likewise to the second embodiment and the third embodiment.

In the control characteristic correction data generation method for a power supply control device, the power supply control device 100A is constituted by the second integrated circuit element 400A that cooperates with the first integrated circuit element 200A, the second integrated circuit element includes the driving open/close elements 45$i$ for supplying the plurality of inductive loads 104$i$ ($i$=1, 2, ..., m; likewise hereafter) with the individually variable load currents Ifi, the drive gate circuits 48$i$ for open/close controlling the respective driving open/close elements 45$i$, and the current detection resistors 50$i$ for detecting the load currents Ifi, and the first to fourth correction coefficients Ki1 to Ki4 indicated in formula (1b) or the first to fifth correction coefficients Ki1 to Ki5 indicated in formula (3b) are calculated in order to calculate the present resistances Rti=Vfi/Ifi that vary in response to individual variation among the applied circuit components and variation in the environmental temperature or the power supply voltage as equivalent resistances by dividing the respective current detection voltages Vfi, which are obtained by amplifying the end-to-end voltages of the respective current detection resistors 50$i$, by the load currents Ifi, $$Ki1 \times Ti + Ki2 \times T0 + Ki3 \times Vba + Ki4 = Vfi/Ifi \quad (1b)$$

$$Ki1 \times Ti0 + Ki2 \times T0 + Ki3 \times Vba + Ki4 + Ki5 \times Ifi^2 = Vfi/Ifi \quad (3b)$$

wherein the power supply control device 100A includes the adjustment board 800 on which the single second integrated circuit element 400A is mounted detachably, and the adjustment tool 900A that is connected to the second integrated circuit element 400A via the adjustment board 800, and the DC power supply 101 is connected to the adjustment board 800 via the voltage regulator 940 in order to supply power to the second integrated circuit element 400A, the second integrated circuit element supplies the load current Ifi to the series circuit formed by the ammeter Ai1 and the standard sample load 104, and the dummy load resistor 910 is connected to the output circuit of the constant voltage power supply 410 provided in the second integrated circuit element.

The adjustment tool 900A includes the calculation control unit 901, the setting display unit 902, the select/write command issuing unit 903, the master station side serial-to-parallel converter 904 that is connected in series to the slave station side serial-to-parallel converter 421 in the second integrated circuit element 400A, the energization command issuing unit 905 for generating a pulse width modulation signal that serves as the open/close command signal DRVi in the second integrated circuit element 400A, the first AD converter 909$a$ and the second AD converter 909$b$ into which the present values of the correction parameters generated by the second integrated circuit element 400A are input, and the environment adjustment unit 906, the first AD converter 909$a$ operates using the control voltage Vcc generated by the second integrated circuit element 400A as the AD reference voltage Vref so as to digitally convert the analog signal voltages Vfi, V3 serving as the present values of the correction parameters, transmitted by the second integrated circuit element, and input the results into the calculation control unit 901, when the measurement value of the ammeter Ai1 is generated as an analog signal voltage, the second AD converter 909$b$ operates using the stabilized voltage generated by the high-precision constant voltage power supply 908 as the AD reference voltage Vrf so as to digitally convert the measured value of the load current Ifi and input the result into the calculation control unit 901, and the AD reference voltage Vrf applied to the second AD converter 909$b$ is more precise than the AD reference voltage Vref applied to the first AD converter 909$a$, and in a case where the measurement value of the ammeter Ai1 is generated as a digital signal voltage, the digital measurement value thereof is input as is into the calculation control unit 901, thereby eliminating the need for the second AD converter 909b.

The environment adjustment unit 906 is operated from the calculation control unit 901 via the setting display unit 902, and includes the first step 610 for generating a command to modify the resistance value of the dummy load resistor 910, a command to modify the output voltage output to the voltage regulator 940, and a command to modify the environmental temperature of the constant voltage power supply 410 provided in the second integrated circuit element 400A and the environmental temperature of the current detection resistor 50i, the calculation control unit 901 includes the second step 611 for reading the temperature detection voltage Ti generated by the resistor temperature detection element 44i or the temperature detection voltage Ti0 generated by the representative temperature detection element 44i0, the temperature detection voltage T0 generated by the power supply temperature detection element 440, the power supply detection voltage Vba, the value of the current detection voltage Vfi, and the value of the load current Ifi measured by the ammeter Ai1 from formula (1b) or formula (3b) as the present values of the correction parameters, creating four, five, or more simultaneous equations having the first to fourth correction coefficients Ki1 to Ki4 or the first to fifth correction coefficients Ki1 to Ki5 as unknowns for each current detection resistor 50i, and calculating the first to fourth correction coefficients Ki1 to Ki4 or the first to fifth correction coefficients Ki1 to Ki5 using the method of least squares, and the select/write command issuing unit 903 includes the third step 607 for transmitting the address information specifying the individual types of the correction parameters transmitted from the second integrated circuit element 400A, and transferring the first to fourth correction coefficients Ki1 to Ki4 or the first to fifth correction coefficients Ki1 to Ki5 calculated by the calculation control unit 901 to the second integrated circuit element 400A as the correction coefficients for the respective current detection resistors 50i, whereupon the correction coefficients are written to the data memory 422 provided in the second integrated circuit element 400A.

Note that in the first embodiment, the present resistance Rti includes the correction applied to the AD conversion error, and therefore, during an actual operation of the power supply control device, the current detection voltage Vfi and the target detection voltage Vti are input into the negative feedback control means 244 in a condition where a shared AD conversion error is included evenly therein. As a result, the negative feedback control can be implemented with a high degree of precision.

In the first step 610, the environmental temperatures of the plurality of current detection resistors 50i are adjusted by having the energization command issuing unit 905 generate the pulse width modulation signals DRVi to be applied to the plurality of driving open/close elements 45i all at once, setting the energization duties thereof as large or small or as large, medium, or small, increasing or reducing the load current Ifi of the standard sample load 104, and then ejecting cold air or warm air onto the plurality of current detection resistors 50i all at once via the first airflow adjustment solenoid valve 920 and an ejection nozzle in order to adjust the temperatures thereof rapidly in a plurality of stages, namely high and low or high, medium, and low, and the environmental temperature of the constant voltage power supply 410 is adjusted by modifying the resistance value of the dummy load resistor 910 so as to increase or reduce the output current applied to the constant voltage power supply, and then ejecting cold air or warm air onto the constant voltage power supply via the second airflow adjustment solenoid valve 930 and an ejection nozzle in order to adjust the temperature thereof rapidly in a plurality of stages, namely high and low or high, medium, and low, values set in advance by experiment being applied in accordance with target temperatures as the respective magnitudes of the load currents Ifi or the output current applied to the plurality of current detection resistors 50i or the constant voltage power supply 410, and an appropriate flow rate of the airflow generated by the first airflow adjustment solenoid valve 920 or the second airflow adjustment solenoid valve 930.

With respect to claim 10 of this invention, as described above, the temperatures of the plurality of current detection resistors and the constant voltage power supply are adjusted in a plurality of stages in accordance with the respective magnitudes of the load current applied to the standard sample load and the output current of the constant voltage power supply, and the flow rate of the airflow adjusted by the first airflow adjustment solenoid valve or the second airflow adjustment solenoid valve.

Hence, by providing the single, small second integrated circuit element with a current supply that serves as a sufficiently large heating source while maintaining balance using a flow of cool air to ensure that the temperature thereof does not increase excessively, temperature adjustment can be implemented rapidly.

Further, a normal temperature air source in the vicinity of 25° C. may be applied as a compressed air source, but by selectively employing a low-temperature air source of 0° C. or less or a high-temperature air source of approximately 55° C., temperature adjustment can be implemented even more rapidly, and temperature adjustment can be implemented over a wide range without using a temperature tank.

This applies likewise to the second embodiment and the third embodiment, although in the second embodiment, a drive command signal CNTi is used as the pulse width modulation signal.

Detailed Description of Second Embodiment (1) Detailed Description of the Configuration Configurations shown in FIG. 7, which is an overall circuit block diagram of a power supply control device according to a second embodiment of this invention, and FIG. 8, which is a detailed circuit block diagram relating to one power supply circuit portion of the power supply control device shown in FIG. 7, will be described in detail below, focusing on differences with the configurations shown in FIGS. 1 and 2.

Figure 7:
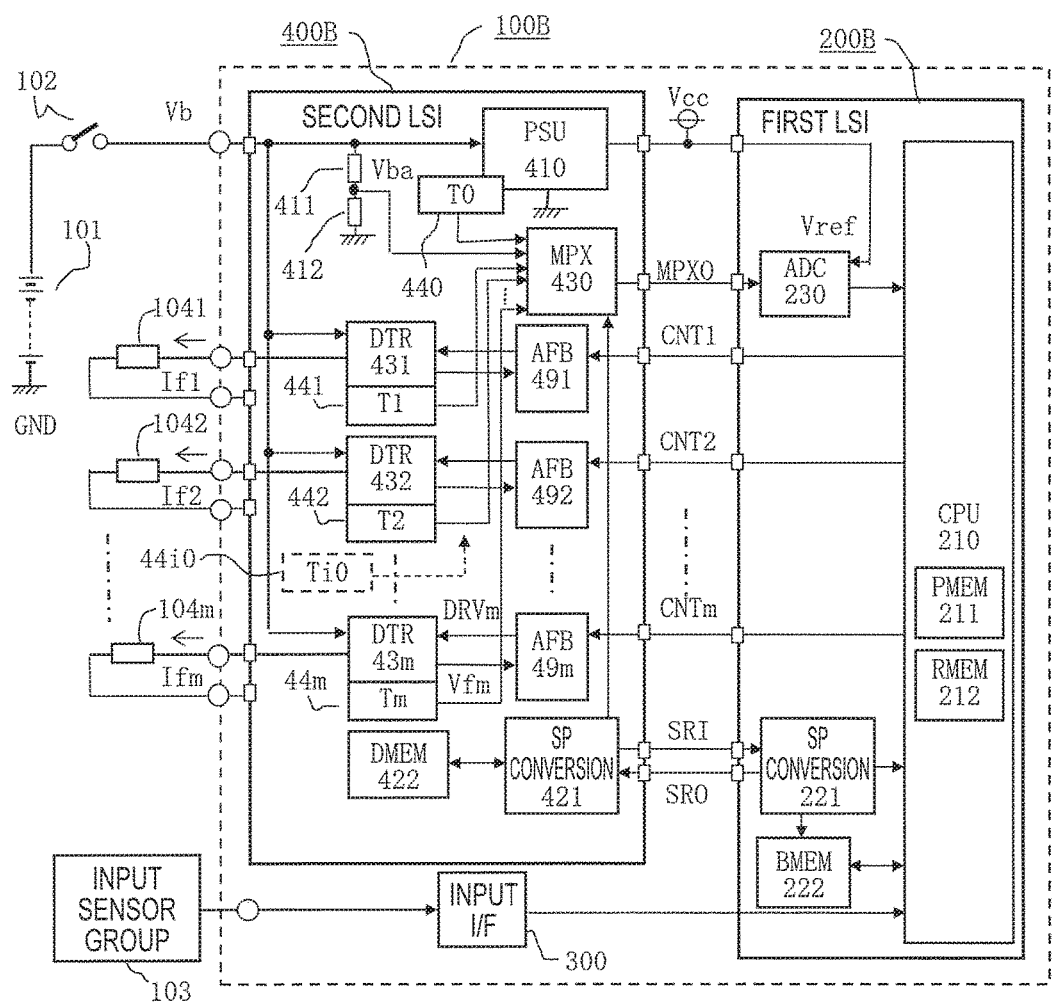
FIG. 7 is an overall circuit block diagram of a power supply control device according to a second embodiment of this invention.
Figure 8:
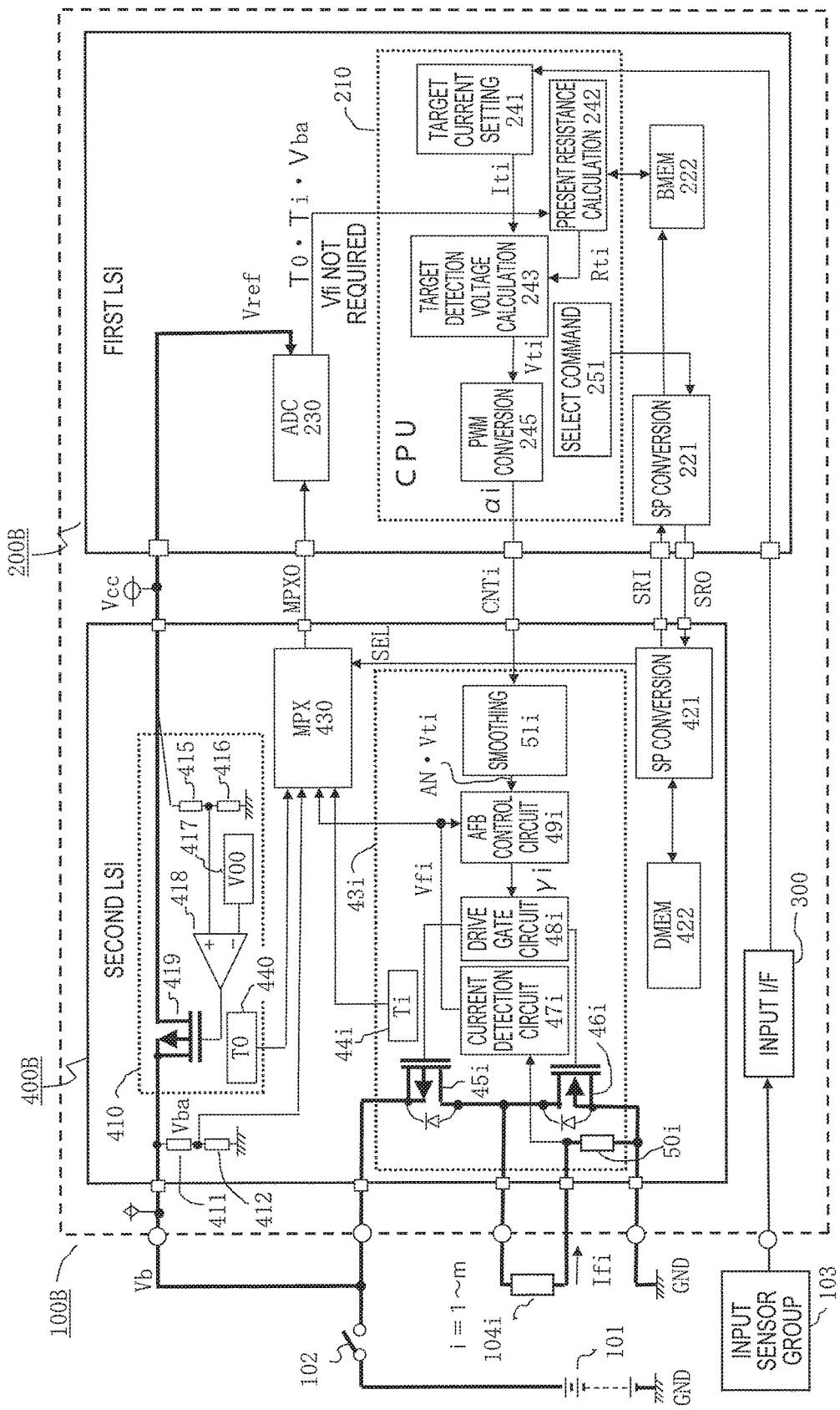
FIG. 8 is a detailed circuit block diagram relating to a power supply circuit portion of the power supply control device shown in FIG. 7.

Note that the main difference is that in FIGS. 1 and 2, negative feedback control is executed on the load current Ifi by the microprocessor 210 provided in the first integrated circuit element 200A, whereas in FIGS. 7 and 8, control is implemented by a negative feedback control circuit 49i provided in a second integrated circuit element 400B. Accordingly, the microprocessor 210, which is provided in a first integrated circuit element 200B, generates the drive command signal CNTi as a pulse width modulation signal corresponding to the target detection voltage Vti, i.e. the product of the target current Iti and the present resistance Rti, while the second integrated circuit element 400B obtains an analog voltage of the target detection voltage Vti by smoothing the drive command signal CNTi, compares the analog voltage with the current detection voltage Vfi in the negative feedback control circuit 49i, and implements ON-OFF control on the driving open/close element 45i via the drive gate circuit 48i.

In FIG. 7, similarly to the case shown in FIG. 1, the DC power supply 101, the output contact 102 of the power relay, the input sensor group 103, and the plurality of inductive loads 104i serving as a part of the electric load group, not shown in the drawings, are connected to a power supply control device 100B.

Further, the power supply control device 100B is constituted by the first integrated circuit element 200B having the microprocessor 210 as a main body, and the second integrated circuit element 400B that has the drive circuit portions 43i for supplying power to the respective inductive loads 104i as a main body and includes the constant voltage power supply 410. The control voltage Vcc, which is a stabilized voltage of DC 5 V, for example, is applied to the microprocessor 210 via the constant voltage power supply 410.

Similarly to the case shown in FIG. 1, the first integrated circuit element 200B and the second integrated circuit element 400B are connected in series by the pair of serial-to-parallel converters constituted by the master station serial-to-parallel converter 221 and the slave station serial-to-parallel converter 441, the first integrated circuit element 200B serving as the master side and the second integrated circuit element 400B serving as the slave side, such that data are exchanged between the master side volatile buffer memory 222 and the slave side non-volatile data memory 422. Further, the first integrated circuit element 200B includes the non-volatile program memory 211 that cooperates with the microprocessor 210, and the RAM memory 212 used for calculation processing.

The temperature detection voltage T0 generated by the power supply temperature detection element 440 provided in the constant voltage power supply 410 of the second integrated circuit element 400B, the power supply detection voltage Vba obtained by dividing the power supply voltage Vb using the voltage dividing resistors 411, 412, the temperature detection voltage Ti, Ti0 generated with respect to the current detection resistor 50i by the resistor temperature detection element 44i or the representative temperature detection element 44i0, and the current detection voltage Vfi obtained by amplifying the end-to-end voltage of the current detection resistor 50i are respectively connected to different input terminals of the multiplexer 430, and the multiplexer 430 selects one analog input signal in response to a selection command from the microprocessor 210, which is obtained from the slave station serial-to-parallel converter 421, and transmits the selected analog input signal to the first integrated circuit element 200B as the selected analog signal MPX0.

The selected analog signal MPX0 selected by the multiplexer 430 is digitally converted by the master side AD converter 230 and input into the microprocessor 210, the control voltage Vcc generated by the constant voltage power supply 410 being used by the master side AD converter 230 as the AD reference voltage Vref.

Note that a slave side multichannel AD converter (see FIG. 11) may be provided instead of the multiplexer 430, and a digital conversion value thereof may be transmitted to the microprocessor 210 via the serial-to-parallel converters 421, 221. In both cases, it is possible to realize means for transmitting the temperature detection voltages T0, Ti (or Ti0), the power supply detection voltage Vba, and the current detection voltage Vfi to the master side as the uplink monitoring data using a small number of wires.

The uplink monitoring data are used by the microprocessor 210 to control the load currents Ifi with a high degree of precision, and importantly, high-speed responsiveness is not required with respect to the negative feedback control.

Next, configurations shown in FIG. 8, which is a detailed circuit block diagram illustrating the target detection voltage calculating means 243 realized by the microprocessor 210, and the drive circuit portion 43i and the constant voltage power supply 410 provided in the second integrated circuit element 400B, will be described in detail.

In FIG. 8, similarly to the case shown in FIG. 2, the constant voltage power supply 410 is constituted by the serial open/close element 419, the comparison circuit 418, the voltage dividing resistors 415, 416, the power supply reference voltage 417, and the power supply temperature detection element 440, and generates the stabilized control voltage Vcc from the power supply voltage Vb.

The drive circuit portion 43i includes the driving open/close element 45i connected in series to the inductive load 104i, and the commutation circuit element 46i connected in parallel to the series circuit formed by the inductive load 104i and the current detection resistor 50i. The duty factor γi=ON time/ON-OFF period of the driving open/close element 45i is controlled via the drive gate circuit 48i that operates in response to the open/close command signal DRVi generated by the negative feedback control circuit 49i, and the commutation circuit element 46i closes when the driving open/close element 45i is open, whereby the load current Ifi is commuted.

The negative feedback control circuit 49i generates the open/close command signal DRVi having the energization duty γi that corresponds to the PID control output by comparing an analog voltage of the target detection voltage Vti, which is obtained by smoothing the drive command signal CNTi serving as the pulse width modulation signal generated by the microprocessor 210 using a smoothing circuit 51i, with the current detection voltage Vfi generated by the current detection circuit 47i.

Note that the negative feedback control circuit 49i includes a serrated wave pulse generation circuit and a level determination comparison circuit, not shown in the drawings. When a voltage level of the PID control output equals or exceeds a serrated wave voltage, the open/close command signal DRVi is switched ON, and when the gradually increasing serrated wave voltage exceeds the voltage level of the PID control output, the open/close command signal DRVi is switched OFF.

In the first integrated circuit element 200B, meanwhile, the program memory 211 that cooperates with the microprocessor 210 includes a control program that serves as the target current setting means 241, the present resistance calculating means 242, the target detection voltage calculating means 243, PWM conversion means 245, and the selection command issuing means 251.

In a case where the inductive load 104i is a linear solenoid provided for a proportional solenoid valve used during oil pressure control, the target current setting means 241 determines the target current Iti by referring to oil pressure-to-current characteristic data in which the required oil pressure is associated with the corresponding excitation current to be applied to the linear solenoid.

The present resistance calculating means 242 calculates the present resistance Rti by reading the correction coefficients Ki1 to Ki4 or the correction coefficients Ki1 to Ki5, which are stored in advance in the data memory 422 of the second integrated circuit element 400B, and referring to the temperature detection voltages T0, Ti (or Ti0) and the power supply detection voltage Vba transmitted from the multiplexer 430. Hence, the value of the current detection voltage Vfi is not required to calculate the present resistance Rti.

The target detection voltage calculating means 243 calculates the target detection voltage Vti=Rti×Iti by multiplying the present resistance Rti calculated by the present resistance calculating means 242 by the target current Iti set by the target current setting means 241.

The PWM conversion means 245 generates the drive command signal CNTi, which has a command duty of αi=Iti/Imax=Vti/Vmax that is a ratio of the target detection voltage Vti to a maximum target detection voltage Vmax=Imax×Rti obtained by multiplying a maximum target current Imax by the present resistance Rti, and a signal power supply voltage of the drive command signal CNTi serving as the pulse width modulation signal generated by the PWM conversion means 245 is used as the control voltage Vcc.

Note that the selection command issuing means 251 acts on the multiplexer 430 of the second integrated circuit element 400B via the pair of serial-to-parallel converters 221, 421 to specify the temperature detection voltage T0, Ti (or Ti0), the power supply detection voltage Vba, and the current detection voltage Vfi in succession, whereupon the selected analog signal MPX0 serving as the output signal of the multiplexer 430 is input into the microprocessor 210 via the master side AD converter 230.

(2) Detailed Description of Actions and Operations

Actions and operations of the power supply control device according to the second embodiment, configured as shown in FIGS. 7 and 8, will now be described in detail on the basis of a flowchart shown in FIG. 9.

First, in FIGS. 7 and 8, when the power switch, not shown in the drawings, is closed, the output contact 102 of the power relay is closed, whereby the power supply voltage Vb is applied to the power supply control device 100B.

As a result, the constant voltage power supply 410 generates the control voltage Vcc, which is a stabilized voltage of DC 5 V, for example, whereupon the microprocessor 210 forming the first integrated circuit element 200B starts to implement a control operation.

The microprocessor 210 generates a load driving command signal to be transmitted to the electric load group, not shown in the drawings, connected to the output interface circuit, not shown in the drawings, in accordance with the operating condition of the input sensor group 103, which is input through the input interface circuit 300, and the content of the control program stored in the non-volatile program memory 211, and implements ON-OFF control on the plurality of inductive loads 104i, which serve as specific electric loads of the electric load group, via the driving open/close elements 45i in order to control the energization currents thereof.

Note that in FIGS. 7 and 8, the sites that cause control errors during the current control are as shown on the characteristic diagrams in FIGS. 3A to 3D.

Further, a plurality of coefficients constituted by all or a part of the first to fourth correction coefficients Ki1 to Ki4, which are illustrated above in formula (1a), are stored in the data memory 422 of the second integrated circuit element 400B as control characteristic correction data in order to calculate the present resistance Rti of the converted equivalent resistance that is obtained by dividing the value of the current detection voltage Vfi, which does not include an AD conversion error, by the load current Ifi.

The present resistance calculating means 242 then calculates, by estimation, the present resistance Rti from formula (1a) by reading all or a part of the present value of the temperature detection voltage Ti generated by the resistor temperature detection element 44i, the present value of the temperature detection voltage T0 generated by the power supply temperature detection element 440, and the present value of the power supply detection voltage Vba, and applying all or a part of the first to fourth correction coefficients Ki1 to Ki4 thereto.

Note that when the first to fifth correction coefficients Ki1 to Ki5 are stored in the data memory 422, the present resistance Rti is calculated from formula (4a) by referring to the temperature detection voltage Ti0 generated by the representative temperature detection element 44i0 with respect to the current detection resistor 50i.

Next, FIG. 9, which is a flowchart illustrating operations of the first integrated circuit element 200B and the second integrated circuit element 400B, will be described, focusing on steps having step numbers in the 900s, which differ from the steps shown in FIG. 4.

Figure 9:
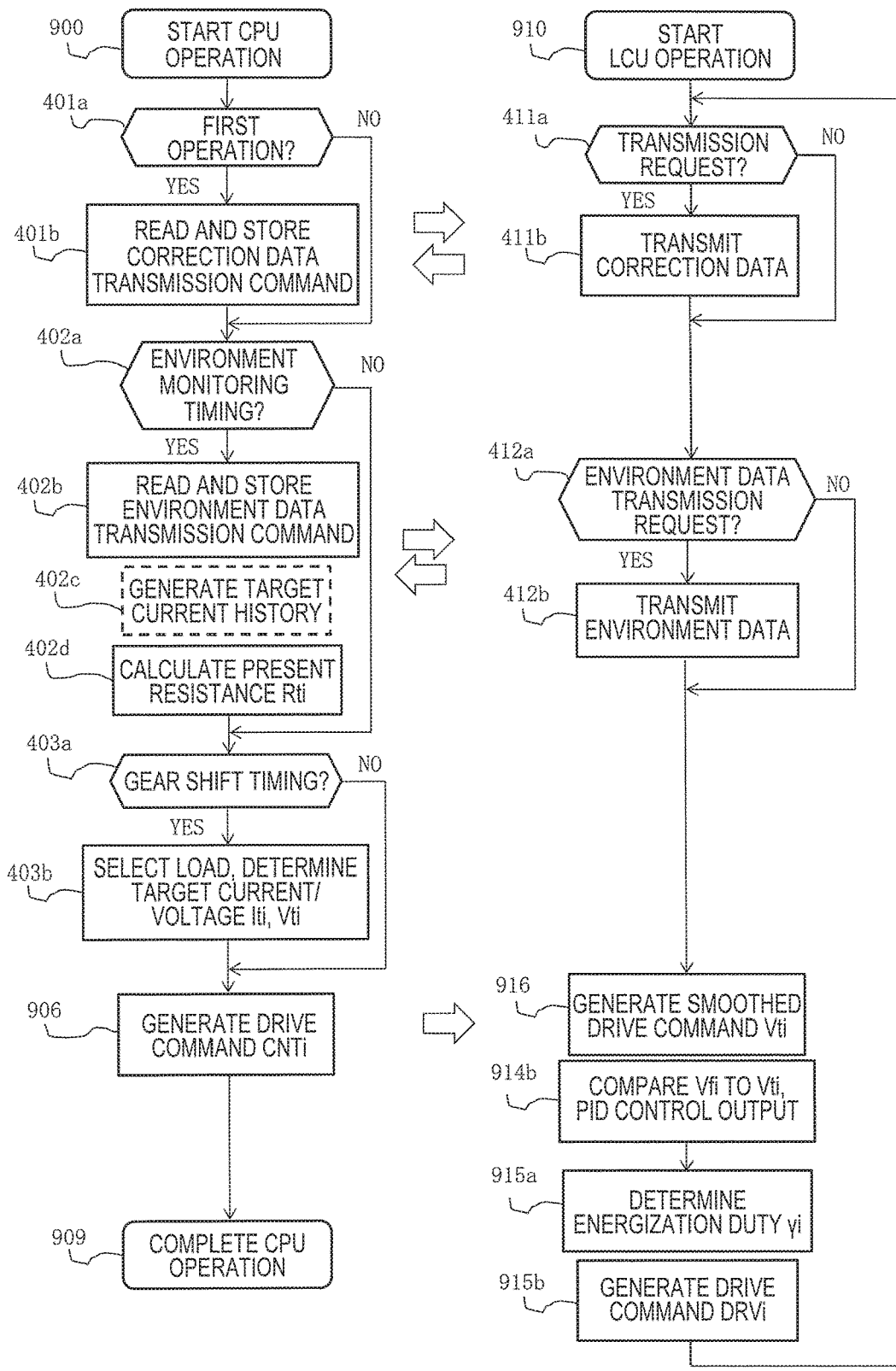
FIG. 9 is a flowchart illustrating operations of a first integrated circuit element and a second integrated circuit element of the power supply control device shown in FIG. 7.

In FIG. 9, step 900 is a step for activating the microprocessor 210, and step 910 is a step for starting operations on an equivalent flowchart illustrating control operations executed by the second integrated circuit element 400B, which is constituted by a logic circuit.

In steps 401a to 403b following step 900 and steps 411a to 412b following step 910, identical operations to those shown in FIG. 4 are implemented. Step 906 following step 403b corresponds to the PWM conversion means 245 of FIG. 8, and in this step, the drive command signal CNTi having the command duty αi=Iti/Imax=Vti/Vmax, which is the ratio of the target detection voltage Vti to the maximum target detection voltage Vmax=Imax×Rti obtained by multiplying the maximum target current Imax by the present resistance Rti, is generated, whereupon the routine advances to step 909, in which the operation is completed. The signal power supply voltage of the drive command signal CNTi serving as the pulse width modulation signal generated by the PWM conversion means is used as the control voltage Vcc.

In step 916 following step 412b, an analog signal voltage that is proportionate to the target detection voltage Vti is generated by smoothing the drive command signal CNTi generated by the microprocessor 210 in step 906 using the smoothing circuit 51i, whereupon the routine advances to step 914b.

In step 914b, the current detection voltage Vfi generated by the current detection circuit 47i is compared with the analog value of the target detection voltage Vti generated in step 916, and the PID control output is generated in relation to a deviation therebetween. The routine then advances to step 915a.

In step 915a, the energization duty γi to be applied to the driving open/close element 45i is determined in accordance with the PID control output generated in step 914b. Next, in step 915b, the drive command signal DRVi corresponding to the energization duty γi is generated, whereupon the routine returns to step 411a.

In step 909, another control program is executed, whereupon the routine returns to step 900, i.e. the start of the operation. Thereafter, the same control program is executed repeatedly.

Note that the second integrated circuit element 400B is configured to drive the driving open/close element 45i and the commutation circuit element 46$i$ ON and OFF via the drive gate circuit 48$i$ in step 915$b$, and then return to step 411$a$. Moreover, normally, the second integrated circuit element 400B executes steps 916 to 915$b$ repeatedly.

Further, with respect to the plurality of inductive loads 104$i$ (i=1, 2, . . . , m), i (=1 to m) iterative operations are implemented in steps 402$a$ to 402$d$, i (=1 to m) iterative operations are implemented in step 403$b$, and i (=1 to m) iterative operations are implemented in step 906.

(3) Detailed Description of Correction Data Generation Method

The power feeding control device according to the second embodiment, configured as shown in FIGS. 7 and 8, will be described in detail below using FIG. 10, which is a view showing an overall configuration of an adjustment tool used to generate the correction data, focusing on differences with FIG. 5.

Figure 10:
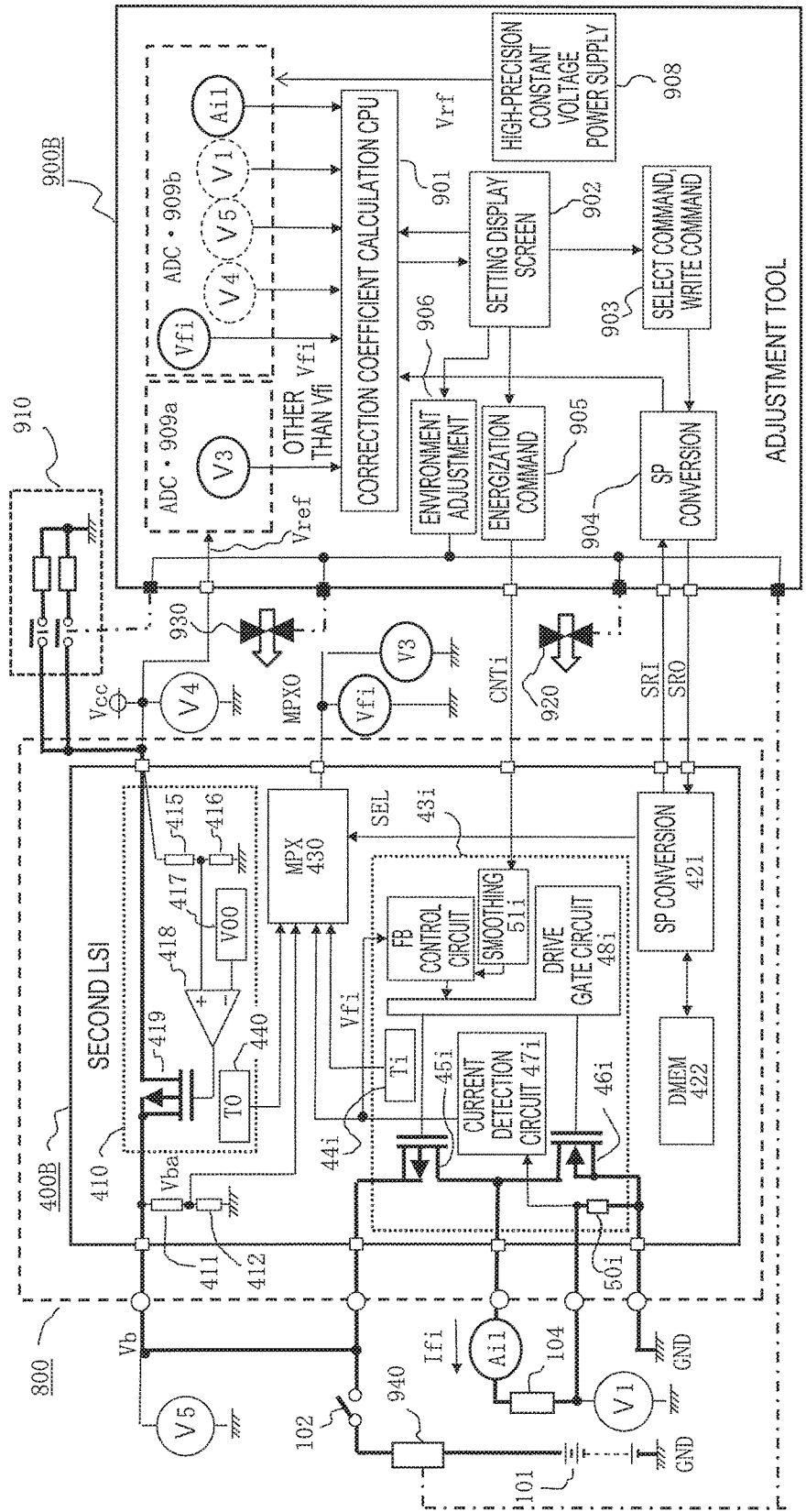
FIG. 10 is a view showing an overall configuration of an adjustment tool applied to the power supply control device shown in FIG. 7.

In FIG. 10, the single second integrated circuit element 400B is mounted detachably on the adjustment board 800 via a socket, not shown in the drawing.

Similarly to the case shown in FIG. 5, the DC power supply 101 is connected to the adjustment board 800 via the voltage regulator 940 in order to supply power to the second integrated circuit element 400B, and the second integrated circuit element supplies the load current Ifi to the series circuit formed from the ammeter Ai1 and the standard sample load 104. Further, the dummy load resistor 910 is connected to the output circuit of the constant voltage power supply 410 provided in the second integrated circuit element.

An adjustment tool 900B, which is constituted by a programmable controller, for example, includes the calculation control unit 901, the setting display unit 902, the select/write command issuing unit 903, the master station side serial-to-parallel converter 904 connected in series to the slave station side serial-to-parallel converter 421 in the second integrated circuit element 400B, the energization command issuing unit 905 for generating the pulse width modulation signal in the form of the drive command signal CNTi in the smoothing circuit 51$i$, the first AD converter 909$a$ and the second AD converter 909$b$ into which present values of correction parameters generated by the second integrated circuit element 400B are input, and the environment adjustment unit 906.

The first AD converter 909$a$ operates using the control voltage Vcc generated by the second integrated circuit element 400B as the AD reference voltage Vref so as to digitally convert an analog signal voltage V3 other than the current detection voltage Vfi, which is obtained when the second integrated circuit element transmits the present values of the correction parameters as analog signals, and input the result into the calculation control unit 901.

Note that the analog signal voltage V3 is a signal voltage relating to the environment data output by the multiplexer 430, including the temperature detection voltages T0, Ti (or Ti0) or the power supply detection voltage Vba.

The second AD converter 909$b$ is applied in a case where the ammeter Ai1 generates an analog signal voltage and the current detection voltage Vfi is generated as an analog signal voltage, and operates using the stabilized voltage generated by the high-precision constant voltage power supply 908 as the AD reference voltage Vrf so as to digitally convert the measured values of the load current Ifi and the current detection voltage Vfi and then input the results into the calculation control unit 901.

The AD reference voltage Vrf applied to the second AD converter 909$b$ is more precise than the AD reference voltage Vref applied to the first AD converter 909$a$, and in a case where the measurement values of the ammeter Ai1 and the current detection voltage Vfi are generated as digital signal voltages, digital measurement values thereof are input as is into the calculation control unit 901, thereby eliminating the need for the second AD converter 909$b$.

The environment adjustment unit 906 is operated from the calculation control unit 901 via the setting display unit 902 to generate a command to modify the resistance value of the dummy load resistor 910, a command to modify the output voltage output to the voltage regulator 940, and a command to modify the environmental temperature of the constant voltage power supply 410 provided in the second integrated circuit element 400B and the environmental temperature of the current detection resistor 50$i$.

The calculation control unit 901 reads the temperature detection voltage Ti generated by the resistor temperature detection element 44$i$ or the temperature detection voltage Ti0 generated by the representative temperature detection element 44$i$0, the temperature detection voltage T0 generated by the power supply temperature detection element 440, the power supply detection voltage Vba, the value of the current detection voltage Vfi, and the value of the load current Ifi measured by the ammeter Ai1 from formula (1b) or formula (3b) as the present values of the correction parameters, creates four, five, or more simultaneous equations having the first to fourth correction coefficients Ki1 to Ki4 or the first to fifth correction coefficients Ki1 to Ki5 as unknowns for each current detection resistor 50$i$, and calculates the first to fourth correction coefficients Ki1 to Ki4 or the first to fifth correction coefficients Ki1 to Ki5 using the method of least squares.

Note that in the second embodiment, the present resistance Rti is obtained by dividing the high-precision digital conversion value of the current detection voltage Vfi by the load current Ifi, which is measured with a high degree of precision, and therefore does not include an AD conversion error produced by an AD converter that operates using the AD reference voltage Vref. Hence, the present resistance is based on an analog value obtained by dividing the analog value of the current detection voltage Vfi generated by the current detection circuit 47$i$ by the load current Ifi measured with a high degree of precision.

The select/write command issuing unit 903 transmits address information specifying the individual types of the correction parameters transmitted from the second integrated circuit element 400B via the pair of serial-to-parallel converters 904, 421, and transfers the first to fourth correction coefficients Ki1 to Ki4 or the first to fifth correction coefficients Ki1 to Ki5 calculated by the calculation control unit 901 to the second integrated circuit element 400B as correction coefficients for the respective current detection resistors 50$i$, whereupon the correction coefficients are written to the data memory 422.

Note that the environmental temperatures of the plurality of current detection resistors 50$i$ are adjusted by having the energization command issuing unit 905 generate the drive command signals CNTi, generating the open/close command signals DRVi for the plurality of driving open/close elements 45$i$ all at once via the drive gate circuits 48$i$ in the second integrated circuit element 400B, setting the energization duties thereof as large or small or as large, medium, or small, increasing or reducing the load currents Ifi of the standard sample loads 104, and then ejecting cold air or warm air onto the plurality of current detection resistors 50$i$ all at once via the first airflow adjustment solenoid valve 920 and an ejection nozzle in order to adjust the temperatures thereof rapidly in a plurality of stages, namely high and low or high, medium, and low.

Further, the environmental temperature of the constant voltage power supply 410 is adjusted by modifying the resistance value of the dummy load resistor 910 so as to increase or reduce the output current applied to the constant voltage power supply, and then ejecting cold air or warm air onto the constant voltage power supply via the second airflow adjustment solenoid valve 930 and an ejection nozzle in order to adjust the temperature thereof rapidly in a plurality of stages, namely high and low or high, medium, and low.

Values set in advance by experiment are applied in accordance with target temperatures as the respective magnitudes of the load currents Ifi or the output current applied to the plurality of current detection resistors 50$i$ or the constant voltage power supply 410, and the appropriate flow rate of the airflow generated by the first airflow adjustment solenoid valve 920 or the second airflow adjustment solenoid valve 930.

The first voltmeter V1 for measuring the end-to-end voltage of at least one of the plurality of current detection resistors 50$i$, the fifth voltmeter V5 for measuring the power supply voltage Vb of the constant voltage power supply 410, and the fourth voltmeter V4 for measuring the value of the control voltage Vcc serving as the stabilized output voltage are connected to the adjustment board 800, and either analog signal voltages therefrom are input into the calculation control unit 901 of the adjustment tool 900B via the second AD converter 909$b$, or digital measurement values therefrom are input into the calculation control unit 901.

The adjustment tool 900B is configured to be capable of calculating the resistance value R1 relating to one of the current detection resistors 50$i$ by dividing the measurement value obtained by the first voltmeter V1 by the current measured by the load current meter Ai1, calculating the present resistance Rti by dividing the current detection voltage Vfi by the current measured by the load current meter Ai1, comparing the resistance value R1 with the present resistance Rti, and generating monitoring data relating to variation in the resistance value Ri and variation in the present resistance Rti.

The adjustment tool 900B is also configured to be capable of comparing the measurement value obtained by the fifth voltmeter V5, the value of the environment monitoring voltage V3 applied to the power supply detection voltage Vba, which is a divided voltage obtained by dividing the power supply voltage Vb, and the measurement value obtained by the fourth voltmeter V4, and generating monitoring data relating to the presence of an abnormality in the constant voltage power supply 410, the presence of an abnormality in the power supply detection voltage Vba, and variation in the measurement values.

As a result, variation among a plurality of products can be monitored, and lot management can be performed in accordance with the presence or absence of defective products.

The method of calculating the first to fourth correction coefficients Ki1 to Ki4 or the first to fifth correction coefficients Ki1 to Ki5 using the adjustment tool having the above configuration is as shown in FIG. 6.

Note, however, that in step 601 of FIG. 6, the adjustment tool 900B energizes the plurality of standard sample loads 104 all at once using large, medium, or small load currents by generating the drive command signals CNTi instead of the open/close command signals DRVi.

(4) Main Points and Features of the Second Embodiment

As is evident from the above description, the power supply control device 100B according to the second embodiment of this invention receives power from the DC power supply 101 and supplies the plurality of inductive loads 104$i$ (i=1, 2, . . . , m; likewise hereafter) with the individually variable load currents Ifi, wherein the power supply control device is configured such that the first integrated circuit element 200B having the microprocessor 210 that cooperates with the program memory 211 as a main body and the second integrated circuit element 400B including the plurality of driving open/close elements 45$i$ that are connected to each other in series via the pair of serial-to-parallel converters 221, 421 in order to supply power to the plurality of inductive loads 104$i$ are housed in an identical housing, and heat generated by the plurality of driving open/close elements 45$i$ is transferred to the housing and thereby dissipated, and the first integrated circuit element 200B causes the second integrated circuit element 400B to generate the open/close command signals DRVi having the energization duties γi by generating the drive command signals CNTi, which are first stage pulse width modulation signals having command duties αi that correspond to the ratios Iti/Imax of the respective target currents Iti to the maximum target current Imax, in accordance with the target currents Iti determined by the target current setting means 241 in order to obtain the load currents Ifi.

The second integrated circuit element 400B includes:

the constant voltage power supply 410 that generates the stabilized control voltage Vcc by stepping down the power supply voltage Vb of the DC power supply 101, and supplies the control voltage Vcc to the first integrated circuit element 200B;

the current detection resistors 50$i$ respectively connected in series to the inductive loads 104$i$;

the plurality of current detection circuits 47$i$ for generating the current detection voltages Vfi that are respectively proportionate to the load currents Ifi by amplifying the respective end-to-end voltages of the current detection resistors;

the plurality of drive gate circuits 48$i$ that drive the plurality of driving open/close elements 45$i$ respectively ON and OFF in accordance with the pulse width modulation signals so as to variably control the energization duties γi, which are ratios of the respective closed periods of the plurality of driving open/close elements 45$i$ to the ON-OFF period;

the plurality of temperature sensors including the one or more resistor temperature detection elements 44$i$0, 44$i$ for detecting the present temperatures of the plurality of current detection resistors 50$i$ either individually or representatively and the power supply temperature detection element 440 for detecting the present temperature of the constant voltage power supply 410; and the non-volatile data memory 422.

The control characteristic correction data for calculating the present resistances Rti of the converted equivalent resistances that are obtained by dividing the respective values of the current detection voltages Vfi, which vary in response to variation in the environmental conditions specified by the correction parameters and individual variation among circuit components including the current detection resistors 50$i$ and the current detection circuits 47$i$, by the load currents Ifi are stored in the data memory 422, and these correction data are transmitted in series to the buffer memory 222 provided in the first integrated circuit element 200B at the start of an operation, the microprocessor 210 includes the present resistance calculating means 242 that obtains the present values of the correction parameters, which include the detected temperatures obtained by the plurality of temperature sensors or the power supply detection voltage Vba that is proportionate to the detected temperatures and the power supply voltage Vb, during the operation by receiving the plurality of analog signal voltages serving as the correction parameters via the multiplexer 430 and then digitally converting the analog signal voltages using the master side AD converter 230, and corrects the ON-OFF duties of the pulse width modulation signals by combining the present values with the correction data, and the correction data calculated by the adjustment tool 900B are stored in the data memory 422 via the slave station side serial-to-parallel converter 421 of the pair of serial-to-parallel converters.

Note that the uplink monitoring data may be transmitted to the microprocessor 210 via the slave side AD converter 450 and the pair of serial-to-parallel converters 421, 221, as in the third embodiment, instead of the multiplexer 430. In both cases, the plurality of uplink monitoring data to be transmitted can be either selected using the downlink control data SRO transmitted from the master station serial-to-parallel converter 221 to the slave station serial-to-parallel converter 421, or specified using a 4-bit digital signal line, for example, that is connected between the first integrated circuit element and the second integrated circuit element.

The microprocessor 210 provided in the first integrated circuit element 200B includes the PWM conversion means 245 that generates the drive command signal CNTi, which has the command duty $\alpha i = Iti/Imax = Vti/Vmax$ that is a ratio of the corrected target detection voltage Vti obtained by multiplying the target current Iti by the estimated present resistance Rti to the maximum target detection voltage $Vmax = Imax \times Rti$ obtained by multiplying the maximum target current Imax by the present resistance Rti, the signal power supply voltage of the drive command signal CNTi serving as the pulse width modulation signal generated by the PWM conversion means being used as the control voltage Vcc, the second integrated circuit element 400B includes the negative feedback control circuit 49i that limits the maximum value of the current detection voltage Vfi obtained when the load current Ifi corresponds to the maximum target current Imax to or below the control voltage Vcc, compares the analog conversion value of the target detection voltage Vti, which is obtained by smoothing the drive command signal CNTi using the smoothing circuit 51i, with the current detection voltage Vfi, and generates the open/close command signal DRVi having the energization duty γi of the driving open/close element 45i so that the comparison inputs match each other, and the value of the current detection voltage Vfi is output to the output terminal of the second integrated circuit element 400B via the multiplexer 430 as a part of the correction parameters, and since the microprocessor 210 is not required to implement input processing thereon, the corresponding current detection voltage Vf is used in the adjustment tool 900B.

With respect to claim 6 of this invention, as described above, the second integrated circuit element compares the analog conversion value of the corrected target detection voltage Vti transmitted from the microprocessor with the current detection voltage Vfi serving as the negative feedback control signal, and generates the open/close command signal for the driving open/close element so that the two values match each other, whereupon the present resistance Rti is calculated on the basis of the control characteristic correction data stored in the data memory and the present environment information obtained during the operation.

Hence, as long as the corrected target detection voltage Vti matches the current detection voltage Vfi, the target current Iti matches the load current Ifi, and therefore a large number of variation errors can be corrected easily by integrating the variation errors into the present resistance Rti. Moreover, the negative feedback control is implemented by hardware provided in the second integrated circuit element, thereby lightening a high-speed control load of the microprocessor.

Further, by smoothing the drive command signal CNTi, the corrected target detection voltage Vti is transmitted downlink using a small number of signal lines, while the current detection voltage Vfi required to generate the correction data is likewise transmitted uplink relative to the adjustment tool by a small number of signal lines as a part of the correction parameters. As a result, the number of terminals of the first and second integrated circuit elements can be suppressed, enabling reductions in the size and cost thereof.

In the control characteristic correction data generation method for a power supply control device, the power supply control device 100B is constituted by the second integrated circuit element 400B that cooperates with the first integrated circuit element 200B, the second integrated circuit element includes the driving open/close elements 45i for supplying the plurality of inductive loads 104i (i=1, 2, ..., m; likewise hereafter) with the individually variable load currents Ifi, the drive gate circuits 48i for open/close controlling the respective driving open/close elements 45i, and the current detection resistors 50i for detecting the load currents Ifi, and the first to fourth correction coefficients Ki1 to Ki4 indicated in formula (1b) or the first to fifth correction coefficients Ki1 to Ki5 indicated in formula (3b) are calculated in order to calculate the present resistances Rti=Vfi/Ifi, which vary in response to individual variation among the applied circuit components and variation in the environmental temperature or the power supply voltage, as equivalent resistances by dividing the respective current detection voltages Vfi, which are obtained by amplifying the end-to-end voltages of the respective current detection resistors 50i, by the load currents Ifi, wherein the power supply control device 100B includes the adjustment board 800 on which the single second integrated circuit element 400B is mounted detachably, and the adjustment tool 900B that is connected to the second integrated circuit element via the adjustment board 800, and the DC power supply 101 is connected to the adjustment board 800 via the voltage regulator 940 in order to supply power to the second integrated circuit element 400B, the second integrated circuit element supplies the load current Ifi to the series circuit formed by the ammeter Ai1 and the standard sample load 104, and the dummy load resistor 910 is connected to the output circuit of the constant voltage power supply 410 provided in the second integrated circuit element.

The adjustment tool 900B includes the calculation control unit 901, the setting display unit 902, the select/write command issuing unit 903, the master station side serial-to-parallel converter 904 that is connected in series to the slave station side serial-to-parallel converter 421 in the second integrated circuit element 400B, the energization command issuing unit 905 for generating a pulse width modulation signal that serves as the drive command signal CNTi in the second integrated circuit element 400B, the first AD converter 909a and the second AD converter 909b into which the present values of the correction parameters generated by the second integrated circuit element 400B are input, and the environment adjustment unit 906, the first AD converter 909a operates using the control voltage Vcc generated by the second integrated circuit element 400B as the AD reference voltage Vref so as to digitally convert the analog signal voltage V3 serving as one of the present values of the correction parameters, transmitted by the second integrated circuit element, and input the result into the calculation control unit 901, when the measurement value of the ammeter Ai1 or the current detection voltage Vfi is generated as an analog signal voltage and the current detection voltage Vfi is used in the second integrated circuit element 400B during the negative feedback control, the second AD converter 909b operates using the stabilized voltage generated by the high-precision constant voltage power supply 908 as the AD reference voltage Vrf so as to digitally convert the measured value of the load current Ifi or the current detection voltage Vfi and input the result into the calculation control unit 901, and the AD reference voltage Vrf applied to the second AD converter 909b is more precise than the AD reference voltage Vref applied to the first AD converter 909a, and in a case where the measurement value of the ammeter Ai1 or the current detection voltage Vfi is generated as a digital signal voltage, the digital measurement value thereof is input as is into the calculation control unit 901, thereby eliminating the need for the second AD converter 909b.

The environment adjustment unit 906 is operated from the calculation control unit 901 via the setting display unit 902, and includes the first step for generating a command to modify the resistance value of the dummy load resistor 910, a command to modify the output voltage output to the voltage regulator 940, and a command to modify the environmental temperature of the constant voltage power supply 410 provided in the second integrated circuit element 400B and the environmental temperature of the current detection resistor 50i, the calculation control unit 901 includes the second step 611 for reading the temperature detection voltage Ti generated by the resistor temperature detection element 44i or the temperature detection voltage Ti0 generated by the representative temperature detection element 44i0, the temperature detection voltage T0 generated by the power supply temperature detection element 440, the power supply detection voltage Vba, the value of the current detection voltage Vfi, and the value of the load current Ifi measured by the ammeter Ai1 from formula (1b) or formula (3b) as the present values of the correction parameters, creating four, five, or more simultaneous equations having the first to fourth correction coefficients Ki1 to Ki4 or the first to fifth correction coefficients Ki1 to Ki5 as unknowns for each current detection resistor 50i, and calculating the first to fourth correction coefficients Ki1 to Ki4 or the first to fifth correction coefficients Ki1 to Ki5 using the method of least squares, and the select/write command issuing unit 903 includes the third step 607 for transmitting the address information specifying the individual types of the correction parameters transmitted from the second integrated circuit element 400B, and transferring the first to fourth correction coefficients Ki1 to Ki4 or the first to fifth correction coefficients Ki1 to Ki5 calculated by the calculation control unit 901 to the second integrated circuit element 400B as the correction coefficients for the respective current detection resistors 50i, whereupon the correction coefficients are written to the data memory 422 provided in the second integrated circuit element 400B.

Note that in the second embodiment, the present resistance Rti does not include a correction applied to the AD conversion error, and therefore, during an actual operation of the power supply control device, the current detection voltage Vfi and the target detection voltage Vti are input into the negative feedback control circuit 49i as analog signal voltages in a condition where an AD conversion error is not included in either thereof. As a result, the negative feedback control can be implemented with a high degree of precision.

Detailed Description of Third Embodiment (1) Detailed Description of the Configuration Configurations shown in FIG. 11, which is an overall circuit block diagram of a power supply control device according to a third embodiment of this invention, and FIG. 12, which is a detailed circuit block diagram relating to one power supply circuit portion of the power supply control device shown in FIG. 11, will be described in detail below, focusing on differences with the configurations shown in FIGS. 1 and 2.

Figure 11:
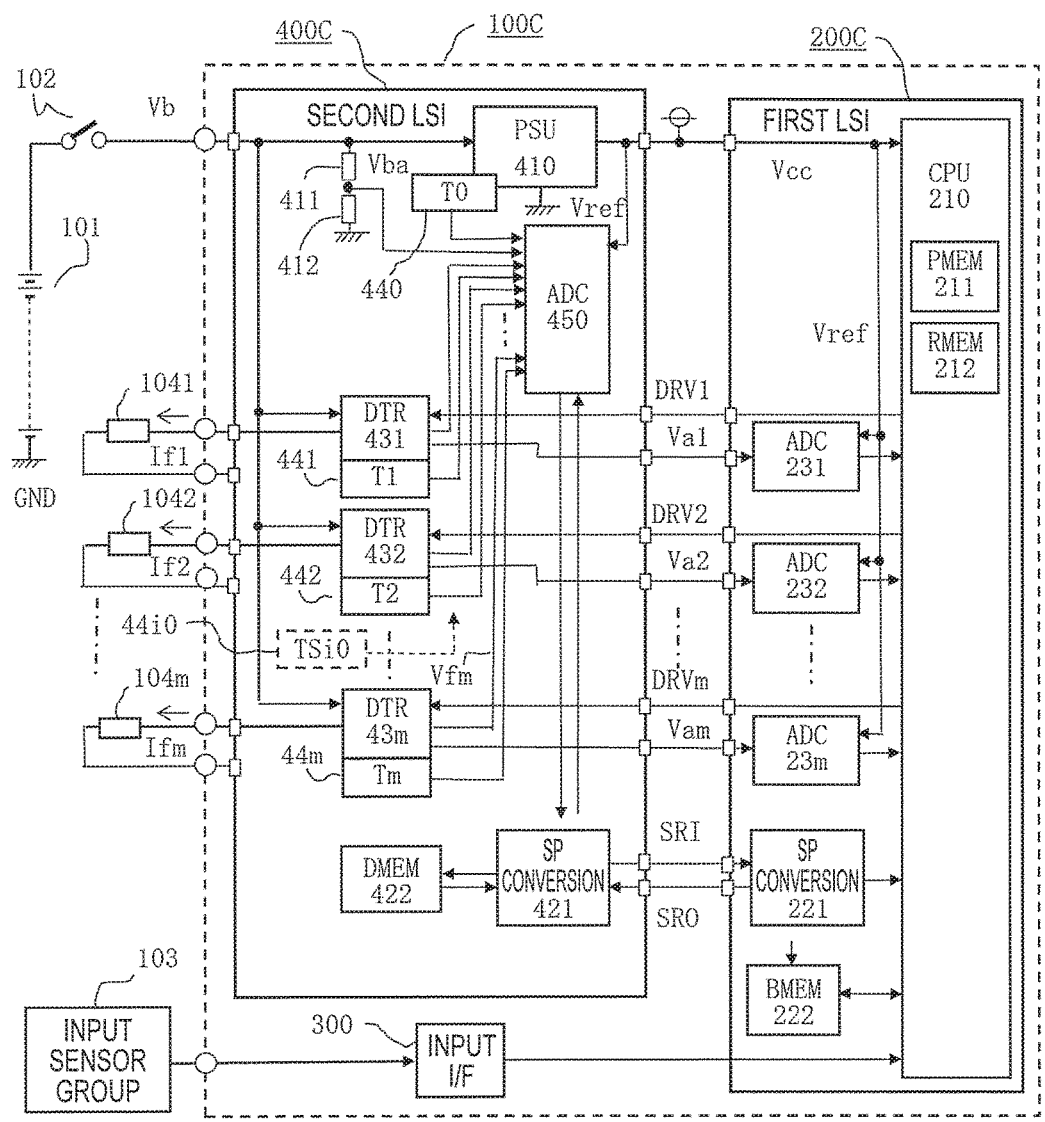
FIG. 11 is an overall circuit block diagram of a power supply control device according to a third embodiment of this invention.
Figure 12:
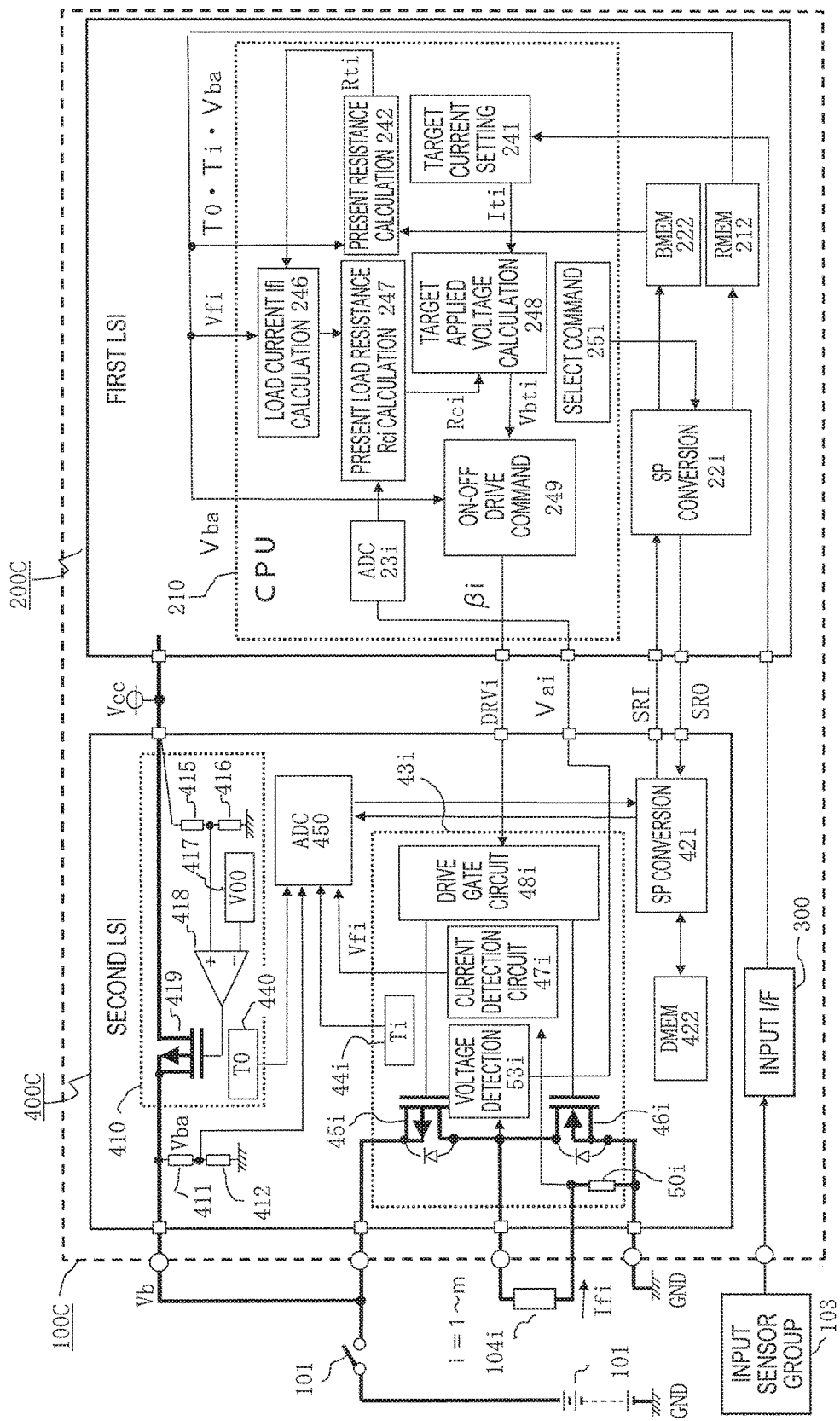
FIG. 12 is a detailed circuit block diagram relating to a power supply circuit portion of the power supply control device shown in FIG. 11.

Note that in FIGS. 1 and 2, negative feedback control is executed in relation to the load current Ifi by the microprocessor 210 provided in the first integrated circuit element 200A, whereas in FIGS. 11 and 12, negative feedback control is not implemented, and instead, the open/close command signal DRVi is generated by ON-OFF drive command issuing means 249 at an energization duty βi using a load resistance Rci calculated by present load resistance calculating means 247 provided in a first integrated circuit element 200C.

Accordingly, a second integrated circuit element 400C implements ON-OFF control on the driving open/close element 45i via the drive gate circuit 48i.

In FIG. 11, similarly to the case shown in FIG. 1, the DC power supply 101, the output contact 102 of the power relay, the input sensor group 103, and the plurality of inductive loads 104i serving as a part of the electric load group, not shown in the drawings, are connected to a power supply control device 100C.

Further, a power supply control device 100C is constituted by the first integrated circuit element 200C having the microprocessor 210 as a main body, and the second integrated circuit element 400C that has the drive circuit portions 43i for supplying power to the respective inductive loads 104i as a main body and includes the constant voltage power supply 410. The control voltage Vcc, which is a stabilized voltage of DC 5 V, for example, is applied to the microprocessor 210 via the constant voltage power supply 410.

Similarly to the case shown in FIG. 1, the first integrated circuit element 200C and the second integrated circuit element 400C are connected in series by a pair of serial-to-parallel converters constituted by the master station serial-to-parallel converter 221 and the slave station serial-to-parallel converter 441, the first integrated circuit element 200C serving as the master side and the second integrated circuit element 400C serving as the slave side, such that data are exchanged between the master side volatile buffer memory 222 and the slave side non-volatile data memory 422. Further, the first integrated circuit element 200C includes the non-volatile program memory 211 that cooperates with the microprocessor 210, and the RAM memory 212 used for the calculation processing.

The temperature detection voltage T0 generated by the power supply temperature detection element 440 provided in the constant voltage power supply 410 of the second integrated circuit element 400C, the power supply detection voltage Vba obtained by dividing the power supply voltage Vb using the voltage dividing resistors 411, 412, the temperature detection voltage Ti, Ti0 generated with respect to the current detection resistor 50i by the resistor temperature detection element 44i or the representative temperature detection element 44i0, and the current detection voltage Vfi obtained by amplifying the end-to-end voltage of the current detection resistor 50i are respectively connected to different input terminals of a multichannel AD converter serving as a slave side AD converter 450, and the multichannel AD converter selects one analog input signal in response to a selection command from the microprocessor 210, which is obtained from the slave station serial-to-parallel converter 421, and transmits a digital conversion value of the selected analog input signal to the microprocessor 210 via the pair of serial-to-parallel converters 421, 221. The control voltage Vcc generated by the constant voltage power supply 410 is used as the AD reference voltage Vref of the multichannel AD converter.

Note that instead of the multichannel AD converter, the analog signal may be selected using a multiplexer, similarly to the case shown in FIG. 1, and the digital conversion value may be input into the microprocessor 210 by the master side AD converter.

Next, configurations shown in FIG. 12, which is a detailed circuit block diagram showing target applied voltage calculating means 248 realized by the microprocessor 210, and the drive circuit portion 43i and the constant voltage power supply 410 provided in the second integrated circuit element 400C, will be described in detail.

In FIG. 12, similarly to the case shown in FIG. 2, the constant voltage power supply 410 is constituted by the serial open/close element 419, the comparison circuit 418, the voltage dividing resistors 415, 416, the power supply reference voltage 417, and the power supply temperature detection element 440, and generates the stabilized control voltage Vcc from the power supply voltage Vb.

The drive circuit portion 43i includes the driving open/close element 45i connected in series to the inductive load 104i, and the commutation circuit element 46i connected in parallel to the series circuit formed by the inductive load 104i and the current detection resistor 50i. The duty factor $\gamma i$=ON time/ON-OFF period of the driving open/close element 45i is controlled via the drive gate circuit 48i that operates in response to the open/close command signal DRVi generated by the first integrated circuit element 200C, and the commutation circuit element 46i closes when the driving open/close element 45i is open, whereby the load current Ifi is commuted.

An applied voltage detection circuit 53i measures the end-to-end voltage of the inductive load 104i or an end-to-end voltage relative to the series circuit formed by the inductive load 104i and the current detection resistor 50i, and generates an analog signal voltage serving as an average applied voltage Vai by smoothing the measured end-to-end voltage using a smoothing capacitor.

The average applied voltage Vai is smoothed by a smoothing capacitor having a smoothing time constant that is larger than the open/close period of the open/close drive signal DRVi.

In the first integrated circuit element 200C, meanwhile, the program memory 211 that cooperates with the microprocessor 210 includes a control program that serves as the target current setting means 241, the present resistance calculating means 242, load current calculating means 246, present load resistance calculating means 247, target applied voltage calculating means 248, ON-OFF drive command issuing means 249, and the selection command issuing means 251.

In a case where the inductive load 104i is a linear solenoid provided for a proportional solenoid valve used during oil pressure control, the target current setting means 241 determines the target current Iti by referring to oil pressure-to-current characteristic data in which a required oil pressure is associated with a corresponding excitation current to be applied to the linear solenoid.

The present resistance calculating means 242 calculates the present resistance Rti by reading the correction coefficients Ki1 to Ki4 or the correction coefficients Ki1 to Ki5, which are stored in advance in the data memory 422 of the second integrated circuit element 400C, and referring to the temperature detection voltages T0, Ti (or Ti0) and the power supply detection voltage Vba transmitted from the slave side AD converter 450.

The load current calculating means 246 calculates the load current Ifi=Vfi/Rti by dividing the value of the current detection voltage Vfi, transmitted from the slave side AD converter 450, by the present resistance Rti calculated by the present resistance calculating means 242.

The present load resistance calculating means 247 calculates a present load resistance Rci=Vai/Ifi by dividing the value of the average applied voltage Vai, transmitted from the second integrated circuit element 400C, by the load current Ifi calculated by the load current calculating means 246. This will be described in detail below using FIG. 14. The target applied voltage calculating means 248 calculates a target applied voltage Vbti=Iti×Rci by multiplying the target current Iti set by the target current setting means 241 by the present load resistance Rci calculated by the present load resistance calculating means 247.

The ON-OFF drive command issuing means 249 calculates the energization duty $\beta i$=Vbti/Vb by dividing the target applied voltage Vbti calculated by the target applied voltage calculating means 248 by the power supply voltage Vb, which is back-calculated from the power supply detection voltage Vba transmitted from the slave side AD converter 450.

In so doing, the ON-OFF drive command issuing means 249 generates an ON-OFF pulse having a closing period of Ton=$\beta i$×T relative to the ON-OFF period T.

Note that the selection command issuing means 251 acts on the slave side AD converter 450 via the pair of serial-to-parallel converters 221, 421 to specify the temperature detection voltages T0, Ti (or Ti0), the power supply detection voltage Vba, and the current detection voltage Vfi in succession, whereupon a digital conversion value of the specified analog signal voltage is input into the microprocessor 210 via the pair of serial-to-parallel converters 421, 221.

(2) Detailed Description of Actions and Operations

Actions and operations of the power supply control device according to the third embodiment, configured as shown in FIGS. 11 and 12, will now be described in detail on the basis of a flowchart shown in FIG. 13.

First, in FIGS. 11 and 12, when a power switch, not shown in the drawings, is closed, the output contact 102 of the power relay is closed, whereby the power supply voltage Vb is applied to the power supply control device 100C.

As a result, the constant voltage power supply 410 generates the control voltage Vcc, which is a stabilized voltage of DC 5 V, for example, whereupon the microprocessor 210 forming the first integrated circuit element 200C starts to implement a control operation.

The microprocessor 210 generates a load driving command signal to be applied to the electric load group, not shown in the drawings, connected to the output interface circuit, not shown in the drawings, in accordance with the operating condition of the input sensor group 103, which is input through the input interface circuit 300, and the content of the control program stored in the non-volatile program memory 211, and implements ON-OFF control on the plurality of inductive loads 104$i$, which serve as specific electric loads of the electric load group, via the driving open/close elements 45$i$ in order to control the respective energization currents thereof.

Note that in FIGS. 11 and 12, the sites that cause control errors during the current control are as shown on the characteristic diagrams of FIGS. 3A to 3D.

Further, a plurality of coefficients constituted by all or a part of the first to fourth correction coefficients Ki1 to Ki4, which are illustrated above in formula (1a), are stored in the data memory 422 of the second integrated circuit element 400C as control characteristic correction data in order to calculate the present resistance Rti of the converted equivalent resistance that is obtained by dividing the digital conversion value of the current detection voltage Vfi by the load current Ifi.

The present resistance calculating means 242 then calculates, by estimation, the present resistance Rti from formula (1a) by reading all or a part of the present value of the temperature detection voltage Ti generated by the resistor temperature detection element 44$i$, the present value of the temperature detection voltage T0 generated by the power supply temperature detection element 440, and the present value of the power supply detection voltage Vba, and applying all or a part of the first to fourth correction coefficients Ki1 to Ki4 thereto.

Note that when the first to fifth correction coefficients Ki1 to Ki5 are stored in the data memory 422, the present resistance Rti is calculated from formula (4a) by referring to the temperature detection voltage Ti0 generated with respect to the current detection resistor 50$i$ by the representative temperature detection element 44$i$0.

Next, FIG. 13, which is a flowchart illustrating operations of the first integrated circuit element 200C and the second integrated circuit element 400C, will be described, focusing on steps having step numbers in the 1300s, which differ from the steps shown in FIG. 4.

Figure 13:
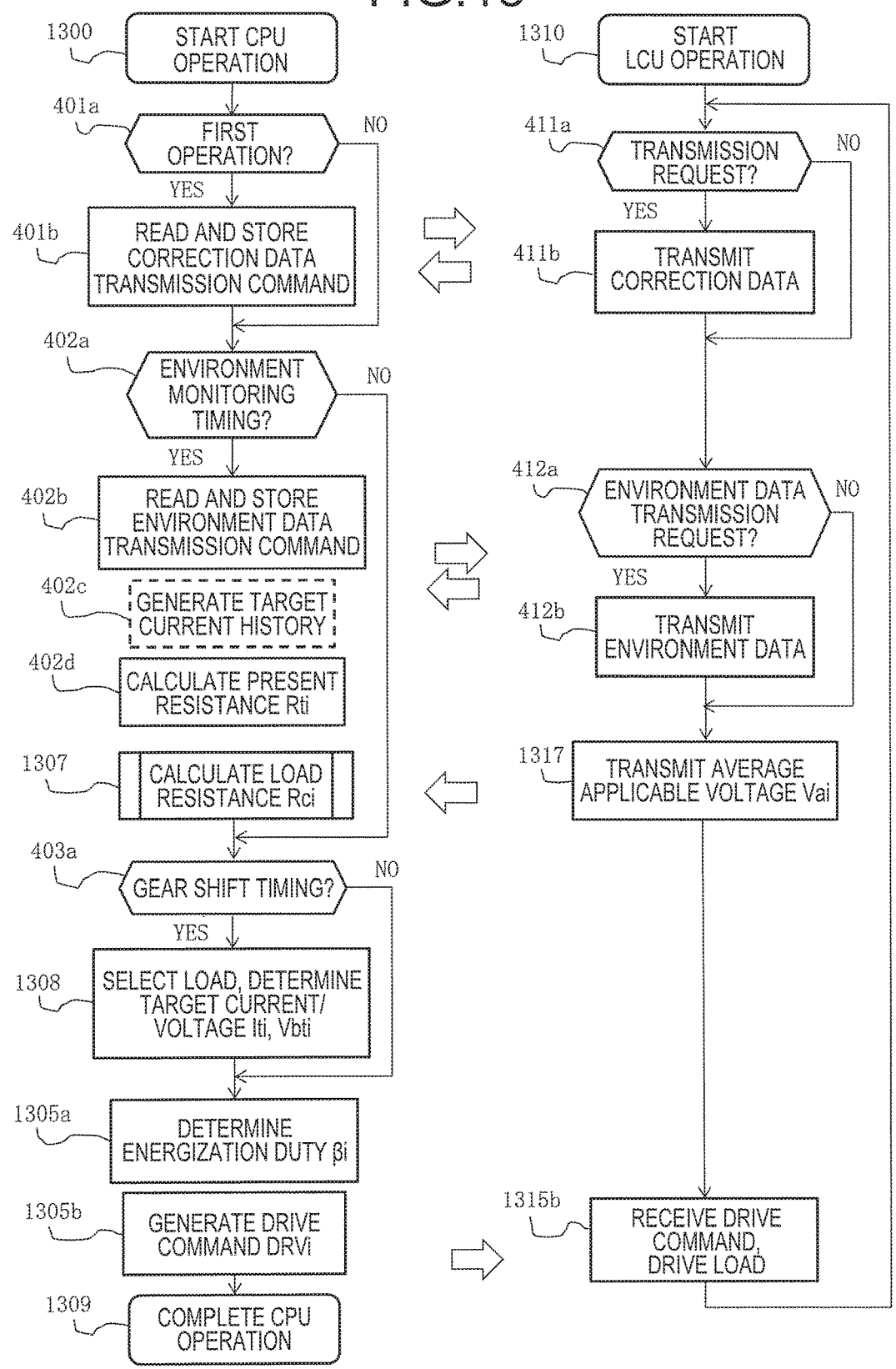
FIG. 13 is a flowchart illustrating operations of a first integrated circuit element and a second integrated circuit element of the power supply control device shown in FIG. 11.

In FIG. 13, step 1300 is a step for activating the microprocessor 210, and step 1310 is a step for starting operations on an equivalent flowchart illustrating control operations executed by the second integrated circuit element 400C, which is constituted by a logic circuit.

In steps 401$a$ to 402$d$ and step 403$a$ following step 1300, and steps 411$a$ to 412$b$ following step 1310, identical operations to those shown in FIG. 4 are implemented.

A step block 1307 following step 402$d$ corresponds to the present load resistance calculating means 247 shown in FIG. 12, and will be described in detail below using FIG. 14.

In step 1317 following step 412$b$, the second integrated circuit element 400C transmits the average applied voltage Vai, whereupon the routine advances to step 1315$b$.

Step 1308, which is executed when an affirmative determination is obtained in step 403$a$, corresponds to the target applied voltage calculating means 248 shown in FIG. 12, and here, the target applied voltage Vbti is calculated, whereupon the routine advances to step 1305$a$.

In step 1305$a$, which is executed either when a negative determination is obtained in step 403$a$ or after step 1308, the energization duty $\beta i = Vbti/Vb$ is calculated as a ratio of the target applied voltage Vbti calculated in step 1308 to the power supply voltage Vb that is back-calculated from the power supply detection voltage Vba read and stored in step 402$b$. The routine then advances to step 1305$b$.

In step 1305$b$, the drive command signal DRVi is generated in accordance with the energization duty $\beta i$, whereupon the routine advances to step 1309, in which the operation is completed.

In step 1309, another control program is executed, whereupon the routine returns to step 1300, i.e. the start of the operation. Thereafter, the same control program is executed repeatedly.

Note that the second integrated circuit element 400C is configured to drive the driving open/close element 45$i$ and the commutation circuit element 46$i$ ON and OFF via the drive gate circuit 48$i$ in step 1315$b$, and then return to step 411$a$. Moreover, normally, the second integrated circuit element 400C executes steps 1317 and 1315$b$ repeatedly.

Further, with respect to the plurality of inductive loads 104$i$ (i=1, 2, . . . , m), i (=1 to m) iterative operations are implemented in step 402$a$ to step block 1307, i (=1 to m) iterative operations are implemented in step 1308, and i (=1 to m) iterative operations are implemented in steps 1305$a$ to 1305$b$.

Next, the configuration of the step block 1307 shown in FIG. 13 will be described in detail using FIG. 14.

Figure 14:
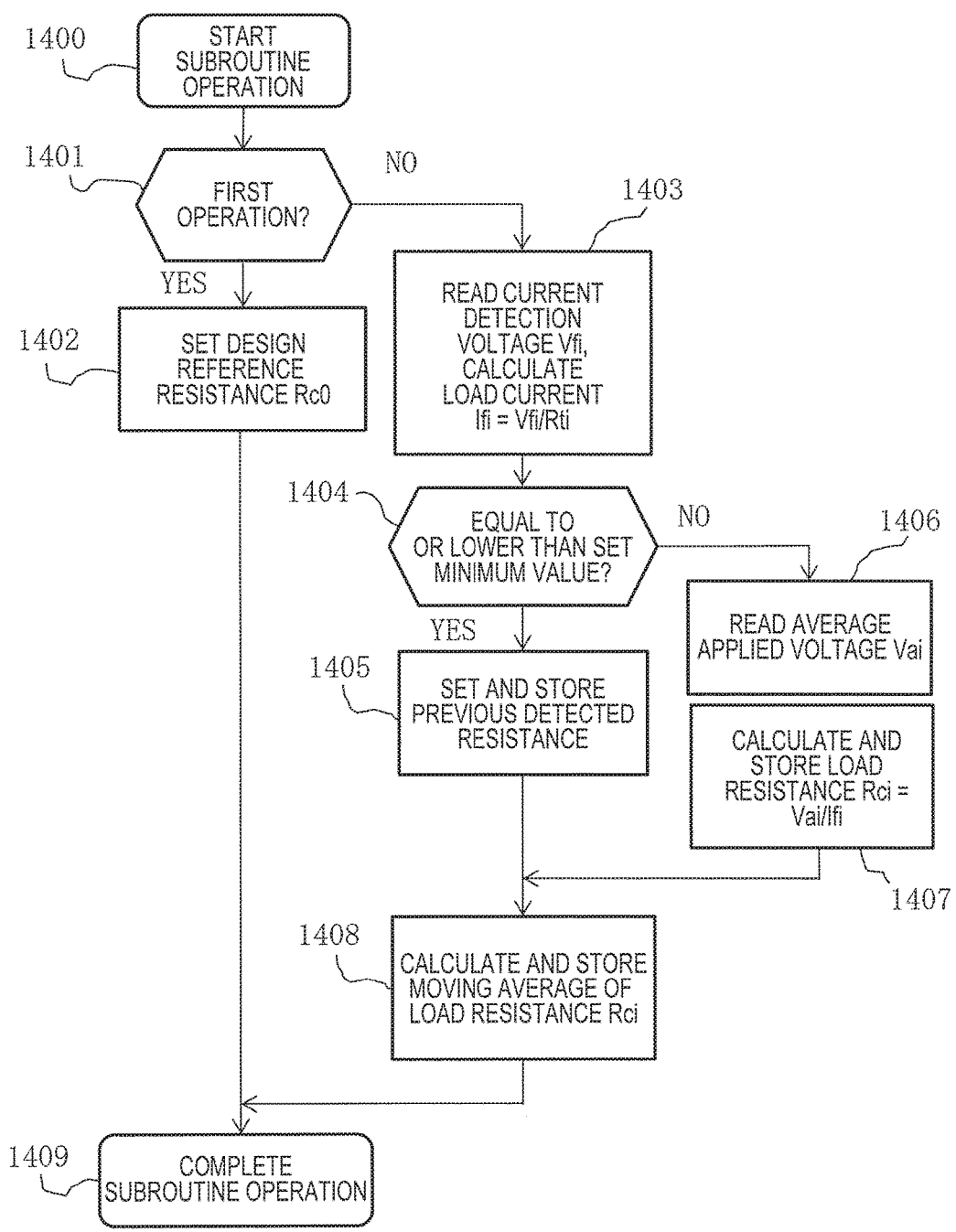
FIG. 14 is a flowchart illustrating an operation of a subroutine program of FIG. 13.

In FIG. 14, step 1400 and step 1409 respectively serve as an operation start step and an operation completion step of the step block 1307 shown in FIG. 13. When an affirmative determination is obtained in step 403$a$ of FIG. 13, the routine advances to step 1400, and following step 1409, the routine advances to step 1305$a$.

Step 1401 following step 1400 is a determination step for determining whether or not the present load resistance Rci of the inductive load 104$i$ is being calculated for the first time. When the present load resistance Rci is being calculated for the first time, the determination is affirmative, and the routine advances to step 1402. When the present load resistance Rci is not being calculated for the first time, the determination is negative, and the routine advances to step 1403.

In step 1402, a design reference resistance Rc0 at a predetermined reference temperature is employed as the value of the present load resistance Rci, and the design reference resistance Rc0 is written to, and thereby stored in, the shift register, not shown in the drawings, constituted by the RAM memory 212. The routine then advances to step 1409.

In step 1403, the load current Ifi=Vfi/Rti is calculated by dividing the value of the current detection voltage Vfi that was read and stored in step 402$b$ by the present resistance Rti calculated in relation to the current detection resistor 50$i$ in step 402$d$, whereupon the routine advances to step 1404.

Step 1404 is a determination step for determining whether or not the load current Ifi calculated in step 1403 is equal to or smaller than a predetermined minimum value. When the load current Ifi is equal to or smaller than the minimum value, the determination is affirmative, and the routine advances to step 1405. When the load current Ifi exceeds the minimum value, the determination is negative, and the routine advances to step 1406. In step 1405, either the value of the design reference resistance Rc0 employed in step 1402 or, if the load resistance Rci has been detected in step 1407 to be described below, the previously calculated load resistance Rci is additionally written to the shift register, whereupon the routine advances to step 1408.

In step 1406, the average applied voltage Vai is read, whereupon the routine advances to step 1407. In step 1407, the present load resistance Rci=Vai/Ifi is calculated by dividing the average applied voltage Vai read in step 1406 by the load current Ifi calculated in step 1403, and then additionally written to the shift register, whereupon the routine advances to step 1408. In step 1408, a moving average value of the present load resistance Rci stored successively in the shift register is calculated as the present load resistance Rci applied in step 1308 of FIG. 13, whereupon the routine advances to step 1409.

Note that the steps from step 402$a$ to step block 1307 in FIG. 13 are executed iteratively in succession on the plurality of inductive loads 104$i$ in order to calculate the respective present load resistances Rci thereof.

(3) Detailed Description of Correction Data Generation Method

The power feeding control device according to the third embodiment, configured as shown in FIGS. 11 and 12, will be described in detail below using FIG. 15, which is a view showing an overall configuration of an adjustment tool used to generate the correction data, focusing on differences with FIG. 5.

Figure 15:
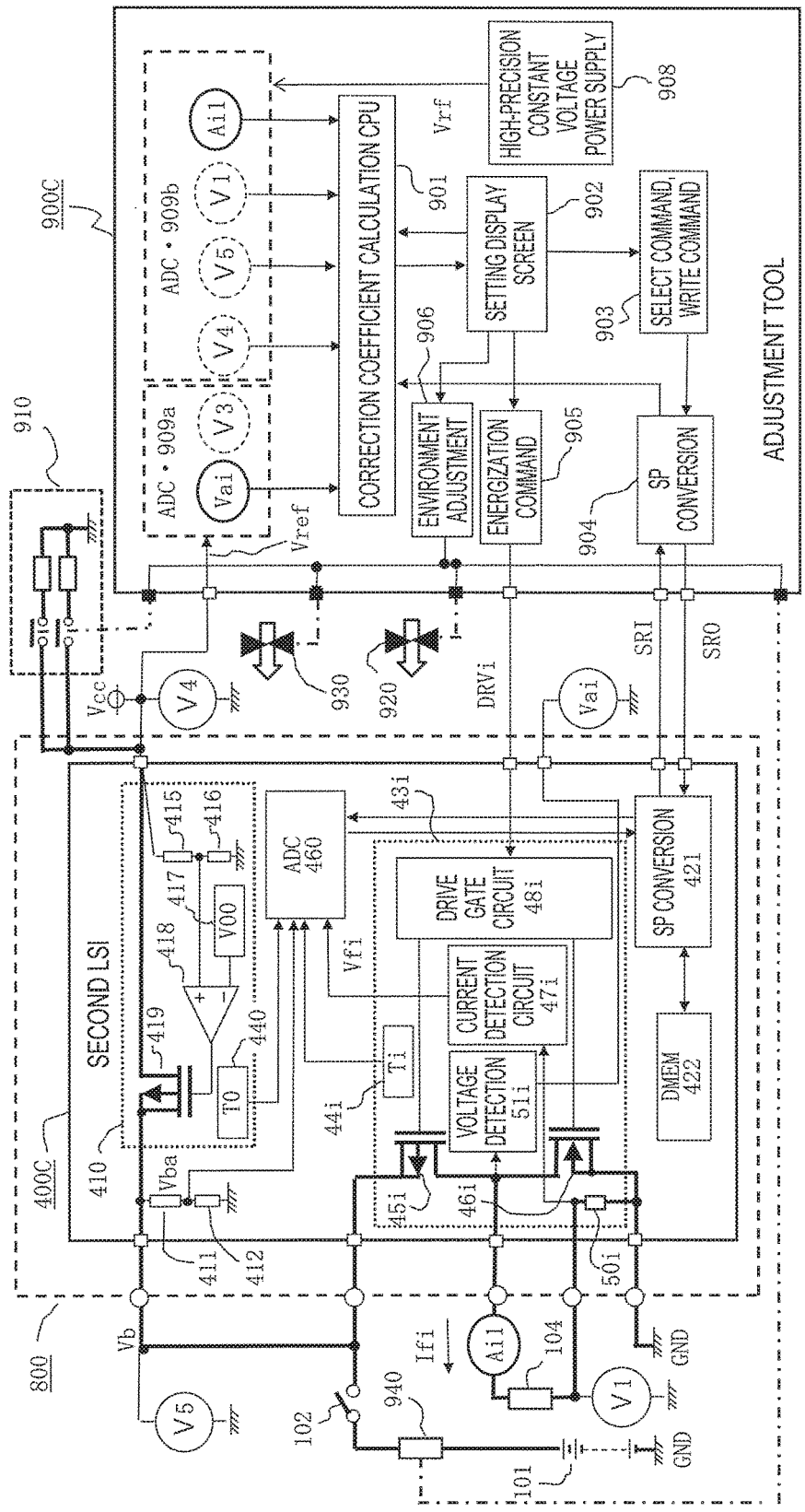
FIG. 15 is a view showing an overall configuration of an adjustment tool applied to the power supply control device shown in FIG. 11.

In FIG. 15, the single second integrated circuit element 400C is mounted detachably on the adjustment board 800 via a socket, not shown in the drawing.

Similarly to the case shown in FIG. 5, the DC power supply 101 is connected to the adjustment board 800 via the voltage regulator 940 in order to supply power to the second integrated circuit element 400C, and the second integrated circuit element supplies the load current Ifi to the series circuit formed by the ammeter Ai1 and the standard sample load 104. Further, the dummy load resistor 910 is connected to the output circuit of the constant voltage power supply 410 provided in the second integrated circuit element.

An adjustment tool 900C, which is constituted by a programmable controller, for example, includes the calculation control unit 901, the setting display unit 902, the select/write command issuing unit 903, the master station side serial-to-parallel converter 904 connected in series to the slave station side serial-to-parallel converter 421 in the second integrated circuit element 400C, the energization command issuing unit 905 for generating the open/close command signal DRVi in relation to the drive gate circuit 48$i$, the first AD converter 909$a$ and the second AD converter 909$b$ into which present values of correction parameters generated by the second integrated circuit element 400C are input, and the environment adjustment unit 906.

The first AD converter 909$a$ operates using the control voltage Vcc generated by the second integrated circuit element 400C as the AD reference voltage Vref so as to digitally convert the average applied voltage Vai, which is obtained when the second integrated circuit element transmits the present values of the correction parameters as analog signals, and input the result into the calculation control unit 901.

Note that environment data output by a slave side AD converter 460, including the temperature detection voltages T0, Ti (or Ti0) or the power supply detection voltage Vba, is input into the calculation control unit 901 via the pair of serial-to-parallel converters 421, 904.

The second AD converter 909$b$ is applied in a case where the ammeter Ai1 is configured to generate an analog signal voltage, and operates using the stabilized voltage generated by the high-precision constant voltage power supply 908 as the AD reference voltage Vrf so as to digitally convert the measured value of the load current Ifi and input the result into the calculation control unit 901.

The AD reference voltage Vrf applied to the second AD converter 909$b$ is more precise than the AD reference voltage Vref applied to the first AD converter 909$a$, and in a case where the ammeter Ai1 generates a measured value in the form of a digital signal voltage, the digital measurement value thereof is input as is into the calculation control unit 901, thereby eliminating the need for the second AD converter 909$b$.

The environment adjustment unit 906 is operated from the calculation control unit 901 via the setting display unit 902 to generate a command to modify the resistance value of the dummy load resistor 910, a command to modify the output voltage output to the voltage regulator 940, and a command to modify the environmental temperature of the constant voltage power supply 410 provided in the second integrated circuit element 400C and the environmental temperature of the current detection resistor 50$i$.

The calculation control unit 901 reads the temperature detection voltage Ti generated by the resistor temperature detection element 44$i$ or the temperature detection voltage Ti0 generated by the representative temperature detection element 44$i$0, the temperature detection voltage T0 generated by the power supply temperature detection element 440, the power supply detection voltage Vba, the value of the current detection voltage Vfi, and the measured value of the load current Ifi from formula (1b) or formula (3b) as the present values of the correction parameters, creates four, five, or more simultaneous equations having the first to fourth correction coefficients Ki1 to Ki4 or the first to fifth correction coefficients Ki1 to Ki5 as unknowns for each current detection resistor 50$i$, and calculates the first to fourth correction coefficients Ki1 to Ki4 or the first to fifth correction coefficients Ki1 to Ki5 using the method of least squares.

Note that in the third embodiment, the present resistance Rti is obtained by dividing the AD-converted value of the current detection voltage Vfi by the load current Ifi that is measured with a high degree of precision, and is therefore assumed to include an AD conversion error produced by an AD converter that operates using the AD reference voltage Vref.

The select/write command issuing unit 903 transmits address information specifying the individual types of the correction parameters transmitted from the second integrated circuit element 400C via the pair of serial-to-parallel converters 904, 421, and transfers the first to fourth correction coefficients Ki1 to Ki4 or the first to fifth correction coefficients Ki1 to Ki5 calculated by the calculation control unit 901 to the second integrated circuit element 400C as correction coefficients for the respective current detection resistors 50$i$, whereupon the correction coefficients are stored in the data memory 422.

Note that the environmental temperatures of the plurality of current detection resistors 50$i$ are adjusted by having the energization command issuing unit 905 generate the open/close command signals DRVi, generating the open/close command signals DRVi for the plurality of driving open/close elements 45$i$ all at once via the drive gate circuits 48$i$ provided in the second integrated circuit element 400C, setting the energization duties thereof as large or small or as large, medium, or small, increasing or reducing the load currents Ifi of the standard sample loads 104, and then ejecting cold air or warm air onto the plurality of current detection resistors 50$i$ all at once via the first airflow adjustment solenoid valve 920 and an ejection nozzle in order to adjust the temperatures thereof rapidly in a plurality of stages, namely high and low or high, medium, and low.

Further, the environmental temperature of the constant voltage power supply 410 is adjusted by modifying the resistance value of the dummy load resistor 910 so as to increase or reduce the output current applied to the constant voltage power supply, and then ejecting cold air or warm air onto the constant voltage power supply via the second airflow adjustment solenoid valve 930 and an ejection nozzle in order to adjust the temperature thereof rapidly in a plurality of stages, namely high and low or high, medium, and low.

Values set in advance by experiment are applied in accordance with target temperatures to the respective magnitudes of the load currents Ifi or the output current applied to the plurality of current detection resistors 50$i$ or the constant voltage power supply 410, and the appropriate flow rate of the airflow generated by the first airflow adjustment solenoid valve 920 or the second airflow adjustment solenoid valve 930.

The first voltmeter V1 for measuring the end-to-end voltage of at least one of the plurality of current detection resistors 50$i$, the fifth voltmeter V5 for measuring the power supply voltage Vb of the constant voltage power supply 410, and the fourth voltmeter V4 for measuring the value of the control voltage Vcc serving as a stabilized output voltage are connected to the adjustment board 800, and either analog signal voltages therefrom are input into the calculation control unit 901 of the adjustment tool 900C via the second AD converter 909$b$, or digital measurement values therefrom are input into the calculation control unit 901.

The adjustment tool 900C is configured to be capable of calculating the resistance value R1 relating to one of the current detection resistors 50$i$ by dividing the measurement value obtained by the first voltmeter V1 by the current measured by the load current meter Ai1, calculating the present resistance Rti by dividing the current detection voltage Vfi by the current measured by the load current meter Ai1, comparing the resistance value R1 with the present resistance Rti, and generating monitoring data relating to variation in the resistance value Ri and variation in the present resistance Rti.

The adjustment tool 900C is also configured to be capable of comparing the measurement value obtained by the fifth voltmeter V5, the value of the environment monitoring voltage V3 applied to the power supply detection voltage Vba, which is a divided voltage obtained by dividing the power supply voltage Vb, and the measurement value obtained by the fourth voltmeter V4, and generating monitoring data relating to the presence of an abnormality in the constant voltage power supply 410, the presence of an abnormality in the power supply detection voltage Vba, and variation in the measurement values.

As a result, variation occurring among the voltage dividing resistors 411, 412 when the power supply voltage Vb is back-calculated from the value of the power supply detection voltage Vba can be corrected.

Further, variation among a plurality of products can be monitored, and lot management can be performed in accordance with the presence or absence of defective products.

The method of calculating the first to fourth correction coefficients Ki1 to Ki4 or the first to fifth correction coefficients Ki1 to Ki5 using the adjustment tool having the above configuration is as shown in FIG. 6.

(4) Main Points and Features of the Third Embodiment

As is evident from the above description, the power supply control device 100C according to the third embodiment of this invention receives power from the DC power supply 101 and supplies the plurality of inductive loads 104$i$ (i=1, 2, . . . , m; likewise hereafter) with the individually variable load currents Ifi, wherein the power supply control device is configured such that the first integrated circuit element 200C having the microprocessor 210 that cooperates with the program memory 211 as a main body and the second integrated circuit element 400C including the plurality of driving open/close elements 45$i$ that are connected to each other in series via the pair of serial-to-parallel converters 221, 421 in order to supply power to the plurality of inductive loads 104$i$ are housed in an identical housing, and heat generated by the plurality of driving open/close elements 45$i$ is transferred to the housing and thereby dissipated, the first integrated circuit element 200C generates the open/close command signals DRVi in the form of pulse width modulation signals for applying the energization duties βi directly to the plurality of driving open/close elements 45$i$ in accordance with the target currents Iti determined by the target current setting means 241 in order to obtain the load currents Ifi, and the second integrated circuit element 400C includes:

the constant voltage power supply 410 that generates the stabilized control voltage Vcc by stepping down the power supply voltage Vb of the DC power supply 101, and supplies the control voltage Vcc to the first integrated circuit element 200C;

the current detection resistors 50$i$ respectively connected in series to the inductive loads 104$i$;

the plurality of current detection circuits 47$i$ for generating the current detection voltages Vfi that are respectively proportionate to the load currents Ifi by amplifying the respective end-to-end voltages of the current detection resistors;

the plurality of drive gate circuits 48$i$ that drive the plurality of driving open/close elements 45$i$ respectively ON and OFF in accordance with the pulse width modulation signals so as to variably control the energization duties γi, which are ratios of the respective closed periods of the plurality of driving open/close elements 45$i$ to the ON-OFF period;

the plurality of temperature sensors including the one or more resistor temperature detection elements 44$i$0, 44$i$ for detecting the present temperatures of the plurality of current detection resistors 50$i$ either individually or representatively and the power supply temperature detection element 440 for detecting the present temperature of the constant voltage power supply 410; and the non-volatile data memory 422.

The control characteristic correction data for calculating the present resistances Rti of the converted equivalent resistances that are obtained by dividing the respective values of the current detection voltages Vfi, which vary in response to variation in the environmental conditions specified by the correction parameters and individual variation among circuit components including the current detection resistors 50$i$ and the current detection circuits 47$i$, by the load currents Ifi are stored in the data memory 422, and these correction data are transmitted in series to the buffer memory 222 provided in the first integrated circuit element 200C at the start of an operation, the microprocessor 210 includes the present resistance calculating means 242 that obtains the present values of the correction parameters, which include the detected temperatures obtained by the plurality of temperature sensors or the power supply detection voltage Vba that is proportionate to the detected temperatures and the power supply voltage Vb, during the operation from the uplink monitoring data received via the pair of serial-to-parallel converters 421, 221 after the plurality of analog signal voltages serving as the correction parameters are digitally converted on the transmission side by the slave side AD converter 450, and corrects the ON-OFF duties of the pulse width modulation signals by combining the present values with the correction data, and the correction data calculated by the adjustment tool 900C are stored in the data memory 422 via the slave station side serial-to-parallel converter 421 of the pair of serial-to-parallel converters.

Note that instead of relying on the slave side AD converter and the pair of serial-to-parallel converters, the uplink monitoring data may be digitally converted by the master side AD convert after the plurality of analog signal voltages are received via the multiplexer, as in the first embodiment. In both cases, the plurality of uplink monitoring data to be transmitted can be either selected using the downlink data transmitted from the master station serial-to-parallel converter 221 to the slave station serial-to-parallel converter 421, or specified using a 4-bit digital signal line, for example, that is connected between the first integrated circuit element and the second integrated circuit element.

The microprocessor 210 provided in the first integrated circuit element 200C includes the present resistance calculating means 242, the load current calculating means 246, the present load resistance calculating means 247, the target applied voltage calculating means 248, and the ON-OFF drive command issuing means 249, the load current calculating means 246 calculates the load current Ifi=Vfi/Rti by dividing the value of the current detection voltage Vfi, received as the uplink monitoring data, by the present resistance Rti calculated by the present resistance calculating means 242, the present load resistance calculating means 247 applies the load reference resistance Rc0 of the inductive load 104*i* at the start of the operation, and once the load current Ifi calculated by the load current calculating means 246 has been stabilized by performing ON-OFF operations on the driving open/close element 45*i* a plurality of times, calculates the present load resistance Rci=Vai/Ifi by dividing the average applied voltage Vai applied to the inductive load 104*i* by the load current Ifi, and the target applied voltage calculating means 248 calculates the target applied voltage Vbti=Iti×Rci by multiplying the target current Iti set by the target current setting means 241 by the present load resistance Rci calculated by the present load resistance calculating means 247.

The ON-OFF drive command issuing means 249 generates the open/close command signal DRVi so as to have the energization duty βi=Vbti/Vb, which is a ratio of the target applied voltage Vbti, calculated by the target applied voltage calculating means 248, to the power supply voltage Vb, the second integrated circuit element 400C drives the driving open/close element 45*i* ON and OFF via the drive gate circuit 48*i* that operates in response to the open/close command signal DRVi, the value of the current detection voltage Vfi is included in the uplink monitoring data and transmitted thus to the microprocessor 210 as a part of the correction parameters, and the average applied voltage Vai is the output voltage of the applied voltage detection circuit 53*i* that smoothes the output voltage of the ON-OFF-driven driving open/close element 45*i* using the smoothing capacitor, and the value of the average applied voltage Vai is input into the microprocessor 210 provided in the first integrated circuit element 200C individually via the AD converter 23*i*.

With respect to claim 7 of this invention, as described above, the microprocessor provided in the first integrated circuit element calculates the present resistance Rti on the basis of the control characteristic correction data stored in the data memory and information indicating the present environment, obtained during the operation, calculates the present load resistance Rci of the inductive load on the basis of the present resistance Rti and the current detection voltage Vfi, and generates the open/close command signal DRVi in accordance with the ratio of the product of the target current Iti and the present load resistance Rci to the power supply voltage Vb, whereupon the second integrated circuit element drives the driving open/close element ON and OFF in accordance with the open/close command signal DRVi transmitted from the microprocessor.

Hence, a large number of variation errors can be corrected easily by integrating the variation errors into the present resistance Rti. Moreover, the present load resistance Rci is calculated on the basis of the value of the present resistance Rti, and therefore an accurate target load current can be obtained without relying on negative feedback control. The load resistance Rci is a value that varies gently, and therefore the high-speed control load of the microprocessor is lightened. Moreover, hardware for implementing negative feedback control is not required on the second integrated circuit element side, and therefore the second integrated circuit element can be reduced in size and cost.

Furthermore, a pulsating current component that accompanies ON-OFF control and a pulsating current component caused by negative feedback control are not superimposed on the load current, and therefore current control can be implemented with stability.

Note that the current detection voltage Vfi required to calculate the present resistance Rti is transmitted uplink by a small number of signal lines as a part of the correction parameters, and therefore the number of terminals of the first and second integrated circuit elements can be suppressed, enabling reductions in the size and cost thereof.

In the control characteristic correction data generation method for a power supply control device, the power supply control device 100C is constituted by the second integrated circuit element 400C that cooperates with the first integrated circuit element 200C, the second integrated circuit element 400C includes the driving open/close elements 45*i* for supplying the plurality of inductive loads 104*i* (i=1, 2, ... , m; likewise hereafter) with the individually variable load currents Ifi, the drive gate circuits 48*i* for open/close controlling the respective driving open/close elements 45*i*, and the current detection resistors 50*i* for detecting the load currents Ifi, and the first to fourth correction coefficients Ki1 to Ki4 indicated in formula (1b) or the first to fifth correction coefficients Ki1 to Ki5 indicated in formula (3b) are calculated in order to calculate the present resistances Rti=Vfi/Ifi, which vary in response to individual variation among the applied circuit components and variation in the environmental temperature or the power supply voltage, as equivalent resistances by dividing the respective current detection voltages Vfi, which are obtained by amplifying the end-to-end voltages of the respective current detection resistors 50*i*, by the load currents Ifi, wherein the power supply control device 100C includes the adjustment board 800 on which the single second integrated circuit element 400C is mounted detachably, and the adjustment tool 900C that is connected to the second integrated circuit element via the adjustment board 800, and the DC power supply 101 is connected to the adjustment board 800 via the voltage regulator 940 in order to supply power to the second integrated circuit element 400C, the second integrated circuit element supplies the load current Ifi to the series circuit formed by the ammeter Ai1 and the standard sample load 104, and the dummy load resistor 910 is connected to the output circuit of the constant voltage power supply 410 provided in the second integrated circuit element.

The adjustment tool 900C includes the calculation control unit 901, the setting display unit 902, the select/write command issuing unit 903, the master station side serial-to-parallel converter 904 that is connected in series to the slave station side serial-to-parallel converter 421 in the second integrated circuit element 400C, the energization command issuing unit 905 for generating a pulse width modulation signal that serves as the open/close command signal DRVi in the second integrated circuit element 400C, the first AD converter 909a and the second AD converter 909b into which the present values of the correction parameters generated by the second integrated circuit element 400C are input, and the environment adjustment unit 906, the first AD converter 909a operates using the control voltage Vcc generated by the second integrated circuit element 400C as the AD reference voltage Vref so as to digitally convert the average signal voltage Vai serving as one of the present values of the correction parameters, transmitted by the second integrated circuit element, and input the result into the calculation control unit 901, when the measurement value of the ammeter Ai1 is generated as an analog signal voltage, the second AD converter 909b operates using the stabilized voltage generated by the high-precision constant voltage power supply 908 as the AD reference voltage Vrf so as to digitally convert the measured value of the load current Ifi and input the result into the calculation control unit 901, and the AD reference voltage Vrf applied to the second AD converter 909b is more precise than the AD reference voltage Vref applied to the first AD converter 909a, and in a case where the measurement value of the ammeter Ai1 is generated as a digital signal voltage, the digital measurement value thereof is input as is into the calculation control unit 901, thereby eliminating the need for the second AD converter 909b.

The environment adjustment unit 906 is operated from the calculation control unit 901 via the setting display unit 902, and includes the first step 610 for generating a command to modify the resistance value of the dummy load resistor 910, a command to modify the output voltage output to the voltage regulator 940, and a command to modify the environmental temperature of the constant voltage power supply 410 provided in the second integrated circuit element 400C and the environmental temperature of the current detection resistor 50i, the calculation control unit 901 includes the second step 611 for reading the temperature detection voltage Ti generated by the resistor temperature detection element 44i or the temperature detection voltage Ti0 generated by the representative temperature detection element 44i0, the temperature detection voltage T0 generated by the power supply temperature detection element 440, the power supply detection voltage Vba, the value of the current detection voltage Vfi, and the value of the load current Ifi measured by the ammeter Ai1 from formula (1b) or formula (3b) as the present values of the correction parameters, creating four, five, or more simultaneous equations having the first to fourth correction coefficients Ki1 to Ki4 or the first to fifth correction coefficients Ki1 to Ki5 as unknowns for each current detection resistor 50i, and calculating the first to fourth correction coefficients Ki1 to Ki4 or the first to fifth correction coefficients Ki1 to Ki5 using the method of least squares, and the select/write command issuing unit 903 includes the third step 607 for transmitting the address information specifying the individual types of the correction parameters transmitted from the second integrated circuit element 400C, and transferring the first to fourth correction coefficients Ki1 to Ki4 or the first to fifth correction coefficients Ki1 to Ki5 calculated by the calculation control unit 901 to the second integrated circuit element 400C as the correction coefficients for the respective current detection resistors 50i, whereupon the correction coefficients are written to the data memory 422 provided in the second integrated circuit element 400C.

Note that in the third embodiment, the present resistance Rti includes a correction applied to the AD conversion error, and therefore, during an actual operation of the power supply control device, the current detection voltage Vfi and the average applied voltage Vai are input into the ON-OFF drive command issuing means 249 in a condition where a shared AD conversion error is included evenly therein. As a result, the negative feedback control can be implemented with a high degree of precision.

In the above description, identical reference numerals denote identical or corresponding parts of the drawings. Further, the respective embodiments of this invention may be modified, omitted, or combined as appropriate within the scope of the invention.

More specifically, the second integrated circuit elements 400A, 400B, 400C used in the first to third embodiments may be configured as a common integrated circuit element of a single type in which non-shared parts are synthesized with shared parts and used selectively. Similarly, the first integrated circuit elements 200A, 200B, 200C may be configured as a common integrated circuit element of a single type in which non-shared parts are synthesized with shared parts in terms of hardware, and the integrated circuit element is set to be compatible with the respective embodiments by means of differences in the control program stored in the program memory 211.

What is claimed is:

1. A power supply control device that receives power from a DC power supply and supplies a plurality of inductive loads with individually variable load currents Ifi (i=1, 2, . . . , m; likewise hereafter),
    wherein the power supply control device is configured such that a first integrated circuit element having a microprocessor that cooperates with a program memory as a main body and a second integrated circuit element including a plurality of driving open/close elements that are connected to each other in series via a pair of serial-to-parallel converters in order to supply power to the plurality of inductive loads are housed in an identical housing, and heat generated by the plurality of driving open/close elements is transferred to the housing and thereby dissipated,
    in accordance with target currents Iti determined by target current setting means in order to obtain the load currents Ifi, the first integrated circuit element either generates open/close command signals DRVi, which are pulse width modulation signals for applying energization duties γi, βi directly to the plurality of driving open/close elements, or causes the second integrated circuit element to generate the open/close command signals DRVi having the energization duties γi by generating drive command signals CNTi, which are first stage pulse width modulation signals having command duties αi that correspond to ratios Iti/Imax of the respective target currents Iti to a maximum target current Imax, the second integrated circuit element comprises:

a constant voltage power supply that generates a stabilized control voltage Vcc by stepping down a power supply voltage Vb of the DC power supply, and supplies the control voltage Vcc to the first integrated circuit element;

current detection resistors respectively connected in series to the inductive loads;

a plurality of current detection circuits that generate current detection voltages Vfi that are respectively proportionate to the load currents Ifi by amplifying respective end-to-end voltages of the current detection resistors;

a plurality of drive gate circuits that drive the plurality of driving open/close elements respectively ON and OFF in accordance with the pulse width modulation signals so as to variably control the energization duties γi, which are ratios of respective closed periods of the plurality of driving open/close elements to an ON-OFF period;

a plurality of temperature sensors including one or a plurality of resistor temperature detection elements for detecting present temperatures of the plurality of current detection resistors either individually or representatively, and a power supply temperature detection element for detecting a present temperature of the constant voltage power supply; and a non-volatile data memory, control characteristic correction data for calculating present resistances Rti of converted equivalent resistances that are obtained by dividing respective values of the current detection voltages Vfi, which vary in response to variation in environmental conditions specified by correction parameters and individual variation among circuit components including the current detection resistors and the current detection circuits, by the load currents Ifi are stored in the data memory, and these correction data are transmitted in series to a buffer memory provided in the first integrated circuit element at the start of an operation, the microprocessor comprises present resistance calculating means for obtaining present values of the correction parameters, which include detected temperatures obtained by the plurality of temperature sensors or a power supply detection voltage Vba that is proportionate to the detected temperatures and the power supply voltage Vb, during the operation either by receiving a plurality of analog signal voltages serving as the correction parameters via a multiplexer and then digitally converting the analog signal voltages using a master side AD converter, or by using uplink monitoring data received via the pair of serial-to-parallel converters after the analog signal voltages are digitally converted on a transmission side by a slave side AD converter, and corrects ON-OFF duties of the pulse width modulation signals by combining the present values with the correction data, and the correction data, which are calculated by an adjustment tool, are stored in the data memory via a slave station side serial-to-parallel converter, among the pair of serial-to-parallel converters.

2. The power supply control device according to claim 1, wherein the current detection voltage Vfi is obtained by amplifying the end-to-end voltage of the current detection resistor using an amplifier provided in the current detection circuit, and the control voltage Vcc generated by the constant voltage power supply is used by the master side AD converter and the slave side AD converter as an AD reference voltage Vref, such that, when an analog input signal voltage matches the AD reference voltage Vref, a full scale digital output determined by a resolution of the AD converter is generated, a plurality of coefficients constituted by all or a part of first to fourth correction coefficients Ki1 to Ki4 indicated below in formula (1a), which is a relational expression expressing a relationship between the present resistance Rti and a design reference resistance R0 of the current detection resistor in a reference environment, are stored in the data memory as the control characteristic correction data $$Rti=(ki1 \times Ti+ki2 \times T0+ki3 \times Vba+ki4) \times G0 \times R0 = Ki1 \times Ti + Ki2 \times T0 + Ki3 \times Vba + Ki4 \quad (1a)$$

where, in formula (1 a), G0 denotes a design reference value of an amplification factor of the current detection circuit, a constant ki1 is a correction coefficient for correcting a temperature detection voltage Ti generated by the resistor temperature detection element, a constant ki2 is a correction coefficient for correcting a temperature detection voltage T0 generated by the power supply temperature detection element, a constant ki3 is a correction coefficient for correcting a common voltage error generated by the current detection circuit when the current detection resistor is connected to a position upstream of the inductive load, and a constant ki4 denotes another offset error component, the present resistance Rti indicated in formula (1a) is converted into a value obtained following amplification by the current detection circuit, and the current detection voltage Vfi is obtained by multiplying the present resistance Rti by the load current Ifi, and the microprocessor comprises the present resistance calculating means for calculating, by estimation, the present resistance Rti from formula (1a) by reading all or a part of a present value of the temperature detection voltage Ti generated by the resistor temperature detection element, a present value of the temperature detection voltage T0 generated by the power supply temperature detection element, and a present value of the power supply detection voltage Vba, and applying all or a part of the first to fourth correction coefficients Ki1 to Ki4 thereto.

3. The power supply control device according to claim 2, wherein, in a case where the plurality of current detection resistors are disposed in a dense arrangement and the resistor temperature detection elements are constituted by a single representative temperature detection element that generates a temperature detection voltage Ti0 representing the present temperatures of all of the current detection resistors, the temperature detection voltage Ti applied to each current detection resistor in formula (1a) is calculated using formula (2), to which a constant ki5 set in consideration of heat generation caused by the load current Ifi is applied, $$Ti = Ti0 + ki5 \times Ifi^2 \quad (2)$$

the present resistance Rti is calculated from formula (3a), which is obtained by inserting formula (2) into formula (1a), $$Rti = [ki1 \times (Ti0 + ki5 \times Ifi^2) + ki2 \times T0 + ki3 \times Vba + ki4] \times G0 \times \quad (3a)$$
$$R0 = Ki1 \times Ti0 + Ki2 \times T0 + Ki3 \times Vba + Ki4 + Ki5 \times Ifi^2$$

where Ki5=ki1×ki5×G0×R0, and the present resistance calculating means calculates, by estimation, the present resistance Rti from formula (4a) by reading all or a part of a present value of the temperature detection voltage Ti0 generated by the representative temperature detection element, the present value of the temperature detection voltage T0 generated by the power supply temperature detection element, and the present value of the power supply detection voltage Vba, and applying all or a part of the first to fifth correction coefficients Ki1 to Ki5 thereto, $$Rti = Ki1 \times Ti0 + Ki2 \times T0 + Ki3 \times Vba + Ki4 + Ki5 \times Ifi^2 \quad (4a)$$

a target current Iti approximating the load current Ifi of formula (3a) being applied to formula (4a) in place of the load current Ifi.

4. The power supply control device according to claim 3, wherein the present resistance calculating means further comprises a shift register storing time series data relating to the target current Iti, and a moving average value of a square current value over a most recent predetermined time period corresponding to a thermal time constant of the current detection resistor when installed in the housing of an actual machine is applied as the target current Iti applied in formula (4a).

5. The power supply control device according to claim 2, wherein a value of the current detection voltage Vfi is input into the microprocessor provided in the first integrated circuit element individually via an AD converter, the microprocessor comprises negative feedback control means for comparing a corrected target detection voltage Vti, which is obtained by multiplying the target current Iti by the estimated present resistance Rti, with a digital value of the current detection voltage Vfi, and generates the open/close command signal DRVi having the energization duty γi of the driving open/close element so that the comparison inputs match each other, and the second integrated circuit element drives the driving open/close element ON and OFF via the drive gate circuit that operates in response to the open/close command signal DRVi.

6. The power supply control device according to claim 2, wherein the microprocessor provided in the first integrated circuit element comprises PWM conversion means for generating the drive command signal CNTi, which has a command duty αi=Iti/Imax=Vti/Vmax that is a ratio of the corrected target detection voltage Vti obtained by multiplying the target current Iti by the estimated present resistance Rti to a maximum target detection voltage Vmax=Imax×Rti obtained by multiplying a maximum target current Imax by the present resistance Rti, a signal power supply voltage of the drive command signal CNTi serving as the pulse width modulation signal generated by the PWM conversion means being used as the control voltage Vcc, the second integrated circuit element comprises a negative feedback control circuit that limits a maximum value of the current detection voltage Vfi obtained when the load current Ifi corresponds to the maximum target current Imax to or below the control voltage Vcc, compares an analog conversion value of the target detection voltage Vti, which is obtained by smoothing the drive command signal CNTi using a smoothing circuit, with the current detection voltage Vfi, and generates the open/close command signal DRVi having the energization duty γi of the driving open/close element so that the comparison inputs match each other, and a value of the current detection voltage Vfi is output to an output terminal of the second integrated circuit element via the multiplexer as a part of the correction parameters, and since the microprocessor is not required to implement input processing thereon, a corresponding current detection voltage Vf is used in the adjustment tool.

7. The power supply control device according to claim 2, wherein the microprocessor provided in the first integrated circuit element comprises the present resistance calculating means, load current calculating means, present load resistance calculating means, target applied voltage calculating means, and ON-OFF drive command issuing means, the load current calculating means calculates a load current Ifi=Vfi/Rti by dividing a value of the current detection voltage Vfi, received as the uplink monitoring data, by the present resistance Rti calculated by the present resistance calculating means, the present load resistance calculating means applies a load reference resistance Rc0 of the inductive load at the start of the operation, and once the load current Ifi calculated by the load current calculating means has been stabilized by performing ON-OFF operations on the driving open/close element a plurality of times, calculates a present load resistance Rci=Vai/Ifi by dividing an average applied voltage Vai applied to the inductive load by the load current Ifi, the target applied voltage calculating means calculates a target applied voltage Vbti=Iti×Rci by multiplying the target current Iti set by the target current setting means by the present load resistance Rci calculated by the present load resistance calculating means, the ON-OFF drive command issuing means generates the open/close command signal DRVi so as to have an energization duty βi=Vbti/Vb, which is a ratio of the target applied voltage Vbti, calculated by the target applied voltage calculating means, to the power supply voltage Vb, the second integrated circuit element drives the driving open/close element ON and OFF via the drive gate circuit that operates in response to the open/close command signal DRVi, a value of the current detection voltage Vfi is included in the uplink monitoring data and transmitted thus to the microprocessor as a part of the correction parameters, and the average applied voltage Vai is an output voltage of an applied voltage detection circuit that smoothes an output voltage of the ON-OFF-driven driving open/close element using a smoothing capacitor, and a value of the average applied voltage Vai is input into the microprocessor provided in the first integrated circuit element individually via the AD converter.

8. The power supply control device according to claim 1, wherein the second integrated circuit element further comprises commutation circuit elements respectively connected in parallel to series circuits formed by the plurality of inductive loads and the current detection resistors connected in series to the plurality of inductive loads in positions upstream or downstream thereof, the commutation circuit element and the driving open/close element are P-channel or N-channel field effect transistors connected to each other in series, when the driving open/close element is connected to a position upstream of the inductive load, a cathode terminal of an internal parasitic diode thereof is connected to an anode terminal of an internal parasitic diode of the commutation circuit element, which is connected to a downstream position, when the driving open/close element is connected to a position downstream of the inductive load, an anode terminal of the internal parasitic diode thereof is connected to a cathode terminal of the internal parasitic diode of the commutation circuit element, which is connected to an upstream position, and the drive gate circuit stops driving the commutation circuit element before driving the driving open/close element to close and drives the commutation circuit element to close after stopping driving the driving open/close element to close such that the commutation circuit element is driven in an identical conduction direction to a conduction direction of the internal parasitic diode thereof.

9. A control characteristic correction data generation method for a power supply control device, the power supply control device being constituted by a second integrated circuit element that cooperates with a first integrated circuit element, the second integrated circuit element including driving open/close elements for supplying a plurality of inductive loads with individually variable load currents Ifi (i=1, 2, ..., m; likewise hereafter), drive gate circuits for open/close controlling the respective driving open/close elements, and current detection resistors for detecting the load currents Ifi, and first to fourth correction coefficients Ki1 to Ki4 indicated in formula (1b) or first to fifth correction coefficients Ki1 to Ki5 indicated in formula (3b) being calculated in order to calculate present resistances Rti=Vfi/Ifi that vary in response to individual variation among applied circuit components and variation in an environmental temperature or a power supply voltage as equivalent resistances by obtained dividing respective current detection voltages Vfi, which are obtained by amplifying end-to-end voltages of the respective current detection resistors, by the load currents Ifi, $$Ki1 \times Ti + Ki2 \times T0 + Ki3 \times Vba + Ki4 = Vfi/Ifi \qquad (1b)$$

$$Ki1 \times Ti0 + Ki2 \times T0 + Ki3 \times Vba + Ki4 + Ki5 \times Ifi^2 = Vfi/Ifi \qquad (3b)$$

wherein the power supply control device includes an adjustment board on which the single second integrated circuit element is mounted detachably, and an adjustment tool connected to the second integrated circuit element via the adjustment board, a DC power supply is connected to the adjustment board via a voltage regulator in order to supply power to the second integrated circuit element, the second integrated circuit element supplies the load current Ifi to a series circuit formed by an ammeter Ai1 and a standard sample load, and a dummy load resistor is connected to an output circuit of a constant voltage power supply provided in the second integrated circuit element, the adjustment tool includes a calculation control unit, a setting display unit, a select/write command issuing unit, a master station side serial-to-parallel converter connected in series to a slave station side serial-to-parallel converter provided in the second integrated circuit element, an energization command issuing unit for generating a pulse width modulation signal that serves as an open/close command signal DRVi or a drive command signal CNTi in the second integrated circuit element, a first AD converter and a second AD converter into which present values of correction parameters generated by the second integrated circuit element are input, and an environment adjustment unit, the first AD converter operates using a control voltage Vcc generated by the second integrated circuit element as an AD reference voltage Vref so as to digitally convert analog signal voltages Vfi, V3, Vai serving as the present values of the correction parameters, transmitted by the second integrated circuit element, and input the results into the calculation control unit, when a measurement value of the ammeter Ai1 or the current detection voltage Vfi is generated as an analog signal voltage and the current detection voltage Vfi is used in the second integrated circuit element during negative feedback control, the second AD converter operates using a stabilized voltage generated by a high-precision constant voltage power supply as an AD reference voltage Vrf so as to digitally convert the measured value of the load current Ifi or the current detection voltage Vfi and input the result into the calculation control unit, the AD reference voltage Vrf applied to the second AD converter is more precise than the AD reference voltage Vref applied to the first AD converter, and in a case where the measurement value of the ammeter Ai1 or the current detection voltage Vfi is generated as a digital signal voltage, a digital measurement value thereof is input as is into the calculation control unit, thereby eliminating the need for the second AD converter, the environment adjustment unit is operated from the calculation control unit via the setting display unit, and comprises a first step for generating a command to modify a resistance value of the dummy load resistor, a command to modify an output voltage output to the voltage regulator, and a command to modify an environmental temperature of the constant voltage power supply provided in the second integrated circuit element and an environmental temperature of the current detection resistor, the calculation control unit comprises a second step for reading a temperature detection voltage Ti generated by a resistor temperature detection element or a temperature detection voltage Ti0 generated by a representative temperature detection element, a temperature detection voltage T0 generated by a power supply temperature detection element, a power supply detection voltage Vba, a value of the current detection voltage Vfi, and a value of the load current Ifi measured by the ammeter Ai1 from formula (1b) or formula (3b) as the present values of the correction parameters, creating four, five, or more simultaneous equations having the first to fourth correction coefficients Ki1 to Ki4 or the first to fifth correction coefficients Ki1 to Ki5 as unknowns for each current detection resistor, and calculating the first to fourth correction coefficients Ki1 to Ki4 or the first to fifth correction coefficients Ki1 to Ki5 using a method of least squares, and the select/write command issuing unit comprises a third step for transmitting address information specifying individual types of the correction parameters transmitted from the second integrated circuit element, and transferring the first to fourth correction coefficients $Ki1$ to $Ki4$ or the first to fifth correction coefficients $Ki1$ to $Ki5$ calculated by the calculation control unit to the second integrated circuit element as correction coefficients for the respective current detection resistors, whereupon the correction coefficients are written to a data memory provided in the second integrated circuit element.

10. The control characteristic correction data generation method for a power supply control device according to claim 9, wherein, in the first step, the environmental temperatures of the plurality of current detection resistors are adjusted by having the energization command issuing unit generate the pulse width modulation signals $DRVi$, $CNTi$ to be applied to the plurality of driving open/close elements all at once, setting energization duties thereof as large or small or as large, medium, or small, increasing or reducing the load currents $Ifi$ of the standard sample loads, and then ejecting cold air or warm air onto the plurality of current detection resistors all at once via a first airflow adjustment solenoid valve and an ejection nozzle in order to adjust the temperatures thereof rapidly in a plurality of stages, namely high and low or high, medium, and low, and the environmental temperature of the constant voltage power supply is adjusted by modifying a resistance value of the dummy load resistor so as to increase or reduce an output current applied to the constant voltage power supply, and then ejecting cold air or warm air onto the constant voltage power supply via a second airflow adjustment solenoid valve and an ejection nozzle in order to adjust the temperature thereof rapidly in a plurality of stages, namely high and low or high, medium, and low, values set in advance by experiment are applied in accordance with target temperatures as respective magnitudes of the load currents $Ifi$ or the output current applied to the plurality of current detection resistors or the constant voltage power supply, and an appropriate flow rate of an airflow generated by the first airflow adjustment solenoid valve or the second airflow adjustment solenoid valve.

\* \* \* \* \*